(12) United States Patent
Mehta et al.

(10) Patent No.: US 10,657,799 B2
(45) Date of Patent: *May 19, 2020

(54) METHOD AND SYSTEM FOR SITUATIONAL AWARENESS FOR EMERGENCY RESPONSE

(71) Applicant: RapidSOS, Inc., New York, NY (US)

(72) Inventors: Anil Mehta, Makanda, IL (US); Michael John Martin, Long Island City, NY (US); Nicholas Edward Horelik, New York, NY (US)

(73) Assignee: RAPIDSOS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,476

(22) Filed: Nov. 1, 2018

(65) Prior Publication Data

US 2019/0073894 A1    Mar. 7, 2019

Related U.S. Application Data

(63) Continuation of application No. 15/667,531, filed on Aug. 2, 2017, now Pat. No. 10,140,842, which is a
(Continued)

(51) Int. Cl.
*G08B 21/02* (2006.01)
*G08B 25/01* (2006.01)
(Continued)

(52) U.S. Cl.
CPC ......... *G08B 25/016* (2013.01); *G08B 25/006* (2013.01); *G08B 25/009* (2013.01);
(Continued)

(58) Field of Classification Search
CPC ......... H04W 4/90; H04W 4/02; H04W 76/50; H04W 84/18; H04W 12/06; H04W 64/00;
(Continued)

(56) References Cited

U.S. PATENT DOCUMENTS 5,379,337 A    1/1995 Castillo et al.
5,479,482 A    12/1995 Grimes
(Continued)

FOREIGN PATENT DOCUMENTS

CA    2662606 A1    10/2009
CA    2697986 A1    9/2010
(Continued)

OTHER PUBLICATIONS

Co-pending U.S. Appl. No. 16/378,363, filed Apr. 8, 2019.
(Continued)

*Primary Examiner* — Daniel Previl
(74) *Attorney, Agent, or Firm* — Wilson Sonsini Goodrich & Rosati

(57) ABSTRACT

Disclosed are systems and methods for sending emergency alerts. In some embodiments, sensors and wearable devices may trigger and send the emergency alerts and/or warning signals via available communication devices. Multi-media emergency alerts are also disclosed that include situational awareness information for effective and efficient emergency response.

20 Claims, 14 Drawing Sheets

Related U.S. Application Data continuation of application No. 15/466,710, filed on Mar. 22, 2017, now Pat. No. 9,756,169, which is a continuation of application No. 15/342,093, filed on Nov. 2, 2016, now Pat. No. 9,659,484.

(60) Provisional application No. 62/311,719, filed on Mar. 22, 2016, provisional application No. 62/274,571, filed on Jan. 4, 2016, provisional application No. 62/249,551, filed on Nov. 2, 2015.

(51) Int. Cl.
| | | |
|---|---|---|
| *H04W 4/90* | (2018.01) | |
| *G08B 25/00* | (2006.01) | |
| *H04M 3/51* | (2006.01) | |
| *G08B 26/00* | (2006.01) | |
| *H04L 29/08* | (2006.01) | |
| *H04M 1/725* | (2006.01) | |

(52) U.S. Cl.
CPC ........... *G08B 26/00* (2013.01); *G08B 26/007* (2013.01); *H04L 67/12* (2013.01); *H04M 1/72536* (2013.01); *H04M 3/5116* (2013.01); *H04W 4/90* (2018.02); *H04M 2242/04* (2013.01); *H04M 2242/15* (2013.01)

(58) Field of Classification Search
CPC ......... H04W 88/02; H04W 4/20; H04W 4/50; H04W 4/08; H04W 8/18; H04W 72/0453; H04W 84/12; H04M 2242/04; H04M 3/5116; H04M 1/72536; H04M 2242/15; H04M 2250/12; H04M 1/236; H04M 1/271; H04M 2250/10; H04M 2250/22; H04M 2250/52; H04M 2250/68; H04M 2250/74; H04M 2242/30; H04M 11/04; G08B 25/006; G08B 25/009; G08B 25/016; G08B 26/00; G08B 26/007; H04L 67/12; H04L 67/18; H04L 12/66; G10L 15/22; G10L 17/005; G10L 2015/223; G06Q 10/06; G06Q 10/08; G06Q 50/265; G06Q 50/10; H04B 1/0483; H04B 7/18504; H04B 7/18506; H04B 7/18513; Y04S 10/54
USPC ........................ 340/539.11, 531, 601, 539.22
See application file for complete search history.

(56) References Cited

U.S. PATENT DOCUMENTS

| | | |
|---|---|---|
| 5,563,931 A | 10/1996 | Bishop et al. |
| 5,596,625 A | 1/1997 | LeBlanc |
| 5,710,803 A | 1/1998 | Kowal et al. |
| 5,742,666 A | 4/1998 | Alpert |
| 6,014,555 A | 1/2000 | Tendler |
| 6,133,853 A | 10/2000 | Obradovich et al. |
| 6,167,255 A | 12/2000 | Kennedy et al. |
| 6,249,674 B1 | 6/2001 | Verdonk |
| 6,252,943 B1 | 6/2001 | Johnson et al. |
| 6,256,489 B1 | 7/2001 | Lichter et al. |
| 6,262,655 B1 | 7/2001 | Yoshioka et al. |
| 6,363,138 B1 | 3/2002 | Aprile |
| 6,459,782 B1 | 10/2002 | Bedrosian et al. |
| 6,477,362 B1 | 11/2002 | Raith et al. |
| 6,502,030 B2 | 12/2002 | Hilleary |
| 6,510,315 B1 | 1/2003 | Arnson |
| 6,556,816 B1 | 4/2003 | Gafrick et al. |
| 6,571,092 B2 | 5/2003 | Faccin et al. |
| 6,574,323 B1 | 6/2003 | Manuel et al. |
| 6,587,545 B1 | 7/2003 | Antonucci et al. |
| 6,594,666 B1 | 7/2003 | Biswas et al. |
| 6,600,812 B1 | 7/2003 | Gentillin et al. |
| 6,628,933 B1 | 9/2003 | Humes |
| 6,680,998 B1 | 1/2004 | Bell et al. |
| 6,707,421 B1 | 3/2004 | Drury et al. |
| 6,731,610 B2 | 5/2004 | Sajikawa et al. |
| 6,993,118 B2 | 1/2006 | Antonucci et al. |
| 7,054,611 B2 | 5/2006 | Eisner et al. |
| 7,058,385 B2 | 6/2006 | Lauper |
| 7,084,775 B1 | 8/2006 | Smith |
| 7,177,400 B2 | 2/2007 | Eisner et al. |
| 7,224,773 B2 | 5/2007 | Croak et al. |
| 7,271,704 B2 | 9/2007 | McSheffrey et al. |
| 7,324,801 B2 | 1/2008 | Droste et al. |
| 7,349,706 B2 | 3/2008 | Kim et al. |
| 7,409,044 B2 | 8/2008 | Leduc |
| 7,409,428 B1 | 8/2008 | Brabec et al. |
| 7,436,938 B2 | 10/2008 | Savaglio et al. |
| 7,437,143 B1 | 10/2008 | Williams |
| 7,469,138 B2 | 12/2008 | Dayar et al. |
| 7,483,519 B2 * | 1/2009 | Binning ............... H04L 12/2803 379/45 |
| 7,519,351 B2 | 4/2009 | Malone, III |
| 7,519,372 B2 | 4/2009 | MacDonald et al. |
| 7,548,158 B2 | 6/2009 | Titus et al. |
| 7,565,131 B2 | 7/2009 | Rollender |
| 7,646,854 B2 | 1/2010 | Anderson |
| 7,676,215 B2 | 3/2010 | Chin et al. |
| 7,684,782 B2 | 3/2010 | Ashley, Jr. et al. |
| 7,848,733 B2 | 12/2010 | Bull et al. |
| 7,937,067 B2 | 5/2011 | Maier et al. |
| 7,949,326 B2 | 5/2011 | Gallagher et al. |
| 8,009,810 B2 | 8/2011 | Seidberg et al. |
| 8,041,335 B2 | 10/2011 | Khetawat et al. |
| 8,041,341 B1 | 10/2011 | Malackowski et al. |
| 8,045,954 B2 | 10/2011 | Barbeau et al. |
| 8,068,881 B2 | 11/2011 | Schrager |
| 8,102,972 B2 | 1/2012 | Poremba |
| 8,126,424 B2 | 2/2012 | Piett et al. |
| 8,150,367 B1 | 4/2012 | Malladi et al. |
| 8,165,560 B2 | 4/2012 | Stenquist |
| 8,165,562 B2 | 4/2012 | Piett et al. |
| 8,185,087 B2 | 5/2012 | Mitchell |
| 8,195,121 B2 | 6/2012 | Dunn et al. |
| 8,219,135 B2 | 7/2012 | De Amorim et al. |
| 8,244,205 B2 | 8/2012 | Wu |
| 8,249,546 B1 | 8/2012 | Shah et al. |
| 8,249,547 B1 | 8/2012 | Fellner |
| 8,289,953 B2 | 10/2012 | Ray et al. |
| 8,306,501 B2 | 11/2012 | Moodbidri et al. |
| 8,326,260 B1 | 12/2012 | Bradish et al. |
| 8,369,488 B2 | 2/2013 | Sennett et al. |
| 8,401,565 B2 | 3/2013 | Sandberg et al. |
| 8,417,090 B2 | 4/2013 | Fleming |
| 8,417,212 B2 | 4/2013 | Cepuran et al. |
| 8,442,481 B2 | 5/2013 | Maier et al. |
| 8,442,482 B2 | 5/2013 | Maier et al. |
| 8,472,973 B2 | 6/2013 | Lin et al. |
| 8,484,352 B2 | 7/2013 | Piett et al. |
| 8,489,062 B2 | 7/2013 | Ray et al. |
| 8,494,868 B2 | 7/2013 | Saalsaa |
| 8,509,729 B2 | 8/2013 | Shaw |
| 8,516,122 B2 | 8/2013 | Piett et al. |
| 8,538,370 B2 | 9/2013 | Ray et al. |
| 8,538,468 B2 | 9/2013 | Daly |
| 8,588,733 B2 | 11/2013 | Ferguson et al. |
| 8,594,015 B2 | 11/2013 | Dunn et al. |
| 8,606,218 B2 | 12/2013 | Ray et al. |
| 8,625,578 B2 | 1/2014 | Roy et al. |
| 8,626,112 B2 | 1/2014 | Ray et al. |
| 8,630,609 B2 | 1/2014 | Ray et al. |
| 8,644,301 B2 | 2/2014 | Tamhankar et al. |
| 8,649,806 B2 | 2/2014 | Cuff et al. |
| 8,682,279 B2 | 3/2014 | Rudolf et al. |
| 8,682,281 B2 | 3/2014 | Dunn et al. |
| 8,682,286 B2 | 3/2014 | Dickinson et al. |
| 8,712,366 B2 | 4/2014 | Greene et al. |
| 8,747,336 B2 | 6/2014 | Tran |
| 8,751,265 B2 | 6/2014 | Piett et al. |
| 8,755,767 B2 | 6/2014 | Maier et al. |
| 8,760,290 B2 | 6/2014 | Piett et al. |

(56) References Cited

U.S. PATENT DOCUMENTS

| | | | |
|---|---|---|---|
| 8,761,721 B2 | 6/2014 | Li | |
| 8,792,867 B1 | 7/2014 | Negahban et al. | |
| 8,811,935 B2 | 8/2014 | Faccin et al. | |
| 8,825,687 B2 | 9/2014 | Marceau et al. | |
| 8,848,877 B2 | 9/2014 | Seidberg et al. | |
| 8,866,606 B1 | 10/2014 | Will et al. | |
| 8,868,028 B1 | 10/2014 | Kaltsukis | |
| 8,880,021 B1 | 11/2014 | Hawkins | |
| 8,890,685 B1 | 11/2014 | Sookman et al. | |
| 8,918,075 B2 | 12/2014 | Maier et al. | |
| 8,948,732 B1 | 2/2015 | Negahban et al. | |
| 8,971,839 B2 | 3/2015 | Hong | |
| 8,983,424 B2 | 3/2015 | Binning | |
| 8,984,143 B2 | 3/2015 | Serra et al. | |
| 9,008,078 B2 | 4/2015 | Kamdar et al. | |
| 9,014,657 B2 | 4/2015 | Rohde et al. | |
| 9,019,870 B2 | 4/2015 | Khan et al. | |
| 9,071,643 B2 | 6/2015 | Saito et al. | |
| 9,077,676 B2 | 7/2015 | Price et al. | |
| 9,078,092 B2 | 7/2015 | Piett et al. | |
| 9,094,816 B2 | 7/2015 | Maier et al. | |
| 9,129,219 B1 | 9/2015 | Robertson et al. | |
| 9,167,379 B1 | 10/2015 | Hamilton et al. | |
| 9,244,922 B2 | 1/2016 | Marceau et al. | |
| 9,258,680 B2 | 2/2016 | Drucker | |
| 9,277,389 B2 | 3/2016 | Saito et al. | |
| 9,351,142 B2 | 5/2016 | Basore et al. | |
| 9,369,847 B2 | 6/2016 | Borghei | |
| 9,384,491 B1 | 7/2016 | Briggs et al. | |
| 9,402,159 B1 | 7/2016 | Self et al. | |
| 9,408,051 B2 | 8/2016 | Finney et al. | |
| 9,420,099 B1 | 8/2016 | Krishnan et al. | |
| 9,426,638 B1 | 8/2016 | Johnson | |
| 9,497,585 B1 * | 11/2016 | Cooley | H04W 4/02 |
| 9,503,876 B2 | 11/2016 | Saito et al. | |
| 9,544,260 B2 | 1/2017 | Cuff et al. | |
| 9,544,750 B1 | 1/2017 | Self et al. | |
| 9,591,467 B2 | 3/2017 | Piett et al. | |
| 9,609,128 B2 | 3/2017 | Dahan et al. | |
| 9,629,185 B1 * | 4/2017 | Gluckman | H04W 4/90 |
| 9,635,534 B2 | 4/2017 | Maier et al. | |
| 9,659,484 B1 * | 5/2017 | Mehta | H04W 4/90 |
| 9,693,213 B2 | 6/2017 | Self et al. | |
| 9,734,721 B2 | 8/2017 | Stenneth et al. | |
| 9,736,670 B2 | 8/2017 | Mehta et al. | |
| 9,756,169 B2 * | 9/2017 | Mehta | H04W 4/90 |
| 9,805,430 B2 | 10/2017 | Miasnik et al. | |
| 9,838,858 B2 | 12/2017 | Anand et al. | |
| 9,924,043 B2 | 3/2018 | Mehta et al. | |
| 9,942,739 B2 | 4/2018 | Bozik et al. | |
| 9,986,404 B2 | 5/2018 | Mehta et al. | |
| 9,992,655 B2 | 6/2018 | Anand et al. | |
| 9,998,507 B2 | 6/2018 | Mehta et al. | |
| 10,002,375 B1 | 6/2018 | Scythes et al. | |
| 10,089,854 B2 | 10/2018 | Hender et al. | |
| 10,136,294 B2 | 11/2018 | Mehta et al. | |
| 10,140,482 B2 | 11/2018 | Mehta et al. | |
| 10,140,842 B2 * | 11/2018 | Mehta | H04W 4/90 |
| 10,142,213 B1 | 11/2018 | Hart et al. | |
| 10,165,431 B2 | 12/2018 | Bozik et al. | |
| 2001/0051849 A1 | 12/2001 | Boone | |
| 2002/0001367 A1 | 1/2002 | Lee | |
| 2002/0027975 A1 | 3/2002 | Oxley | |
| 2002/0057678 A1 | 5/2002 | Jiang et al. | |
| 2002/0120698 A1 | 8/2002 | Tamargo | |
| 2003/0069035 A1 | 4/2003 | Shurvinton | |
| 2003/0109245 A1 | 6/2003 | McCalmont et al. | |
| 2004/0203572 A1 | 10/2004 | Aerrabotu et al. | |
| 2004/0266390 A1 | 12/2004 | Faucher et al. | |
| 2005/0085215 A1 | 4/2005 | Kokko et al. | |
| 2005/0104745 A1 | 5/2005 | Bachelder et al. | |
| 2005/0111630 A1 | 5/2005 | Potorny et al. | |
| 2005/0151642 A1 | 7/2005 | Tupler et al. | |
| 2005/0190892 A1 | 9/2005 | Dawson et al. | |
| 2005/0222829 A1 | 10/2005 | Dumas | |
| 2005/0282518 A1 | 12/2005 | D'Evelyn et al. | |
| 2006/0109960 A1 | 5/2006 | D'Evelyn et al. | |
| 2006/0293024 A1 | 12/2006 | Benco et al. | |
| 2007/0030144 A1 | 2/2007 | Titus et al. | |
| 2007/0030146 A1 | 2/2007 | Shepherd | |
| 2007/0033095 A1 | 2/2007 | Hodgin et al. | |
| 2007/0049287 A1 | 3/2007 | Dunn | |
| 2007/0053308 A1 | 3/2007 | Dumas et al. | |
| 2007/0058528 A1 | 3/2007 | Massa et al. | |
| 2007/0060097 A1 | 3/2007 | Edge et al. | |
| 2007/0161383 A1 | 7/2007 | Caci | |
| 2007/0164872 A1 | 7/2007 | Monroe | |
| 2007/0171854 A1 * | 7/2007 | Chen | G08G 1/205 370/328 |
| 2007/0218895 A1 | 9/2007 | Saito et al. | |
| 2008/0019268 A1 | 1/2008 | Rollins | |
| 2008/0063153 A1 | 3/2008 | Krivorot et al. | |
| 2008/0077474 A1 | 3/2008 | Dumas et al. | |
| 2008/0081646 A1 | 4/2008 | Morin et al. | |
| 2008/0166990 A1 | 7/2008 | Toiv | |
| 2008/0194238 A1 | 8/2008 | Kwon | |
| 2008/0253535 A1 | 10/2008 | Sherry et al. | |
| 2008/0294058 A1 | 11/2008 | Shklarski | |
| 2009/0041206 A1 | 2/2009 | Hobby et al. | |
| 2009/0134982 A1 | 5/2009 | Robertson et al. | |
| 2009/0186596 A1 | 7/2009 | Kaltsukis et al. | |
| 2009/0257345 A1 | 10/2009 | King | |
| 2009/0311987 A1 | 12/2009 | Edge et al. | |
| 2009/0322513 A1 | 12/2009 | Hwang et al. | |
| 2010/0002846 A1 | 1/2010 | Ray et al. | |
| 2010/0003964 A1 | 1/2010 | Khare et al. | |
| 2010/0156626 A1 | 6/2010 | Story | |
| 2010/0159871 A1 | 6/2010 | Tester | |
| 2010/0159976 A1 | 6/2010 | Marocchi et al. | |
| 2010/0166153 A1 | 7/2010 | Guleria et al. | |
| 2010/0190468 A1 | 7/2010 | Scott et al. | |
| 2010/0202368 A1 | 8/2010 | Hans | |
| 2010/0238018 A1 | 9/2010 | Kelly | |
| 2010/0262668 A1 * | 10/2010 | Piett | H04W 76/50 709/206 |
| 2011/0009086 A1 | 1/2011 | Poremba et al. | |
| 2011/0029600 A1 | 2/2011 | Theimer | |
| 2011/0071880 A1 | 3/2011 | Spector | |
| 2011/0086607 A1 | 4/2011 | Wang et al. | |
| 2011/0103266 A1 | 5/2011 | Andreasen et al. | |
| 2011/0134897 A1 | 6/2011 | Montemurro et al. | |
| 2011/0153368 A1 | 6/2011 | Pierre et al. | |
| 2011/0201357 A1 | 8/2011 | Garrett et al. | |
| 2011/0263219 A1 | 10/2011 | Hasenfang et al. | |
| 2011/0263319 A1 | 10/2011 | Haemaelaeinen et al. | |
| 2012/0002792 A1 | 1/2012 | Chang | |
| 2012/0028599 A1 | 2/2012 | Hatton et al. | |
| 2012/0029970 A1 | 2/2012 | Stiles et al. | |
| 2012/0040636 A1 | 2/2012 | Kazmi | |
| 2012/0092161 A1 | 4/2012 | West | |
| 2012/0144019 A1 | 6/2012 | Zhu | |
| 2012/0157795 A1 | 6/2012 | Chiu et al. | |
| 2012/0196557 A1 | 8/2012 | Reich et al. | |
| 2012/0196558 A1 | 8/2012 | Reich et al. | |
| 2012/0202428 A1 | 8/2012 | Mirbaha et al. | |
| 2012/0210325 A1 | 8/2012 | De Lind Van Wijngaarden et al. | |
| 2012/0218102 A1 | 8/2012 | Bivens et al. | |
| 2012/0256745 A1 | 10/2012 | Piett et al. | |
| 2012/0257729 A1 | 10/2012 | Piett et al. | |
| 2012/0258680 A1 | 10/2012 | Piett et al. | |
| 2012/0289243 A1 | 11/2012 | Tarlow et al. | |
| 2012/0295575 A1 | 11/2012 | Nam | |
| 2012/0309341 A1 | 12/2012 | Ward | |
| 2013/0005295 A1 | 1/2013 | Park et al. | |
| 2013/0030825 A1 | 1/2013 | Bagwandeen et al. | |
| 2013/0036175 A1 | 2/2013 | Lau | |
| 2013/0065569 A1 * | 3/2013 | Leipzig | G06F 9/453 455/416 |
| 2013/0084824 A1 | 4/2013 | Hursey | |
| 2013/0102351 A1 | 4/2013 | Mo | |
| 2013/0122932 A1 | 5/2013 | Patel et al. | |
| 2013/0138791 A1 | 5/2013 | Thomas et al. | |
| 2013/0183924 A1 | 7/2013 | Saigh et al. | |
| 2013/0185368 A1 | 7/2013 | Nordstrom et al. | |

(56) References Cited

U.S. PATENT DOCUMENTS

| | | |
|---|---|---|
| 2013/0203373 A1 | 8/2013 | Edge |
| 2013/0203376 A1 | 8/2013 | Maier et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0331055 A1 | 12/2013 | McKown et al. |
| 2014/0031000 A1 | 1/2014 | Hanover |
| 2014/0051379 A1 | 2/2014 | Ganesh et al. |
| 2014/0086108 A1 | 3/2014 | Dunn et al. |
| 2014/0087680 A1 | 3/2014 | Luukkala et al. |
| 2014/0095425 A1 | 4/2014 | Sipple |
| 2014/0096195 A1 | 4/2014 | Morgan |
| 2014/0113606 A1 | 4/2014 | Morken et al. |
| 2014/0126356 A1 | 5/2014 | Lee et al. |
| 2014/0134969 A1 | 5/2014 | Jin et al. |
| 2014/0148120 A1 | 5/2014 | Buck |
| 2014/0155018 A1 | 6/2014 | Fan et al. |
| 2014/0164505 A1 | 6/2014 | Daly et al. |
| 2014/0199959 A1 | 7/2014 | Hassan et al. |
| 2014/0213212 A1 | 7/2014 | Clawson |
| 2014/0248848 A1 | 9/2014 | Mufti et al. |
| 2014/0257846 A1 | 9/2014 | Hermiz et al. |
| 2014/0302810 A1 | 10/2014 | Inha et al. |
| 2014/0324351 A1 | 10/2014 | Dannevik et al. |
| 2014/0359008 A1 | 12/2014 | Finney et al. |
| 2014/0368601 A1 | 12/2014 | Decharms |
| 2015/0011176 A1 | 1/2015 | Zhu |
| 2015/0029836 A1 | 1/2015 | Hans et al. |
| 2015/0055453 A1 | 2/2015 | Chaki et al. |
| 2015/0055554 A1 | 2/2015 | Sedlacek et al. |
| 2015/0081209 A1 | 3/2015 | Yeh et al. |
| 2015/0094095 A1 | 4/2015 | Johnson et al. |
| 2015/0099481 A1 | 4/2015 | Maitre et al. |
| 2015/0109125 A1 | 4/2015 | Kaib et al. |
| 2015/0111524 A1 | 4/2015 | South et al. |
| 2015/0137972 A1 | 5/2015 | Nepo et al. |
| 2015/0172897 A1 | 6/2015 | Mariathasan et al. |
| 2015/0181401 A1 | 6/2015 | Dhandu et al. |
| 2015/0289121 A1 | 10/2015 | Lesage et al. |
| 2015/0304827 A1 | 10/2015 | Price et al. |
| 2015/0317392 A1 | 11/2015 | Fernandez |
| 2015/0317809 A1 | 11/2015 | Chellappan et al. |
| 2015/0319284 A1 | 11/2015 | Leonessi |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0034961 A1 | 2/2016 | May et al. |
| 2016/0057595 A1 | 2/2016 | Ahmed et al. |
| 2016/0065748 A1 | 3/2016 | Li et al. |
| 2016/0088455 A1 | 3/2016 | Bozik et al. |
| 2016/0142894 A1 | 5/2016 | Papakonstantinou et al. |
| 2016/0210581 A1 | 7/2016 | Braun |
| 2016/0219084 A1 | 7/2016 | Abiezzi |
| 2016/0219397 A1 | 7/2016 | Mayor et al. |
| 2016/0227589 A1 | 8/2016 | Marshall et al. |
| 2016/0269535 A1 | 9/2016 | Balabhadruni et al. |
| 2016/0307436 A1 | 10/2016 | Nixon |
| 2016/0315923 A1 | 10/2016 | Riscombe-Burton et al. |
| 2016/0330769 A1 | 11/2016 | Edge |
| 2016/0337831 A1 | 11/2016 | Piett et al. |
| 2016/0345171 A1 | 11/2016 | Kulkarni et al. |
| 2016/0353262 A1 | 12/2016 | Acevedo et al. |
| 2016/0353266 A1 | 12/2016 | Winkler et al. |
| 2016/0363931 A1 | 12/2016 | Yang et al. |
| 2016/0371973 A1 | 12/2016 | Holleczek et al. |
| 2017/0004427 A1 | 1/2017 | Bruchal et al. |
| 2017/0012815 A1 | 1/2017 | Nekrestyanov et al. |
| 2017/0046216 A1 | 2/2017 | Stenneth et al. |
| 2017/0075407 A1 | 3/2017 | Kritt et al. |
| 2017/0099579 A1 | 4/2017 | Ryan et al. |
| 2017/0108862 A1 | 4/2017 | Mikkelsen |
| 2017/0124670 A1 | 5/2017 | Becker et al. |
| 2017/0124852 A1 | 5/2017 | Pauws et al. |
| 2017/0140637 A1 | 5/2017 | Thurlow et al. |
| 2017/0142568 A1 | 5/2017 | Saito et al. |
| 2017/0150335 A1 | 5/2017 | Self et al. |
| 2017/0161614 A1 | 6/2017 | Mehta et al. |
| 2017/0180963 A1 | 6/2017 | Cavendish et al. |
| 2017/0180966 A1 | 6/2017 | Piett et al. |
| 2017/0188218 A1 | 6/2017 | Corley et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2017/0287085 A1 | 10/2017 | Smith et al. |
| 2017/0310827 A1 | 10/2017 | Mehta et al. |
| 2017/0316698 A1 | 11/2017 | Stenneth et al. |
| 2017/0325056 A1 | 11/2017 | Mehta et al. |
| 2017/0359712 A1 | 12/2017 | Meredith et al. |
| 2017/0374538 A1 | 12/2017 | Gellens et al. |
| 2018/0020091 A1 | 1/2018 | Self et al. |
| 2018/0039737 A1 | 2/2018 | Dempers et al. |
| 2018/0053401 A1 | 2/2018 | Martin et al. |
| 2018/0077282 A1 | 3/2018 | Herron et al. |
| 2018/0152563 A1 | 5/2018 | Mehta et al. |
| 2018/0242133 A1 | 8/2018 | Anand et al. |
| 2018/0249315 A1 | 8/2018 | Mehta et al. |
| 2018/0262544 A1 | 9/2018 | Mehta et al. |
| 2018/0310159 A1 | 10/2018 | Katz et al. |
| 2018/0352408 A1 | 12/2018 | Baer et al. |
| 2019/0020993 A1 | 1/2019 | Nguyen |
| 2019/0166480 A1 | 5/2019 | Rauner |
| 2019/0327597 A1 | 10/2019 | Katz et al. |
| 2019/0335310 A1 | 10/2019 | Anand et al. |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CN | 106021508 A | 10/2016 |
| JP | 2012222443 A | 11/2012 |
| KR | 20090019606 A | 2/2009 |
| KR | 20090022900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| WO | WO-0022593 A1 | 4/2000 |
| WO | WO-0167419 A2 | 9/2001 |
| WO | WO-2007109599 A2 | 12/2007 |
| WO | WO-2012129561 A1 | 9/2012 |
| WO | WO-2014025563 A1 | 2/2014 |
| WO | WO-2014063121 A1 | 4/2014 |
| WO | WO-2014074420 A1 | 5/2014 |
| WO | WO-2014176646 A1 | 11/2014 |
| WO | WO-2015127867 A1 | 9/2015 |
| WO | WO-2015196155 A1 | 12/2015 |
| WO | WO-2016044540 A1 | 3/2016 |
| WO | WO-2017079354 A1 | 5/2017 |
| WO | WO-2017083571 A1 | 5/2017 |
| WO | WO-2017100220 A1 | 6/2017 |
| WO | WO-2017106775 A1 | 6/2017 |
| WO | WO-2017112820 A1 | 6/2017 |
| WO | WO-2017189610 A2 | 11/2017 |
| WO | WO-2017196753 A1 | 11/2017 |
| WO | WO-2018039142 A1 | 3/2018 |
| WO | WO-2019113129 A1 | 6/2019 |

OTHER PUBLICATIONS

PCT/US2017/047854 International Preliminary Report on Patentability dated Mar. 7, 2019.

(56) References Cited

OTHER PUBLICATIONS

PCT/US2018/063935 International Search Report and Written Opinion dated Mar. 22, 2019.
Abel et al. Semantics + Filtering + Search = Twitcident exploring information in social web streams. HT'12—Proceedings of 23rd ACM Conference on Hypertext and Social Media (10 pgs) (2012).
ArcGIS REST Services Directory. Folder: TIGERWeb. Available at https://tigerweb.geo.census.gov/arcgis/rest/services/TIGERweb. (1 pg.) (Accessed Sep. 2017).
Chowdhury et al. Tweet4act: Using incident-specific profiles for classifying crisis-related messages. Proceedings of the 10th International ISCRAM Conference (pp. 834-839) (2013).
Co-pending U.S. Appl. No. 16/150,099, filed Oct. 2, 2018.
Co-pending U.S. Appl. No. 16/162,171, filed Oct. 16, 2016.
Co-pending U.S. Appl. No. 16/209,892, filed Dec. 4, 2018.
Co-pending U.S. Appl. No. 16/271,634, filed Feb. 8, 2019.
Homeland Security Science and Technology. Using Social Media for Enhanced Situational Awareness and Decision Support. Virtual Social Medial Working Group and DHS First Responders Group. (44 pgs.) (Jun. 2014).
Marcus et al. TwitInfo: Aggregating and Visualizing Microblogs for Event Exploration. ACM CHI Conference 2011 (10 pgs).
Meier. MatchApp: Next Generation Disaster Response App? iRevolution (12 pgs.) (Feb. 27, 2013).
National Emergency Number Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (2012).
National Emergency Number Association (Nena) Technical Committee Chairs: NENA Functional and Interface Standards for Next Generation 9-1-1 Version 1.0 (i3). (Dec. 18, 2017). Retrieved from the Internet: URL:https://c.ymcdn.com/sites/nena.site-ym.com/resource/collection/2851C951-69FF-40F0-A6B8-36A714CB085D/NENA_08-002-vl_Functional_Interface_Standards_NG911_i3.pdf [retrieved on Feb. 5, 2018] (121 pgs).
PCT/US2015/050609 International Preliminary Report on Patentability dated Mar. 30, 2017.
PCT/US2015/050609 International Search Report and Written Opinion dated Dec. 16, 2015.
PCT/US2016/060189 International Preliminary Report on Patentability dated May 17, 2018.
PCT/US2016/060189 International Search Report and Written Opinion dated Feb. 24, 2017.
PCT/US2016/065212 International Preliminary Report on Patentability dated Jun. 21, 2018.
PCT/US2016/065212 International Search Report and Written Opinion dated Feb. 20, 2017.
PCT/US2016/067366 International Preliminary Report on Patentability dated Jun. 28, 2018.
PCT/US2016/067366 International Search Report and Written Opinion dated Mar. 31, 2017.
PCT/US2016/068134 International Preliminary Report on Patentability dated Jul. 5, 2018.
PCT/US2016/068134 International Search Report and Written Opinion dated Apr. 21, 2017.
PCT/US2017/029465 International Preliminary Report on Patentability dated Nov. 8, 2018.
PCT/US2017/029465 International Search Report and Written Opinion dated Aug. 9, 2017.
PCT/US2017/031605 International Search Report and Written Opinion dated Jul. 31, 2017.
PCT/US2017/047854 International Search Report and Written Opinion dated Nov. 28, 2017.
PCT/US2018/028951 International Search Report and Written Opinion dated Aug. 10, 2018.
Seattle Real Time Fire 911 Calls. Available at https://catalog.data.gov/dataset/seattle-real-time-fire-911-calls-6cdf3 (3 pgs.) (Accessed Sep. 2017).
Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (2010).
U.S. Census Bureau. Developers: Population Estimates APIs. Available at https://www.census.gov/data/developers/data-sets/popest-popproj/popest.html (2 pgs.) (Accessed Sep. 2017).
U.S. Appl. No. 14/794,780 Office Action dated Feb. 2, 2016.
U.S. Appl. No. 14/794,780 Office Action dated Mar. 7, 2017.
U.S. Appl. No. 14/794,780 Office Action dated Nov. 15, 2016.
U.S. Appl. No. 14/856,818 Office Action dated Apr. 12, 2017.
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,379 Office Action dated Nov. 2, 2017.
U.S. Appl. No. 15/436,484 Office Action dated May 8, 2017.
U.S. Appl. No. 15/436,484 Office Action dated Sep. 14, 2017.
U.S. Appl. No. 15/444,133 Office Action dated Apr. 4, 2017.
U.S. Appl. No. 15/444,133 Office Action dated Aug. 17, 2017.
U.S. Appl. No. 15/497,067 Office Action dated Jun. 23, 2017.
U.S. Appl. No. 15/588,343 Office Action dated Feb. 26, 2018.
U.S. Appl. No. 15/589,847 Office Action dated Jun. 23, 2017.
U.S. Appl. No. 15/589,847 Office Action dated Nov. 30, 2017.
U.S. Appl. No. 15/589,847 Office Action dated Nov. 6, 2018.
U.S. Appl. No. 15/667,531 Office Action dated Apr. 5, 2018.
U.S. Appl. No. 15/667,531 Office Action dated Nov. 8, 2017.
U.S. Appl. No. 15/880,208 Office Action dated Aug. 7, 2018.
U.S. Appl. No. 15/958,186 Office Action dated Oct. 18, 2018.
U.S. Appl. No. 15/958,398 Office Action dated Oct. 12, 2018.
U.S. Appl. No. 15/960,384 Office Action dated Jul. 12, 2018.
U.S. Appl. No. 16/209,892 Office Action dated Feb. 8, 2019.
Weather Company Data for IBM Bluemix APIs. Available at https://twcservice.mybluemix.net/rest-api/ (100 pgs) (Accessed Sep. 2017).
Cipolla et al. A tool for Emergency Detection with Deep Learning Neural Networks. KDWeb (2016) How to predict a disaster. ICAR—National Reseach Council of Italy—Palermo, Italy (10 pgs).
Co-pending U.S. Appl. No. 16/384,600, filed Apr. 15, 2019.
Co-pending U.S. Appl. No. 16/537,377, filed Aug. 9, 2019.
PCT/US2019/027538 International Search Report and Written Opinion dated Aug. 2, 2019.
U.S. Appl. No. 15/371,117 Office Action dated Aug. 5, 2019.
U.S. Appl. No. 15/682,440 Office Action dated Jul. 10, 2019.
U.S. Appl. No. 16/150,099 Office Action dated Jun. 25, 2019.
U.S. Appl. No. 16/178,476 Office Action dated May 30, 2019.
U.S. Appl. No. 16/271,634 Office Action dated Jun. 13, 2019.
U.S. Appl. No. 16/378,363 Office Action dated Jul. 19, 2019.
U.S. Appl. No. 16/436,810 Office Action dated Aug. 9, 2019.
Co-pending U.S. Appl. No. 16/740,207, filed Jan. 10, 2020.
U.S. Appl. No. 15/682,440 Office Action dated Jan. 27, 2020.
U.S. Appl. No. 15/976,600 Office Action dated Jan. 30, 2020.
Co-pending U.S. Appl. No. 16/684,366, filed Nov. 14, 2019.
U.S. Appl. No. 16/162,171 Office Action dated Nov. 4, 2019.
U.S. Appl. No. 16/271,634 Office Action dated Dec. 16, 2019.
U.S. Appl. No. 16/436,810 Office Action dated Dec. 17, 2019.
U.S. Appl. No. 16/526,195 Office Action dated Dec. 27, 2019.
U.S. Appl. No. 16/378,363 Office Action dated Jan. 14, 2020.
Chohlaswood et al. Mining 911 Calls in New York City: Temporal Patterns, Detection and Forecasting. AAAI Conference on Artificial Intelligence Workshop (Apr. 2015).
Co-pending U.S. Appl. No. 16/798,049, filed Feb. 21, 2020.
Hodgkiss et al. Spatiotemporal Analysis of 911 Call Stream Data. Proceedings of the 2005 national conference on Digital government research (2005).
Jasso et al. Prediction of 911 Call Volumes for Emergency Event Detection. Proceedings of the 8th Annual International Digital Government Research Conference (2007).
U.S. Appl. No. 15/371,117 Office Action dated Apr. 3, 2020.
U.S. Appl. No. 16/384,600 Office Action dated Apr. 2, 2020.
U.S. Appl. No. 16/421,355 Office Action dated Feb. 4, 2020.
U.S. Appl. No. 16/740,207 Office Action dated Mar. 11, 2020.

* cited by examiner

METHOD AND SYSTEM FOR SITUATIONAL AWARENESS FOR EMERGENCY RESPONSE

CROSS-REFERENCE

This application is a continuation of U.S. patent application Ser. No. 15/667,531, filed Aug. 2, 2017, which is a continuation of U.S. patent application Ser. No. 15/466,710, filed Mar. 22, 2017, now U.S. Pat. No. 9,756,169, issued Sep. 5, 2017, which is a continuation of U.S. patent application Ser. No. 15/342,093, filed Nov. 2, 2016, now U.S. Pat. No. 9,659,484 issued May 23, 2017, which claims the benefit of U.S. Provisional Application No. 62/249,551, filed Nov. 2, 2015, U.S. Provisional Application No. 62/274,571, filed Jan. 4, 2016, and U.S. Provisional Application No. 62/311,719, filed Mar. 22, 2016, the contents of each of which is hereby incorporated herein by reference.

BACKGROUND OF THE INVENTION

People in emergencies may request help by calling a designated emergency number, for example, a three-digit number like 911 or a direct local access telephone number (i.e., a telephone number tied to a specific emergency dispatch center). With the advent of mobile communication devices (e.g., mobile phones or wearable devices), emergency dispatch centers are receiving a large number of calls from such devices but are poorly equipped to augment their ability to respond to emergencies using currently available technologies.

SUMMARY OF THE INVENTION

Present day wearable devices (e.g., the Apple Watch®) include capabilities to sense and measure health indicators about a user. Such health indicators may include pulse-rate, heart-rate, elevation, movement patterns, the amount of daily movement, temperature, and blood oxygen levels. Present day wearable devices may measure such health indicators using sensors, such as photodetectors operating in the visible and infrared spectrums of light to measure reflection back of certain light emitted by the device, and accelerometers to measure displacement of the device. Wearable devices may also include geographic positioning systems such as GPS to track the geographic location of the device.

Increasingly, many residential spaces, office buildings, and public spaces are equipped with a variety of sensors, for example, temperature sensors or motion sensors. In many instances, these sensors also have the ability to communicate their sensed information over wireless channels, for example, over Bluetooth® or Wi-Fi communication, or over wired channels, for example, fiber optic cables using Ethernet technologies. In some instances, the sensors are also able to communicate with each other by forming an ad hoc wireless mesh network within a home or an office building and thus share a multitude of sensed information with each other.

In one aspect, described herein is a system comprising: a communication device; a wearable device comprising at least one processor, a memory, at least one sensor, a network element, a user interface, and instructions executable by the at least one processor to create an emergency alert application comprising: a sensor module receiving data from the at least one sensor; an interface module receiving at least one emergency indication from the user interface; and a communication module establishing an indirect communication link with an emergency management system, the communication link: sending an alert to the communication device for delivery to the emergency management system, wherein the alert comprises the at least one emergency indication, data from the at least one sensor, and location information from the wearable device or the communication device; receiving at least one data request from the communication device, wherein the data request originates from the emergency management system; and responding to the at least one data request by sending updated data from the at least one sensor to the communication device for delivery to the emergency management system to provide situational awareness during an emergency response; a server configured to provide an emergency management system application comprising: an alert module receiving an alert from a communication device, wherein said alert originates from a wearable device, wherein said alert comprises at least one emergency indication, data from the at least one sensor, and location information from the wearable device or the communication device; an update module sending at least one data request to the communication device for delivery to the wearable device and receiving updated data from the communication device that originates from the at least one sensor of the wearable device. In some embodiments, the communication device comprises an indirect communication link module receiving an alert from the wearable device and delivering the alert to the emergency management system, wherein the alert is transmitted as a digital signal. In further embodiments, the communication device is selected from the group consisting of: mobile phone, computer, router, server, game console, Bluetooth device, infrared device, and modem. In even further embodiments, the communication device is a mobile phone. In some embodiments, the communication link sends an alert to a communication device for delivery to an emergency management system. In some embodiments, the communication device requires authentication for the wearable device to establish a communication link. In further embodiments, the wearable device enables a user to provide authentication to the communication device to establish a communication link. In some embodiments, the communication module selects a communication device from a list of communication devices for receiving the alert. In further embodiments, the communication module selects a communication device based on proximity to the emergency management system. In even further embodiments, proximity is calculated from the latency of communications between the communication device and the emergency management system. In further embodiments, the list of communication devices comprises devices suitable for communicating with the wearable device. In further embodiments, the communication module selects a communication device suitable for directly communicating with wearable device based on communication link quality, wherein the each communication device is scored according to one or more factors relevant to communication link quality between each communication device and the wearable device. In even further embodiments, the one or more factors are selected from the group consisting of: signal strength, channel latency, error rate, availability of wireless or wired channels for communication between the wearable device and the communication device, and transmission delay between the wearable device and the communication device. In some embodiments, the indirect communication link further comprises sending an alert to a routing device for delivery to a communication device when no communication device suitable for directly communicating with the wearable device is available. In further embodiments, the communication module selects a routing device from a list of routing devices for receiving the alert. In even further embodiments, the communication module selects a routing device based on proximity to the emergency management system. In still further embodiments, proximity is calculated from the latency of communications between the routing device and the emergency management system. In even further embodiments, the list of routing devices comprises devices suitable for communicating with the wearable device. In still further embodiments, the communication module selects a routing device suitable for directly communicating with the wearable device based on communication link quality, wherein the each routing device is scored according to one or more factors relevant to communication link quality between each routing device and the emergency alert device. In still further embodiments, the one or more factors are selected from the group consisting of: signal strength, channel latency, error rate, availability of wireless or wired channels for communication between the wearable device and the routing device, and transmission delay between the wearable device and the routing device. In some embodiments, a user uses a communication device to send an alert comprising data from the at least one sensor. In some embodiments, the alert comprises at least one multimedia message. In further embodiments, the at least one multimedia message comprises a plurality of data types. In even further embodiments, the plurality of data types is one or more of: text, sound, image, video, meta-data, user-inputted data, locational information, or a combination thereof. In still further embodiments, the wearable device provides at least one of the plurality of data types in the multimedia message. In still further embodiments, the communication device provides at least one of the plurality of data types in the multimedia message. In some embodiments, the alert delivered to the emergency management system comprises information about the communication device, wherein the information is selected from the group consisting of: location, identity of a user of the communication device, and relationship between a user of the communication device and a user of the wearable device. In further embodiments, the emergency management system converts the multimedia message into a compatible format before delivering the multimedia message to an emergency dispatch center. In some embodiments, the user interface provides a plurality of emergency indications for the user to select from, wherein each said indication connotes a different type of emergency situation. In further embodiments, the type of emergency situation is selected from the group consisting of: medical, police, fire, and vehicle accident. In even further embodiments, the type of emergency situation is selected from the group consisting of: natural disaster, earthquake, fire, flood, tornado, hurricane, sink hole, tsunami, thunderstorm, hail storm, whirlpool, cardiac arrest, stroke, seizure, anaphylactic shock, cut, abrasion, contusion, stab wound, bug bite, snake bite, animal attack, robbery, armed robbery, home invasion, battery, terrorist attack, chemical spill, explosion, gas leak, and drowning. In some embodiments, the user interface comprises a panic option, wherein an alert is transmitted immediately through all available channels and communication links upon selection of the panic option. In some embodiments, the at least one sensor detects at least one physiological parameter of a user. In some embodiments, the at least one sensor detects at least two, three, four, five, six, seven, eight, nine, or ten physiological parameters of a user. In some embodiments, the at least one physiological parameter is selected from the group consisting of: pulse rate, blood pressure, skin temperature, ear temperature, sweat characteristics, salt levels in sweat, pupil dilation, respiration rate, blood oxygen level, blood alcohol level, and blood glucose level of the user. In further embodiments, the sensor is configured to detect at least one environmental parameter. In some embodiments, the environmental parameter is selected from the group consisting of: light, motion, temperature, pressure, humidity, vibration, magnetic field, sound, smoke, carbon monoxide, radiation, hazardous chemicals, acid, base, reactive compounds, volatile organic compounds, and smog. In some embodiments, the system further comprises a sensor database storing data collected by at least one sensor. In further embodiments, each sensor in the database is assigned a universal calling number. In even further embodiments, a communication device or an emergency management system can place a data call to the universal calling number of the sensor to request data. In further embodiments, the data comprises real-time data obtained from the at least one sensor. In further embodiments, the data comprises historical sensor data obtained from the at least one sensor. In further embodiments, the data comprises real-time and historical data obtained from the at least one sensor. In some embodiments, the at least one sensor is selected from the group of sensors consisting of: an optical, electrical, magnetic, electromagnetic, chemical, electrochemical, UV light, pressure, velocity, sound, thermal, and mechanical sensor. In further embodiments, the sensor readings indicate an emergency situation when a sensor reading falls outside of an alarm threshold, said threshold defined by a range of values. In some embodiments, the at least one sensor is selected from the group consisting of: a heart rate monitor, thermometer, a respirometer, a blood glucose monitor, an electrolyte sensor, an electrical conductance meter, a blood pressure sensor, a blood oxygen sensor, an EMG sensor, an EEG sensor, an ECG sensor, a body hydration sensor, a carbon dioxide sensor, a carbon monoxide sensor, a smoke detector, a blood alcohol sensor, and a Geiger counter. In further embodiments, the sensor readings indicate an emergency situation when a moving average of the sensor readings falls outside of an alarm threshold for a minimum period of time. In further embodiments, the sensor readings indicate an emergency situation when a moving average of the sensor readings falls outside of an alarm threshold, said threshold defined by a range of values. In even further embodiments, the sensor readings indicate an emergency situation when a sensor reading falls outside of an alarm threshold for a minimum period of time. In still further embodiments, the minimum period of time is at least 1 second, at least 2 seconds, at least 3 seconds, at least 4 seconds, at least 5 seconds, at least 6 seconds, at least 7 seconds, at least 8 seconds, at least 9 seconds, at least 10 seconds, at least 11 seconds, at least 12 seconds, at least 13 seconds, at least 14 seconds, at least 15 seconds, at least 30 seconds, at least 45 seconds, at least 60 seconds, at least 2 minutes, at least 3 minutes, at least 4 minutes, at least 5 minutes, at least 10 minutes, at least 20 minutes, at least 30 minutes, at least 40 minutes, at least 50 minutes, or at least 60 minutes. In further embodiments, the alarm threshold is set by user input. In further embodiments, the alarm threshold is calculated using historical data from the at least one sensor. In some embodiments, the wearable device sends an alert autonomously without user input when data from the at least one sensor indicates an emergency situation. In further embodiments, the minimum period of time is at least 1 second, at least 2 seconds, at least 3 seconds, at least 4 seconds, at least 5 seconds, at least 6 seconds, at least 7 seconds, at least 8 seconds, at least 9 seconds, at least 10 seconds, at least 11 seconds, at least 12 seconds, at least 13 seconds, at least 14 seconds, at least 15 seconds, at least 30 seconds, at least 45 seconds, at least 60 seconds, at least 2 minutes, at least 3 minutes, at least 4 minutes, at least 5 minutes, at least 10 minutes, at least 20 minutes, at least 30 minutes, at least 40 minutes, at least 50 minutes, or at least 60 minutes. In further embodiments, the alarm threshold is set by user input. In further embodiments, the alarm threshold is calculated using historical data from the at least one sensor. In some embodiments, the emergency management service delivers the alert to an emergency dispatch center. In further embodiments, the emergency management service selects an emergency dispatch center to receive the alert from a plurality of emergency dispatch centers based on emergency response ability. In even further embodiments, the emergency response ability is based on criteria selected from the group consisting of: proximity to the location of the emergency, resource availability, staff availability, and calculated time to arrival of an emergency response. In further embodiments, the alert comprises a multimedia message. In further embodiments, the emergency management system converts the multimedia message to a format compatible with an emergency dispatch center before delivering the message. In even further embodiments, the format compatible with an emergency dispatch center is an analog format. In still further embodiments, the analog format is audio, wherein the message is converted into an audio message comprising the emergency indication and sensor readings. In some embodiments, the wearable device is adapted to be wearable by a human. In some embodiments, the wearable device is adapted to be wearable by a bird or animal. In some embodiments, the wearable device adapted to be wearable by a pet. In some embodiments, the wearable device is adapted to be wearable on the hand, finger, palm, wrist, elbow, arm, shoulder, neck, head, face, nose, ear, torso, chest, back, waist, hips, leg, knee, ankle, or foot. In some embodiments, an alert can be cancelled after being delivered to an emergency management system. In further embodiments, an alert is cancelled by a user of the wearable device. In further embodiments, an alert is cancelled by a user of the wearable device upon authentication. In further embodiments, an alert is cancelled by the emergency management system. In further embodiments, an alert is cancelled automatically by the wearable device, wherein the device predicts that the alert was sent accidentally. In even further embodiments, the device predicts the alert was sent accidentally based on factors selected from the group consisting of: sensor data contradicting an emergency indication from the user interface, sensor malfunction, conflicting data from a plurality of sensors. In some embodiments, an alert is cancelled when no communication device or routing device capable of delivering the alert to a communication device is available. In some embodiments, the communication module manages the indirect communication link with the emergency management service upon transmission of an alert by responding to requests for updated data. In some embodiments, the communication module sends updated data to the emergency management system automatically without a data request from the emergency management system. In some embodiments, the communication module sends updated data to the emergency management service upon user input. In some embodiments, the updated data comprises sensor readings from the at least one sensor. In further embodiments, the sensor readings comprise live sensor readings. In further embodiments, the sensor readings comprise historical sensor readings.

In one aspect, described herein is a wearable device for requesting emergency assistance comprising: at least one processor, a memory, a user interface, at least one sensor, and a network element, and a computer program including instructions executable by the at least one processor to create an emergency alert application comprising: a sensor module receiving data from the at least one sensor; an interface module receiving at least one emergency indication from the user interface; and a communication module establishing an indirect communication link with an emergency management system, the communication link: sending an alert to a communication device distinct from the wearable device for delivery to the emergency management system, wherein the alert comprises the at least one emergency indication, data from the at least one sensor, and location information from the wearable device or the communication device; receiving at least one data request from the communication device, wherein the data request originates from the emergency management system; and responding to the at least one data request by sending updated data from the at least one sensor to the communication device for delivery to the emergency management system to provide situational awareness during an emergency response. In some embodiments, the communication device is selected from the group consisting of: mobile phone, computer, router, server, game console, Bluetooth device, infrared device, and modem. In further embodiments, the communication device is a mobile phone. In some embodiments, the communication device requires authentication for the wearable device to establish a communication link. In further embodiments, the wearable device enables a user to provide authentication to the communication device to establish a communication link. In some embodiments, the communication module selects a communication device from a list of communication devices for receiving the alert. In further embodiments, the communication module selects a communication device based on proximity to the emergency management system. In even further embodiments, proximity is calculated from the latency of communications between the communication device and the emergency management system. In further embodiments, the list of communication devices comprises devices suitable for communicating with the wearable device. In further embodiments, the communication module selects a communication device suitable for directly communicating with wearable device based on communication link quality, wherein the each communication device is scored according to one or more factors relevant to communication link quality between each communication device and the wearable device. In further embodiments, the one or more factors are selected from the group consisting of: signal strength, channel latency, error rate, availability of wireless or wired channels for communication between the wearable device and the communication device, and transmission delay between the wearable device and the communication device. In some embodiments, the indirect communication link further comprises sending an alert to a routing device for delivery to a communication device when no communication device suitable for directly communicating with the wearable device is available. In further embodiments, the communication module selects a routing device from a list of routing devices for receiving the alert. In even further embodiments, the communication module selects a routing device based on proximity to the emergency management system. In still further embodiments, proximity is calculated from the latency of communications between the routing device and the emergency management system. In further embodiments, the list of routing devices comprises devices suitable for communicating with the wearable device. In further embodiments, the communication module selects a routing device suitable for directly communicating with the wearable device based on communication link quality, wherein the each routing device is scored according to one or more factors relevant to communication link quality between each routing device and the emergency alert device. In further embodiments, the one or more factors are selected from the group consisting of: signal strength, channel latency, error rate, availability of wireless or wired channels for communication between the wearable device and the routing device, and transmission delay between the wearable device and the routing device. In some embodiments, a user uses a communication device to send an alert comprising data from the at least one sensor. In some embodiments, the alert comprises at least one multimedia message. In further embodiments, the at least one multimedia message comprises a plurality of data types. In even embodiments, the plurality of data types is one or more of: text, sound, image, video, meta-data, user-inputted data, locational information, or a combination thereof. In still further embodiments, the wearable device provides at least one of the plurality of data types in the multimedia message. In some embodiments, the alert delivered to the emergency management system comprises information about the communication device, wherein the information is selected from the group consisting of: location, identity of a user of the communication device, and relationship between a user of the communication device and a user of the wearable device. In some embodiments, the user interface provides a plurality of emergency indications for the user to select from, wherein each said indication connotes a different type of emergency situation. In further embodiments, the type of emergency situation is selected from the group consisting of: medical, police, fire, and vehicle accident. In even further embodiments, the type of emergency situation is selected from the group consisting of: natural disaster, earthquake, fire, flood, tornado, hurricane, sink hole, tsunami, thunderstorm, hail storm, whirlpool, cardiac arrest, stroke, seizure, anaphylactic shock, cut, abrasion, contusion, stab wound, bug bite, snake bite, animal attack, robbery, armed robbery, home invasion, battery, terrorist attack, chemical spill, explosion, gas leak, and drowning. In some embodiments, the user interface comprises a panic option, wherein an alert is transmitted immediately through all available channels and communication links upon selection of the panic option. In some embodiments, at least one sensor detects at least one physiological parameter of a user. In further embodiments, the at least one sensor detects at least two, three, four, five, six, seven, eight, nine, or ten physiological parameters of a user. In further embodiments, the at least one physiological parameter is selected from the group consisting of: pulse rate, blood pressure, skin temperature, ear temperature, sweat characteristics, salt levels in sweat, pupil dilation, respiration rate, blood oxygen level, blood alcohol level, and blood glucose level of the user. In some embodiments, the sensor is configured to detect at least one environmental parameter. In further embodiments, the environmental parameter is selected from the group consisting of: light, motion, temperature, pressure, humidity, vibration, magnetic field, sound, smoke, carbon monoxide, radiation, hazardous chemicals, acid, base, reactive compounds, volatile organic compounds, and smog. In some embodiments, the device further comprises a sensor database storing data collected by the at least one sensor. In further embodiments, each sensor in the database is assigned a universal calling number. In even further embodiments, wearable device can receive a data call to the universal calling number of the sensor. In further embodiments, the data comprises real-time data obtained from the at least one sensor. In further embodiments, the data comprises historical sensor data obtained from the at least one sensor. In further embodiments, the data comprises real-time and historical data obtained from the at least one sensor. In some embodiments, the at least one sensor is selected from the group of sensors consisting of: an optical, electrical, magnetic, electromagnetic, chemical, electrochemical, UV light, pressure, velocity, sound, thermal, and mechanical sensor. In some embodiments, the at least one sensor is selected from the group consisting of: a heart rate monitor, thermometer, a respirometer, a blood glucose monitor, an electrolyte sensor, an electrical conductance meter, a blood pressure sensor, a blood oxygen sensor, an EMG sensor, an EEG sensor, an ECG sensor, a body hydration sensor, a carbon dioxide sensor, a carbon monoxide sensor, a smoke detector, a blood alcohol sensor, and a Geiger counter. In some embodiments, the wearable device sends an alert autonomously without user input when data from the at least one sensor indicates an emergency situation. In further embodiments, the sensor readings indicate an emergency situation when a sensor reading falls outside of an alarm threshold, said threshold defined by a range of values. In even further embodiments, the sensor readings indicate an emergency situation when a moving average of the sensor readings falls outside of an alarm threshold, said threshold defined by a range of values. In even further embodiments, the sensor readings indicate an emergency situation when a sensor reading falls outside of an alarm threshold for a minimum period of time. In still further embodiments, the minimum period of time is at least 1 second, at least 2 seconds, at least 3 seconds, at least 4 seconds, at least 5 seconds, at least 6 seconds, at least 7 seconds, at least 8 seconds, at least 9 seconds, at least 10 seconds, at least 11 seconds, at least 12 seconds, at least 13 seconds, at least 14 seconds, at least 15 seconds, at least 30 seconds, at least 45 seconds, at least 60 seconds, at least 2 minutes, at least 3 minutes, at least 4 minutes, at least 5 minutes, at least 10 minutes, at least 20 minutes, at least 30 minutes, at least 40 minutes, at least 50 minutes, or at least 60 minutes. In even further embodiments, the alarm threshold is set by user input. In further embodiments, the alarm threshold is calculated using historical data from the at least one sensor. In some embodiments, the wearable device is adapted to be wearable by a human. In some embodiments, the wearable device is adapted to be wearable by a bird or animal. In some embodiments, the wearable device adapted to be wearable by a pet. In some embodiments, the wearable device is adapted to be wearable on the hand, finger, palm, wrist, elbow, arm, shoulder, neck, head, face, nose, ear, torso, chest, back, waist, hips, leg, knee, ankle, or foot. In some embodiments, an alert can be cancelled after being delivered to an emergency management system. In further embodiments, an alert is cancelled by a user of the wearable device. In further embodiments, an alert is cancelled by a user of the wearable device upon authentication. In further embodiments, an alert is cancelled automatically by the wearable device, wherein the device predicts that the alert was sent accidentally. In even further embodiments, the device predicts the alert was sent accidentally based on factors selected from the group consisting of: sensor data contradicting an emergency indication from the user interface, sensor malfunction, conflicting data from a plurality of sensors. In some embodiments, an alert is cancelled when no communication device or routing device capable of delivering the alert to a communication device is available. In some embodiments, the communication module manages the indirect communication link with the emergency management service upon transmission of an alert by responding to requests for updated data. In some embodiments, the communication module sends updated data to the emergency management system automatically without a data request from the emergency management system. In some embodiments, the communication module sends updated data to the emergency management service upon user input. In some embodiments, the updated data comprises sensor readings from the at least one sensor. In further embodiments, the sensor readings comprise live sensor readings. In further embodiments, the sensor readings comprise historical sensor readings. In some embodiments, the updated data comprise location information. In further embodiments, the location information comprises a current location of the wearable device. In even further embodiments, the location information comprises a current location of the communication device. In further embodiments, the location information comprises one or more historical locations of the wearable device. In further embodiments, the location information comprises one or more historical locations of the communication device. In some embodiments, the device further comprises at least one external sensor, wherein the at least one external sensor is distinct from the wearable device. In further embodiments, the at least one external sensor is in the vicinity of the wearable device. In further embodiments, the at least one external sensor is assigned a universal calling number, wherein an emergency management system or a communication device can request data from the at least one external sensor by calling the universal calling number. In further embodiments, the at least one external sensor comprises a plurality of sensors. In even further embodiments, the plurality of sensors form a network of sensors. In still further embodiments, the network is a wireless network. In still further embodiments, the network is an ad hoc wireless mesh network. In still further embodiments, the wearable device is in communication with the network of external sensors. In still further embodiments, the communication device is in communication with the network of external sensors. In still further embodiments, the emergency management system is in communication with the network of external sensors. In still further embodiments, the sensor network is selected from the group consisting of: Internet of Things network, wireless sensor network, wired sensor network, a combination wired and wireless sensor network, and wireless sensor and actuator network. In further embodiments, the wearable device maintains a list of external sensors for communication. In even further embodiments, the list of external sensors belong to at least one network of external sensors. In further embodiments, the sensor module generates a list of external sensors within communication range. In even further embodiments, the sensor module periodically updates the list of external sensors within communication range. In further embodiments, the wearable device receives alerts or broadcasts from external sensors within communication range. In even further embodiments, the wearable device receives data from the at least one external sensor upon request. In still further embodiments, the wearable device requests data from the at least one external sensor after receiving an emergency indication to obtain situational awareness. In still further embodiments, the data received from the at least one external sensor comprises sensor readings. In still further embodiments, the data received from the at least one external sensor comprises location information. In further embodiments, the emergency management system maintains a database of external sensors with location information associated with the external sensors. In further embodiments, the sensor module begins requesting data from external sensors when a sensor reading of the wearable device indicates an emergency situation. In further embodiments, the at least one external sensor broadcasts an alert requesting emergency assistance upon receiving a request an alert requesting emergency assistance from another sensor. In even further embodiments, the at least one external sensor updates the broadcasted alert with updated data from the at least one external sensor. In even further embodiments, the at least one external sensor updates the broadcasted alert with updated data from the sensor sending the request. In further embodiments, the at least one external sensor sends data to the emergency management system upon request. In further embodiments, the at least one external sensor sends updated data to the emergency management system upon request. In some embodiments, the wearable device uses angles of arrival of signals from other devices received by the wearable device to calculate relative positioning of the wearable device with respect to the other devices in the vicinity. In some embodiments, the wearable device autonomously sends a warning to a user before sending an alert when sensor readings indicate an emergency situation, wherein the user decides whether to send the alert. In some embodiments, the emergency management system is an emergency dispatch center. In one aspect, a method for sending an emergency alert from a sensor is disclosed. In some embodiments, the method includes sensing a parameter by the sensor, where the parameter is a health indicator of the user or one or more environmental characteristics. In further embodiments, the method includes comparing the parameter to one or more predefined ranges. In further embodiments, an emergency alert may be triggered when the parameter is outside of the predefined alarm range or a warning signal may be triggered when the parameter is outside the predefined warning range. In some embodiments, the method includes scanning the airways around the sensor to locate one or more communicating devices and selecting a communication device among them. In some embodiments, the communication device may be selected based on factors such as a received signal strength indicator (RSSI) of the communication device at the sensor, received signal strength of transmissions from the communication device at the sensor, availability of wireless or wired channels for communication between the sensor and the communication device, transmission delay on the communication link between the sensor and the communication device, and other factors indicative of quality of a communication link between the sensor and the communication device.

In another aspect, provided herein are methods for sending an alert from a wearable device to an emergency management system by using a communication device to establish an indirect communication link, the method comprising: receiving, by the wearable device, data from at least one sensor associated with the wearable device; receiving, by the wearable device, at least one emergency indication initiated by a user interacting with the wearable device; sending, by the wearable device, an alert to the communication device for delivery to the emergency management system, wherein the alert comprises the at least one emergency indication, data from the at least one sensor, and location information from the wearable device or the communication device; receiving, by the wearable device, at least one data request from the communication device, wherein the data request originates from the emergency management system; and responding, by the wearable device, to the at least one data request by transmitting updated data from the at least one sensor to the communication device for delivery to the emergency management system to provide situational awareness during an emergency response. In some embodiments, the communication device is selected from the group consisting of: mobile phone, computer, router, server, game console, Bluetooth device, infrared device, and modem. In further embodiments, the communication device is a mobile phone. In some embodiments, the communication link sends an alert to a communication device for delivery to an emergency management system. In some embodiments, the communication device requires authentication for the wearable device to establish a communication link. In some embodiments, the wearable device enables a user to provide authentication to the communication device to establish a communication link. In some embodiments, the communication module selects a communication device from a list of communication devices for receiving the alert. In further embodiments, the communication module selects a communication device based on proximity to the emergency management system. In further embodiments, proximity is calculated from the latency of communications between the communication device and the emergency management system. In some embodiments, the list of communication devices comprises devices suitable for communicating with the wearable device. In further embodiments, the communication module selects a communication device suitable for directly communicating with wearable device based on communication link quality, wherein the each communication device is scored according to one or more factors relevant to communication link quality between each communication device and the wearable device. In some embodiments, the one or more factors are selected from the group consisting of: signal strength, channel latency, error rate, availability of wireless or wired channels for communication between the wearable device and the communication device, and transmission delay between the wearable device and the communication device. In some embodiments, the indirect communication link further comprises sending an alert to a routing device for delivery to a communication device when no communication device suitable for directly communicating with the wearable device is available. In some embodiments, the communication module selects a routing device from a list of routing devices for receiving the alert. In some embodiments, the communication module selects a routing device based on proximity to the emergency management system. In some embodiments, proximity is calculated from the latency of communications between the routing device and the emergency management system. In some embodiments, the list of routing devices comprises devices suitable for communicating with the wearable device. In some embodiments, the communication module selects a routing device suitable for directly communicating with the wearable device based on communication link quality, wherein the each routing device is scored according to one or more factors relevant to communication link quality between each routing device and the emergency alert device. In some embodiments, the one or more factors are selected from the group consisting of: signal strength, channel latency, error rate, availability of wireless or wired channels for communication between the wearable device and the routing device, and transmission delay between the wearable device and the routing device. In some embodiments, a user uses a communication device to send an alert comprising data from the at least one sensor. In some embodiments, the alert comprises at least one multimedia message. In some embodiments, the at least one multimedia message comprises a plurality of data types. In further embodiments, the plurality of data types is one or more of: text, sound, image, video, meta-data, user-inputted data, locational information, or a combination thereof. In some embodiments, the alert delivered to the emergency management system comprises information about the communication device, wherein the information is selected from the group consisting of: location, identity of a user of the communication device, and relationship between a user of the communication device and a user of the wearable device. In some embodiments, the user interface provides a plurality of emergency indications for the user to select from, wherein each said indication connotes a different type of emergency situation. In some embodiments, the type of emergency situation is selected from the group consisting of: medical, police, fire, and vehicle accident. In further embodiments, the type of emergency situation is selected from the group consisting of: natural disaster, earthquake, fire, flood, tornado, hurricane, sink hole, tsunami, thunderstorm, hail storm, whirlpool, cardiac arrest, stroke, seizure, anaphylactic shock, cut, abrasion, contusion, stab wound, bug bite, snake bite, animal attack, robbery, armed robbery, home invasion, battery, terrorist attack, chemical spill, explosion, gas leak, and drowning. In some embodiments, the user interface comprises a panic option, wherein an alert is transmitted immediately through all available channels and communication links upon selection of the panic option. In some embodiments, the at least one sensor detects at least one physiological parameter of a user. In further embodiments, the at least one sensor detects at least two, three, four, five, six, seven, eight, nine, or ten physiological parameters of a user. In further embodiments, the at least one physiological parameter is selected from the group consisting of: pulse rate, blood pressure, skin temperature, ear temperature, sweat characteristics, salt levels in sweat, pupil dilation, respiration rate, blood oxygen level, blood alcohol level, and blood glucose level of the user. In some embodiments, the sensor is configured to detect at least one environmental parameter. In further embodiments, the environmental parameter is selected from the group consisting of: light, motion, temperature, pressure, humidity, vibration, magnetic field, sound, smoke, carbon monoxide, radiation, hazardous chemicals, acid, base, reactive compounds, volatile organic compounds, and smog. In some embodiments, comprising a sensor database storing data collected by the at least one sensor. In further embodiments, each sensor in the database is assigned a universal calling number. In further embodiments, a communication device or an emergency management system can place a data call to the universal calling number of the sensor to request data. In some embodiments, the data comprises real-time data obtained from the at least one sensor. In some embodiments, the data comprises historical sensor data obtained from the at least one sensor. In some embodiments, the data comprises real-time and historical data obtained from the at least one sensor. In some embodiments, the at least one sensor is selected from the group of sensors consisting of: an optical, electrical, magnetic, electromagnetic, chemical, electrochemical, UV light, pressure, velocity, sound, thermal, and mechanical sensor. In some embodiments, the at least one sensor is selected from the group consisting of: a heart rate monitor, thermometer, a respirometer, a blood glucose monitor, an electrolyte sensor, an electrical conductance meter, a blood pressure sensor, a blood oxygen sensor, an EMG sensor, an EEG sensor, an ECG sensor, a body hydration sensor, a carbon dioxide sensor, a carbon monoxide sensor, a smoke detector, a blood alcohol sensor, and a Geiger counter. In some embodiments, the wearable device sends an alert autonomously without user input when data from the at least one sensor indicates an emergency situation. In further embodiments, the sensor readings indicate an emergency situation when a sensor reading falls outside of an alarm threshold, said threshold defined by a range of values. In some embodiments, the sensor readings indicate an emergency situation when a moving average of the sensor readings falls outside of an alarm threshold, said threshold defined by a range of values. In some embodiments, the sensor readings indicate an emergency situation when a sensor reading falls outside of an alarm threshold for a minimum period of time. In some embodiments, the minimum period of time is at least 1 second, at least 2 seconds, at least 3 seconds, at least 4 seconds, at least 5 seconds, at least 6 seconds, at least 7 seconds, at least 8 seconds, at least 9 seconds, at least 10 seconds, at least 11 seconds, at least 12 seconds, at least 13 seconds, at least 14 seconds, at least 15 seconds, at least 30 seconds, at least 45 seconds, at least 60 seconds, at least 2 minutes, at least 3 minutes, at least 4 minutes, at least 5 minutes, at least 10 minutes, at least 20 minutes, at least 30 minutes, at least 40 minutes, at least 50 minutes, or at least 60 minutes. In some embodiments, the sensor readings indicate an emergency situation when a moving average of the sensor readings falls outside of an alarm threshold for a minimum period of time. In some embodiments, the minimum period of time is at least 1 second, at least 2 seconds, at least 3 seconds, at least 4 seconds, at least 5 seconds, at least 6 seconds, at least 7 seconds, at least 8 seconds, at least 9 seconds, at least 10 seconds, at least 11 seconds, at least 12 seconds, at least 13 seconds, at least 14 seconds, at least 15 seconds, at least 30 seconds, at least 45 seconds, at least 60 seconds, at least 2 minutes, at least 3 minutes, at least 4 minutes, at least 5 minutes, at least 10 minutes, at least 20 minutes, at least 30 minutes, at least 40 minutes, at least 50 minutes, or at least 60 minutes. In some embodiments, the alarm threshold is set by user input. In some embodiments, the alarm threshold is set by user input. In some embodiments, the alarm threshold is calculated using historical data from the at least one sensor. In some embodiments, the alarm threshold is calculated using historical data from the at least one sensor. In some embodiments, the wearable device is adapted to be wearable by a human. In some embodiments, the wearable device is adapted to be wearable by a bird or animal. In some embodiments, the wearable device adapted to be wearable by a pet. In some embodiments, the wearable device is adapted to be wearable on the hand, finger, palm, wrist, elbow, arm, shoulder, neck, head, face, nose, ear, torso, chest, back, waist, hips, leg, knee, ankle, or foot. In some embodiments, an alert is cancelled automatically by the wearable device, wherein the device predicts that the alert was sent accidentally. In some embodiments, the device predicts the alert was sent accidentally based on factors selected from the group consisting of: sensor data contradicting an emergency indication from the user interface, sensor malfunction, conflicting data from a plurality of sensors. The method of claim 1, wherein an alert is cancelled when no communication device or routing device capable of delivering the alert to a communication device is available. In some embodiments, the communication module manages the indirect communication link with the emergency management service upon transmission of an alert by responding to requests for updated data. In some embodiments, the communication module sends updated data to the emergency management system automatically without a data request from the emergency management system. In some embodiments, the communication module sends updated data to the emergency management service upon user input. In some embodiments, the updated data comprises sensor readings from the at least one sensor. In further embodiments, the sensor readings comprise live sensor readings. In further embodiments, the sensor readings comprise historical sensor readings. In some embodiments, the updated data comprise location information. In some embodiments, the location information comprises a current location of the wearable device. In some embodiments, the location information comprises a current location of the communication device. In some embodiments, the location information comprises one or more historical locations of the wearable device. In some embodiments, the location information comprises one or more historical locations of the communication device. In some embodiments, comprising at least one external sensor, wherein the at least one external sensor is distinct from the wearable device. In some embodiments, the at least one external sensor is in the vicinity of the wearable device. In some embodiments, the at least one external sensor is assigned a universal calling number, wherein an emergency management system or a communication device can request data from the at least one external sensor by calling the universal calling number. In some embodiments, the at least one external sensor comprises a plurality of sensors. In further embodiments, the plurality of sensors form a network of sensors. In some embodiments, the network is a wireless network. In some embodiments, the network is an ad hoc wireless mesh network. In some embodiments, the wearable device is in communication with the network of external sensors. In some embodiments, the communication device is in communication with the network of external sensors. In some embodiments, the emergency management system is in communication with the network of external sensors. In some embodiments, the sensor network is selected from the group consisting of: Internet of Things network, wireless sensor network, wired sensor network, a combination wired and wireless sensor network, and wireless sensor and actuator network. In some embodiments, the wearable device maintains a list of external sensors for communication. In some embodiments, the list of external sensors belong to at least one network of external sensors. In some embodiments, the sensor module generates a list of external sensors within communication range. In further embodiments, the sensor module periodically updates the list of external sensors within communication range. In some embodiments, the wearable device receives alerts or broadcasts from external sensors within communication range. In further embodiments, the wearable device receives data from the at least one external sensor upon request. In some embodiments, the wearable device requests data from the at least one external sensor after receiving an emergency indication to obtain situational awareness. In some embodiments, the data received from the at least one external sensor comprises sensor readings. In some embodiments, the data received from the at least one external sensor comprises location information. In some embodiments, the sensor module begins requesting data from external sensors when a sensor reading of the wearable device indicates an emergency situation. In some embodiments, the at least one external sensor broadcasts an alert requesting emergency assistance upon receiving a request an alert requesting emergency assistance from another sensor. In some embodiments, the at least one external sensor updates the broadcasted alert with updated data from the at least one external sensor. In some embodiments, the at least one external sensor updates the broadcasted alert with updated data from the sensor sending the request. In some embodiments, the at least one external sensor sends data to the emergency management system upon request. In some embodiments, the at least one external sensor sends updated data to the emergency management system upon request. In some embodiments, the wearable device uses angles of arrival of signals from other devices received by the wearable device to calculate relative positioning of the wearable device with respect to the other devices in the vicinity. In some embodiments, the wearable device autonomously sends a warning to a user before sending an alert when sensor readings indicate an emergency situation, wherein the user decides whether to send the alert. In some embodiments, the emergency management system is an emergency dispatch center. In some embodiments, when the communication device is unavailable, the method includes selecting a routing device, based on factors such as a received signal strength of the routing device at the sensor, availability of wireless or wired channels for communication between the sensor and the routing device, ability to authenticate with the routing device, transmission delay on the communication link between the sensor and the routing device, and other factors indicative of quality of a communication link between the sensor and the routing device. In further embodiments, the method includes establishing a communication link to at least one of the communication device or the routing device, wherein the routing device establishes an indirect communication link with a communication device. In some embodiments, the method includes sending one or more of the emergency alert and warning signal via the connected device to an emergency dispatch center (EDC).

In one aspect, described herein are methods for an emergency management system to obtain updated sensor data from a wearable device upon receiving an alert by using a communication device to establish an indirect communication link, the method comprising: receiving, by the emergency management system, an alert from a communication device, wherein said alert originates from a wearable device, wherein said alert comprises at least one emergency indication, data from at least one sensor associated with the wearable device, and location information from the wearable device or the communication device; sending, by the emergency management system, at least one data request to the communication device for delivery to the wearable device; and receiving by the emergency management system updated data from the communication device, wherein the updated data originates from the at least one sensor associated with the wearable device. In some embodiments, the communication device comprises an indirect communication link module receiving an alert from the wearable device and delivering the alert to the emergency management system, wherein the alert is transmitted as a digital signal. In further embodiments, the communication device is selected from the group consisting of: mobile phone, computer, router, server, game console, Bluetooth device, infrared device, and modem. In further embodiments, the communication device is a mobile phone. In some embodiments, the alert comprises at least one multimedia message. In some embodiments, the at least one multimedia message comprises a plurality of data types. In some embodiments, the plurality of data types is one or more of: text, sound, image, video, meta-data, user-inputted data, locational information, or a combination thereof. In further embodiments, the wearable device provides at least one of the plurality of data types in the multimedia message. In some embodiments, the communication device provides at least one of the plurality of data types in the multimedia message. In some embodiments, the alert delivered to the emergency management system comprises information about the communication device, wherein the information is selected from the group consisting of: location, identity of a user of the communication device, and relationship between a user of the communication device and a user of the wearable device. In some embodiments, the emergency management system converts the multimedia message into a compatible format before delivering the multimedia message to an emergency dispatch center. In some embodiments, the emergency management service delivers the alert to an emergency dispatch center. In some embodiments, the emergency management service selects an emergency dispatch center to receive the alert from a plurality of emergency dispatch centers based on emergency response ability. In some embodiments, the emergency response ability is based on criteria selected from the group consisting of: proximity to the location of the emergency, resource availability, staff availability, and calculated time to arrival of an emergency response. In some embodiments, the alert comprises a multimedia message. In some embodiments, the emergency management system converts the multimedia message to a format compatible with an emergency dispatch center before delivering the message. In some embodiments, the format compatible with an emergency dispatch center is an analog format. In some embodiments, the analog format is audio, wherein the message is converted into an audio message comprising the emergency indication and sensor readings. In some embodiments, an alert can be cancelled after being delivered to an emergency management system. In some embodiments, an alert is cancelled by the emergency management system. In some embodiments, emergency management system receives updated data from the wearable device upon user input. In some embodiments, the updated data comprises sensor readings from the at least one sensor. In some embodiments, the sensor readings comprise live sensor readings. In some embodiments, the sensor readings comprise historical sensor readings. In some embodiments, the updated data comprise location information. In some embodiments, the location information comprises a current location of the wearable device. In some embodiments, the location information comprises a current location of the communication device. In some embodiments, the location information comprises one or more historical locations of the wearable device. In some embodiments, the location information comprises one or more historical locations of the communication device. In some embodiments, at least one external sensor is assigned a universal calling number, wherein an emergency management system or a communication device can request data from the at least one external sensor by calling the universal calling number. In another aspect, a system for sending an emergency alert is disclosed. In some embodiments, the system includes a sensor, a communication device and an emergency management system (EMS). In further embodiments, the sensor may have a sensor module and a communication module. In further embodiments, the sensor module may sense one or more parameters and the communication module may be able to establish a communication link. In further embodiments, the communication device may be able to participate in the communication link with the sensor and the communication device is available for sending an emergency alert. In some embodiments, the EMS receives the emergency alert from the communication device for processing and forwarding the emergency alert to an emergency dispatch center (EDC).

In another aspect, described herein are non-transitory computer-readable storage media encoded with a computer program including instructions executable by at least one processor to create an emergency alert application comprising: a sensor module receiving data from at least one sensor associated with a wearable device worn by a user; an interface module receiving at least one emergency indication initiated by the user interacting with a user interface of the wearable device; and a communication module establishing an indirect communication link with an emergency management system, the communication link: sending an alert to a communication device distinct from the wearable device for delivery to the emergency management system, wherein the alert comprises the at least one emergency indication, data from the at least one sensor, and location information from the wearable device or the communication device; receiving at least one data request from the communication device, wherein the data request originates from the emergency management system; and responding to the at least one data request by transmitting updated data from the at least one sensor to the communication device for delivery to the emergency management system to provide situational awareness during an emergency response. In further embodiments, the communication device comprises an indirect communication link module receiving an alert from the wearable device and delivering the alert to the emergency management system, wherein the alert is transmitted as a digital signal. In further embodiments, the communication device is selected from the group consisting of: mobile phone, computer, router, server, game console, Bluetooth device, infrared device, and modem. In further embodiments, the communication device is a mobile phone. In some embodiments, the communication link sends an alert to a communication device for delivery to an emergency management system. In some embodiments, the communication device requires authentication for the wearable device to establish a communication link. In some embodiments, the wearable device enables a user to provide authentication to the communication device to establish a communication link. In some embodiments, the communication module selects a communication device from a list of communication devices for receiving the alert. In further embodiments, the communication module selects a communication device based on proximity to the emergency management system. In further embodiments, proximity is calculated from the latency of communications between the communication device and the emergency management system. In some embodiments, the list of communication devices comprises devices suitable for communicating with the wearable device. In some embodiments, the communication module selects a communication device suitable for directly communicating with wearable device based on communication link quality, wherein the each communication device is scored according to one or more factors relevant to communication link quality between each communication device and the wearable device. In further embodiments, the one or more factors are selected from the group consisting of: signal strength, channel latency, error rate, availability of wireless or wired channels for communication between the wearable device and the communication device, and transmission delay between the wearable device and the communication device. In some embodiments, the indirect communication link further comprises sending an alert to a routing device for delivery to a communication device when no communication device suitable for directly communicating with the wearable device is available. In some embodiments, the communication module selects a routing device from a list of routing devices for receiving the alert. In some embodiments, the communication module selects a routing device based on proximity to the emergency management system. In further embodiments, proximity is calculated from the latency of communications between the routing device and the emergency management system. In some embodiments, the list of routing devices comprises devices suitable for communicating with the wearable device. In some embodiments, the communication module selects a routing device suitable for directly communicating with the wearable device based on communication link quality, wherein the each routing device is scored according to one or more factors relevant to communication link quality between each routing device and the emergency alert device. In further embodiments, the one or more factors are selected from the group consisting of: signal strength, channel latency, error rate, availability of wireless or wired channels for communication between the wearable device and the routing device, and transmission delay between the wearable device and the routing device. In some embodiments, a user uses a communication device to send an alert comprising data from the at least one sensor. In some embodiments, the alert comprises at least one multimedia message. In further embodiments, the at least one multimedia message comprises a plurality of data types. In further embodiments, the plurality of data types is one or more of: text, sound, image, video, meta-data, user-inputted data, locational information, or a combination thereof. In some embodiments, the wearable device provides at least one of the plurality of data types in the multimedia message. In some embodiments, the communication device provides at least one of the plurality of data types in the multimedia message. In some embodiments, the alert delivered to the emergency management system comprises information about the communication device, wherein the information is selected from the group consisting of: location, identity of a user of the communication device, and relationship between a user of the communication device and a user of the wearable device. In further embodiments, the emergency management system converts the multimedia message into a compatible format before delivering the multimedia message to an emergency dispatch center. In some embodiments, the user interface provides a plurality of emergency indications for the user to select from, wherein each said indication connotes a different type of emergency situation. In some embodiments, the type of emergency situation is selected from the group consisting of: medical, police, fire, and vehicle accident. In some embodiments, the type of emergency situation is selected from the group consisting of: natural disaster, earthquake, fire, flood, tornado, hurricane, sink hole, tsunami, thunderstorm, hail storm, whirlpool, cardiac arrest, stroke, seizure, anaphylactic shock, cut, abrasion, contusion, stab wound, bug bite, snake bite, animal attack, robbery, armed robbery, home invasion, battery, terrorist attack, chemical spill, explosion, gas leak, and drowning. In some embodiments, the user interface comprises a panic option, wherein an alert is transmitted immediately through all available channels and communication links upon selection of the panic option. In some embodiments, at least one sensor detects at least one physiological parameter of a user. In further embodiments, the at least one sensor detects at least two, three, four, five, six, seven, eight, nine, or ten physiological parameters of a user. In some embodiments, the at least one physiological parameter is selected from the group consisting of: pulse rate, blood pressure, skin temperature, ear temperature, sweat characteristics, salt levels in sweat, pupil dilation, respiration rate, blood oxygen level, blood alcohol level, and blood glucose level of the user. In some embodiments, the sensor is configured to detect at least one environmental parameter. In further embodiments, the environmental parameter is selected from the group consisting of: light, motion, temperature, pressure, humidity, vibration, magnetic field, sound, smoke, carbon monoxide, radiation, hazardous chemicals, acid, base, reactive compounds, volatile organic compounds, and smog. In some embodiments, the application further comprises a sensor database storing data collected by the at least one sensor. In some embodiments, each sensor in the database is assigned a universal calling number. In some embodiments, a communication device or an emergency management system can place a data call to the universal calling number of the sensor to request data. In some embodiments, the data comprises real-time data obtained from the at least one sensor. In some embodiments, the data comprises historical sensor data obtained from the at least one sensor. In some embodiments, the data comprises real-time and historical data obtained from the at least one sensor. In some embodiments, the at least one sensor is selected from the group of sensors consisting of: an optical, electrical, magnetic, electromagnetic, chemical, electrochemical, UV light, pressure, velocity, sound, thermal, and mechanical sensor. In some embodiments, the at least one sensor is selected from the group consisting of: a heart rate monitor, thermometer, a respirometer, a blood glucose monitor, an electrolyte sensor, an electrical conductance meter, a blood pressure sensor, a blood oxygen sensor, an EMG sensor, an EEG sensor, an ECG sensor, a body hydration sensor, a carbon dioxide sensor, a carbon monoxide sensor, a smoke detector, a blood alcohol sensor, and a Geiger counter. In some embodiments, the wearable device sends an alert autonomously without user input when data from the at least one sensor indicates an emergency situation. In some embodiments, the sensor readings indicate an emergency situation when a sensor reading falls outside of an alarm threshold, said threshold defined by a range of values. In further embodiments, the sensor readings indicate an emergency situation when a moving average of the sensor readings falls outside of an alarm threshold, said threshold defined by a range of values. In some embodiments, the sensor readings indicate an emergency situation when a sensor reading falls outside of an alarm threshold for a minimum period of time. In further embodiments, the minimum period of time is at least 1 second, at least 2 seconds, at least 3 seconds, at least 4 seconds, at least 5 seconds, at least 6 seconds, at least 7 seconds, at least 8 seconds, at least 9 seconds, at least 10 seconds, at least 11 seconds, at least 12 seconds, at least 13 seconds, at least 14 seconds, at least 15 seconds, at least 30 seconds, at least 45 seconds, at least 60 seconds, at least 2 minutes, at least 3 minutes, at least 4 minutes, at least 5 minutes, at least 10 minutes, at least 20 minutes, at least 30 minutes, at least 40 minutes, at least 50 minutes, or at least 60 minutes. In some embodiments, the sensor readings indicate an emergency situation when a moving average of the sensor readings falls outside of an alarm threshold for a minimum period of time. In further embodiments, the minimum period of time is at least 1 second, at least 2 seconds, at least 3 seconds, at least 4 seconds, at least 5 seconds, at least 6 seconds, at least 7 seconds, at least 8 seconds, at least 9 seconds, at least 10 seconds, at least 11 seconds, at least 12 seconds, at least 13 seconds, at least 14 seconds, at least 15 seconds, at least 30 seconds, at least 45 seconds, at least 60 seconds, at least 2 minutes, at least 3 minutes, at least 4 minutes, at least 5 minutes, at least 10 minutes, at least 20 minutes, at least 30 minutes, at least 40 minutes, at least 50 minutes, or at least 60 minutes. In some embodiments, the alarm threshold is set by user input. In some embodiments, the alarm threshold is set by user input. In some embodiments, the alarm threshold is calculated using historical data from the at least one sensor. In some embodiments, the alarm threshold is calculated using historical data from the at least one sensor. In some embodiments, the emergency management service delivers the alert to an emergency dispatch center. In further embodiments, the emergency management service selects an emergency dispatch center to receive the alert from a plurality of emergency dispatch centers based on emergency response ability. In some embodiments, the emergency response ability is based on criteria selected from the group consisting of: proximity to the location of the emergency, resource availability, staff availability, and calculated time to arrival of an emergency response. In some embodiments, the alert comprises a multimedia message. In some embodiments, the emergency management system converts the multimedia message to a format compatible with an emergency dispatch center before delivering the message. In some embodiments, the format compatible with an emergency dispatch center is an analog format. In some embodiments, the analog format is audio, wherein the message is converted into an audio message comprising the emergency indication and sensor readings. In some embodiments, the wearable device is adapted to be wearable by a human. In some embodiments, the wearable device is adapted to be wearable by a bird or animal. In some embodiments, the wearable device adapted to be wearable by a pet. In some embodiments, the wearable device is adapted to be wearable on the hand, finger, palm, wrist, elbow, arm, shoulder, neck, head, face, nose, ear, torso, chest, back, waist, hips, leg, knee, ankle, or foot. In some embodiments, an alert can be cancelled after being delivered to an emergency management system. In some embodiments, an alert is cancelled by a user of the wearable device. In some embodiments, an alert is cancelled by a user of the wearable device upon authentication. In some embodiments, an alert is cancelled by the emergency management system. In some embodiments, an alert is cancelled automatically by the wearable device, wherein the device predicts that the alert was sent accidentally. In some embodiments, the device predicts the alert was sent accidentally based on factors selected from the group consisting of: sensor data contradicting an emergency indication from the user interface, sensor malfunction, conflicting data from a plurality of sensors. In some embodiments, an alert is cancelled when no communication device or routing device capable of delivering the alert to a communication device is available. In some embodiments, the communication module manages the indirect communication link with the emergency management service upon transmission of an alert by responding to requests for updated data. In some embodiments, the communication module sends updated data to the emergency management system automatically without a data request from the emergency management system. In some embodiments, the communication module sends updated data to the emergency management service upon user input. In some embodiments, the updated data comprises sensor readings from the at least one sensor. In further embodiments, the sensor readings comprise live sensor readings. In further embodiments, the sensor readings comprise historical sensor readings. In some embodiments, the updated data comprise location information. In further embodiments, the location information comprises a current location of the wearable device. In some embodiments, the location information comprises a current location of the communication device. In some embodiments, the location information comprises one or more historical locations of the wearable device. In some embodiments, the location information comprises one or more historical locations of the communication device. In some embodiments, the communication module maintains a list of external sensors for communication. In some embodiments, the list of external sensors belong to at least one network of external sensors. In some embodiments, the sensor module generates a list of external sensors within communication range. In some embodiments, the sensor module periodically updates the list of external sensors within communication range. In some embodiments, the communication module receives alerts or broadcasts from external sensors within communication range. In some embodiments, the communication module receives data from the at least one external sensor upon request. In some embodiments, the communication module requests data from the at least one external sensor after receiving an emergency indication to obtain situational awareness. In some embodiments, the communication module receives data from the at least one external sensor comprises sensor readings. In some embodiments, the data received from the at least one external sensor comprises location information. In some embodiments, the emergency management system maintains a database of external sensors with location information associated with the external sensors. In some embodiments, the sensor module begins requesting data from external sensors when a sensor reading of the wearable device indicates an emergency situation. In some embodiments, the at least one external sensor broadcasts an alert requesting emergency assistance upon receiving a request an alert requesting emergency assistance from another sensor. In some embodiments, the at least one external sensor updates the broadcasted alert with updated data from the at least one external sensor. In some embodiments, the at least one external sensor updates the broadcasted alert with updated data from the sensor sending the request. In some embodiments, the at least one external sensor sends data to the emergency management system upon request. In some embodiments, the at least one external sensor sends updated data to the emergency management system upon request. In some embodiments, the communication module autonomously sends a warning to a user before sending an alert when sensor readings indicate an emergency situation, wherein the user decides whether to send the alert. In some embodiments, the emergency management system is an emergency dispatch center. In another aspect, a multi-media emergency alert sent by a sensor is disclosed. The emergency alert includes a request for emergency assistance, one or more user information, one or more locational information; and one or more sensed parameters.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 14 depicts one embodiment of a method by which a wearable device may trigger an emergency alert by monitoring a user's health indicators; and The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
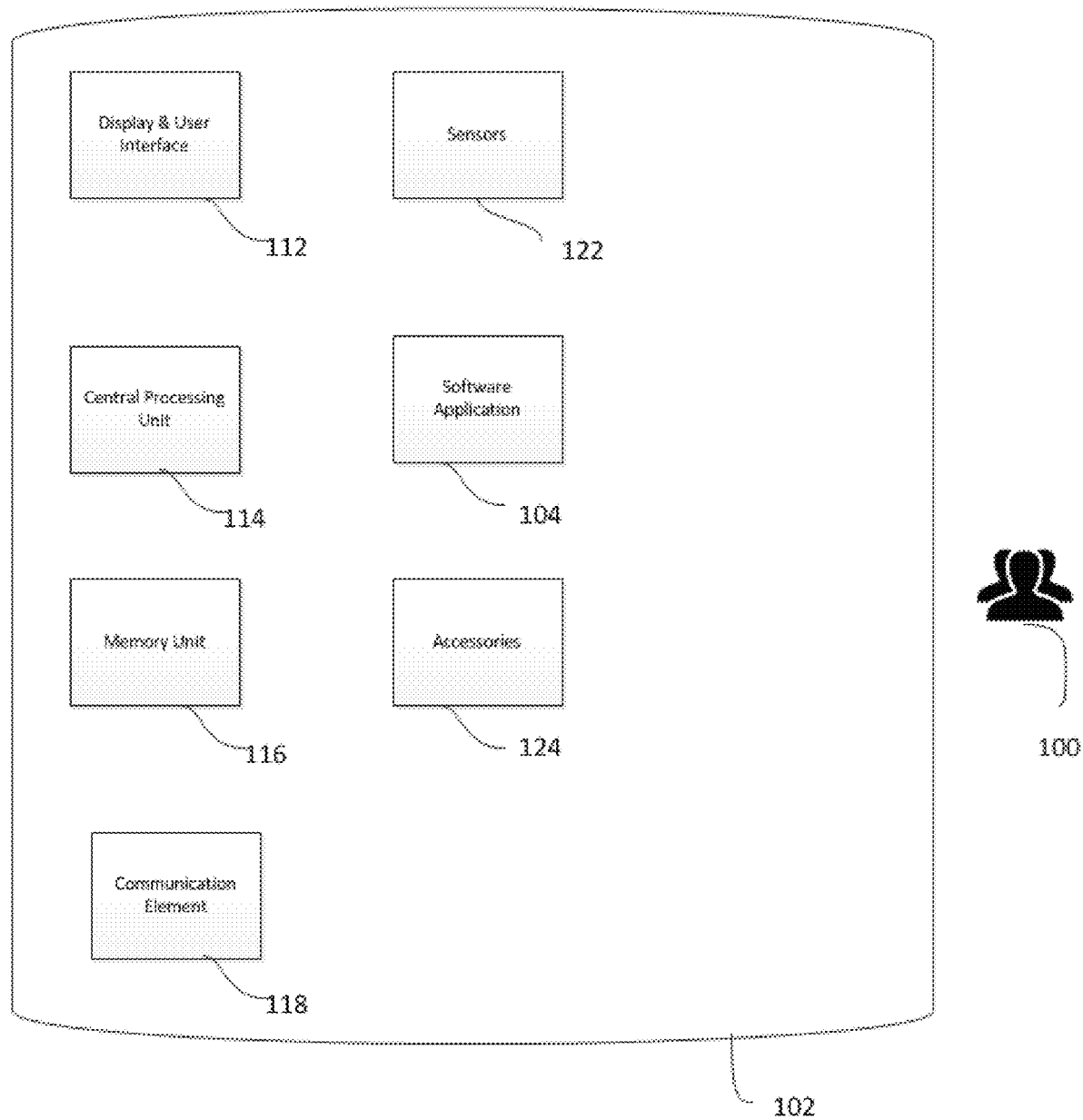
FIG. 1 is a schematic diagram of one embodiment of a wearable device for sending an emergency alert.

Aspects and embodiments disclosed herein are not limited to the details of construction and the arrangement of components set forth in the following description or illustrated in the drawings. Aspects and embodiments disclosed herein are capable of being practiced or of being carried out in various ways.

Aspects and embodiments disclosed herein are not limited to the details of construction and the arrangement of components set forth in the following description or illustrated in the drawings. Aspects and embodiments disclosed herein are capable of being practiced or of being carried out in various ways.

During an emergency, communication device(s) in the vicinity may be in possession of information that pertain to user(s) of the communication device(s), the environment that houses the user(s) of the communication device, or the device itself. In an emergency, these pieces of information from various devices may be used to build situational awareness of the emergency. As referred to herein, "situational awareness" is the ability to identify, process, and comprehend the critical elements of information about what is happening and the persons that have been or are likely to be affected by the emergency situation.

For situational awareness regarding an emergency, locational information may be of critical importance, for example, the location of various persons and pets in the area. In addition to GPS, mobile or wearable device(s) may provide information from an accelerometer, magnetometer, gyroscope, etc., about the speed and direction of the user. In addition, the devices in the vicinity may have information regarding temperature, air pressure, carbon monoxide levels, oxygen levels, smoke, air flow, air speed, precipitation levels, air moisture and other environmental characteristics. Information regarding the user or others in the area may also be of critical importance. In particular, health information may include heart rate, pulse, electric signals from the heart, blood oxygen levels, blood pressure, blood sugar level, and other health-indicators, etc. For example, an EKG can confirm if a person is having a heart attack.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated. Also, the phraseology and terminology used herein is for the purpose of description and should not be regarded as limiting.

As referenced herein, data from a sensor, data from a sensing component, data from a sensor element, and sensor data all refer to sensed information originating from a sensor. Information or data from a sensor are equivalent to sensed parameter value(s).

As referenced herein, "health indicators" or "physiological parameters" are understood to be various attributes or measurable characteristics of the body that measure the health and well-being of a person such as heart rate, pulse, blood pressure, blood sugar or blood glucose level, salt levels in sweat, heartbeat, temperature, sweat characteristics, eye characteristics, breathing, etc. For example, irregular heartbeats may be a sign of a heart attack.

As referenced herein, "environmental characteristics/characteristics" or "environmental parameters" are understood to be various parameters in the environment that is measured by a sensor that provide situational awareness about the emergency situation. For example, environmental characteristics may include the level of parameters such as smoke, carbon monoxide, radioactivity, temperature, water, chemical, etc., that may indicate that there is an emergency situation and/or provide situational awareness regarding an emergency. It is contemplated that advances in technology may lead to sensors for measuring various components in bodily fluids or on the skin to evaluate various health indicators. In addition to the health information, the device(s) associated with the user may have critical information about the user's habit, communications, family and friends, pre-existing conditions, preferences, emergency contacts/instructions, etc.

An emergency response with situational awareness can be more effective and efficient. Currently, EDCs receive limited information about the emergency and the emergency medical technicians (EMTs) with general preparation have to be sent to the scene quickly. It is contemplated that situational awareness about the emergency obtained from the alert will allow emergency response resources to be allocated more efficiently, for example, when a hurricane or tornado hits a large area. In addition, the EMTs may be able to monitor the emergency situation as they are responding to the emergency. For example, an EDC may receive an emergency alert because of a fire. The EDC may also receive information about the location and health of the various people and pets in the house via the situational awareness process from various devices. In responding to the emergency, the EMTs and firefighters are able bring appropriate equipment and manpower and reduce exploration needed for locating the people and pets.

Existing filings, for example, U.S. patent application Ser. No. 14/856,818, titled "METHOD AND SYSTEM FOR EMERGENCY CALL MANAGEMENT," filed on Sep. 17, 2015 and incorporated herein by reference, take advantage of Voice over Internet Protocol (VoIP) technology to make emergency calls, including multi-media messaging, from user communication devices such as cellular phones to EDCs.

Historically, users have not been able to make VoIP calls to EDCs using wearable devices. Given the widespread use of wearable technology it will be advantageous for users to be able send an emergency alert for assistance, as needed. In addition, wearable devices have situational awareness information about the emergency. Therefore, it will be advantageous for users to be able to send multimedia messages from their wearable device to an EDC via a communication device, such as mobile or cellular phone, tablet computer, laptop or other communication devices. Disclosed herein are systems and processes by which users can effectively use their wearable device to establish an emergency call with an EDC over data communication links such as IP based channels.

It has been found desirable to have a system and associated method that enables users to utilize wearable technologies to initiate voice and non-voice data sessions for the sake of emergency response to an EDC. Such data sessions desirably would include sending and receiving of multimedia messages and confirmation of reception of request for emergency help, receiving an indication of status of a response provided, and conveying meta-data relating to the user, such as location, pre-stored health record and health information from a wearable device, such as pulse-rate, heart-rate, elevation, movement pattern, amount of daily movement, temperature, temperature, and blood oxygen levels etc., and other relevant information about the user of the wearable device.

As referenced herein, "wearable devices" refers to mobile devices or accessories that can be worn or installed on a user's body. In some embodiments, wearable devices may include one or more sensors. A "sensor" is a device that measures a physical parameter and may record and respond to the measurement (e.g., a temperature sensor, a heart-rate monitor, etc.). Wireless sensors disclosed herein include a sensor module and a communication module for sending the sensed and recorded information. As referenced herein, a "user" refers to a person or entity which uses a communicating device or a network service.

As referenced herein, an "Emergency Management System" ("EMS") refers to a system that receives and processes emergency alerts from users and forwards them to the EDC. Various embodiments of the EMS are described in U.S. patent application Ser. No. 14/856,818, and incorporated herein by reference. The "Emergency Dispatch Center" ("EDC") refers to the entity that receives the emergency alert and coordinates the emergency assistance. The EDC may be a public organization run by the municipality, county or city or may be a private organization. The emergency assistance may be in various forms including medical, caregivers, firefighting, police, military, paramilitary, border patrol, lifeguard, security services.

As referenced herein, "multi-media message" refers to data messages that include information in two or more different types of data—text, sound, image, and video. The multi-media message may also include Meta data, user-inputted data and locational coordinates or GPS data. The multi-media message may be unformatted or formatted for ease of transmission and implementation of the emergency response at the EDC. As used herein, "locational information" may include GPS coordinates or cellular triangulation information, Wi-Fi based locationing, an indoor positioning system or any other form of positional information.

Similarly, current capabilities of wireless sensor networks (e.g., Internet of Things networks) do not allow them to send multimedia messages for emergency response. For better emergency response, it will be beneficial for sensors to actively search and find other communication devices capable of communicating over longer distances, such as cellular phones, to initiate a call for emergency response. In addition, sensed parameters from the sensor or another sensor in the sensor network can provide helpful situational awareness information for the emergency response. Various aspects and embodiments disclosed herein include methods and systems which fulfill one or more of these needs.

In some embodiments, the user will be able to download and install a software or application that will initiate the emergency alert by using the disclosed methods. It is understood that the application may be installed on one or more devices in the disclosed system such as a sensor, a wearable device, a cell phone, a tablet, a laptop, etc. In other embodiments, a sensor or a wearable device may be pre-installed with software to enable sending the emergency alert.

Universal Calling Numbers for Sensing Devices

The growing ubiquitous presence of sensors, coupled with the fact that conventional communications to EDCs, for example, PSAPs, are often made via mobile wireless devices or smart devices (e.g., smartphones, tablets, laptops, wearable smart devices, etc.) that offer a rich type of information, for example, multimedia information in addition to voice and text, rather than land-based telephone lines, provides an opportunity for collecting the combined information available at all these devices, regarding an emergency situation at an EDC and/or an EMS, thus improving the response to an emergency situation. As a result, sensed information from various devices placed in homes and office buildings can be extremely useful if communicated to EDCs in the case of an emergency situation. One way to do this is to communicate information from these sensors to a user communication device, for example, a mobile wireless device, and have the mobile wireless device further communicate the information received from these sensors to the appropriate EDCs. However, this method requires two communication "hops" and also depends on the communication between the sensors and the mobile devices being available. At times this is a restriction, and the sensor may be able to send information directly to an EDC, or emergency management system ("EMS"), without the need for first sending this information to a user communication device, for example, a mobile device, and the EDC and/or EMS will be able to directly call the sensor to retrieve real-time and stored information from the particular sensor. Therefore, there is an opportunity for a system and method for providing a universal calling number for various sensors to improve situational awareness for the purpose of emergency response.

Given the increasing adoption of sensor networks, also popularly known as an "Internet of Things" ("IOT") in office and residential locations to sense and control environmental variables, it has been found desirable in accordance with one or more embodiments that the information sensed from these sensor networks on a periodic basis be used in responding to emergency situations in a real-time fashion. By providing a rich context that is both sensitive to and situationally aware of the emergency situation being responded to, while also offering the ability to query one or more of the many sensors for specific information that may or may not be included in the periodically sensed information from that sensor, and also allowing for reception of a call from an EMS and/an EDC for purpose of responding to an emergency situation, received at the one of many sensors in the sensor network via a data communication network, for example, the Internet, or via a Wi-Fi network, and actively managing this call, aspects and embodiments of the present invention enhances and builds upon the current IOT systems.

Historically, a dispatcher at an EDC, for example, a PSAP or an EMS, has not been able to place a call for requesting information sensed at a sensor in a wireless sensor network, for example, one in an IOT network, in the process of responding to an emergency situation. Further, when calls for requesting emergency assistance are placed via mobile wireless devices there is currently no method to communicate directly with, and extract in real-time, sensed information from the sensors placed in the environment containing the mobile wireless device, for example, an office or residential building, and utilize such information to better respond to the emergency situation. Thus, users have not historically been able to receive benefit from the multitude of real-time sensed information around their environment in the case of an emergency and build on this knowledge to minimize the impact of emergency situations or even avoid emergency situations. Accordingly, if an EDC, for example, a PSAP, wishes to place a VoIP call over a data communication channel to any of the sensors in a wireless sensor network in the process of responding to an emergency situation, it has historically been unable to do so due to the lack of a number to call for communicating with the sensor. Moreover, historically, the EDC and/or the EMS, based on where the user communication device is calling from and when the last update providing identification information, types, capabilities in terms of accessing communication channels, for example, Bluetooth® and Wi-Fi and sending critical sensed data over these channels, calling number and other information of the installed devices at the particular location of the user communication device received at the EDC and/or the EMS, the EDC and/or the EMS would not have information about the call back number, even if one is assigned, to one or more of the sensors in an IOT framework, and hence would not be able to place a data call for requesting sensed information for the purpose of emergency response.

One advantage of the devices, platforms, methods, and media described herein is that they enable sensors in a wireless network to have a phone number assigned to them so that another communication device, for example, a communication device at an EDC and/or an EMS, a smart phone, or a mobile wireless device, can place a data call to a sensor in the wireless network and request sharing of sensed information for the purposes of emergency response from the sensor in the wireless network and upon receiving this information the EDC, for example, a PSAP or an EMS, can actively share this information with emergency response personnel in an real-time fashion to better equip the emergency response personnel to provide an increasingly effective emergency response. It has also been found beneficial to provide a system and method for assigning a calling number, from a pool of numbers, to sensors in a IOT network placed in a user's environment, by an EMS, or in some instances an EDC, for example, a PSAP, so that the sensors can use this number to place and receive data calls, for example, VoIP calls. These calls may be placed from or to an EDC or an EMS in the process of actively responding to a request for emergency assistance from a user communication device of a user in the vicinity of the IOT sensor network that the given sensor is a part of. The sensors in the IOT sensor network may have information that the EMS or EDC can use to more effectively respond to the current emergency situation. Further, it has also been found desirable to provide a method to allow a EMS or an EDC, to maintain a database of the phone numbers and identifying information of the sensors within its service area, including identifying information about the networks, specifically the IOT networks, that contain these sensors, and information about the users, that are in the region of influence of these sensors as defined by the sensing region of these sensors, for example, location information of the users, as identified by the number assigned to their communication devices, home location, IP address, or current geographic location of the communication device of the user, so that these sensors can be useful in providing additional information in the case that a request for emergency assistance is received from a user in their region of influence.

Various aspects and embodiments disclosed herein include methods and systems which fulfill one or more of these needs or desires.

In accordance with one aspect, there is provided a method of assigning a phone number on a permanent basis from a pool of numbers at an EMS or an EDC to sensors in a wireless network that enables these sensors to receive a data call from another communication device, for example, a smart phone or a mobile wireless device at an EDC or an EMS to request additional information from the sensor. The sensor in turn shares sensed information with the EDC or EMS, and upon receiving this information the EDC, for example, a PSAP or an EMS, actively shares this information with emergency response personnel in a real-time fashion to better equip the emergency response personnel to provide an increasingly effective response to a request for emergency assistance. In such an embodiment, the sensor, in a wireless or a wired sensor network, for example a IOT network, has information about the sensor stored at the EMS or the EDC, such that the calling information, for example, a phone number associated with the sensor, is stored at a database at the EMS or the EDC. A telephone number is associated with a particular sensor, for to particular sensing network, and for a particular geographic region. In some instances, the calling information is also associated with certain users, based on the association of the users with the sensors. The association of the users with the sensors may be determined using several factors, for example, location information of the user and the sensor in the sensing network, ownership of the sensor as assigned to the user, a "home location" where the sensor is registered and the user is using as a primary residence. If there is a change in the identifying information of the sensor, for example, the location of operation, the EMS or EDC is notified about this change and the EMS or EDC, makes the appropriate updates in their local databases so that the sensor is associated with the users that are within the region of influence of the sensor and a new phone number is assigned to the sensor if such a need arises due to the change in physical location of the sensor. Further, in such an embodiment, the EMS or the EDC, is able to add sensors to an on-going session hosting the emergency response for a request for emergency assistance between the EMS and the user communication device, and share with these sensors any relevant information, for example, text messages, multimedia messages including multi-media messaging system messages, videos, images, GPS information and any other form of multi-media messages, and also share any information sent from the sensor to the EMS or the EDC, with other sensors included in the data session, with the user via the user communication device, and/or with the first responders assigned to the request for emergency assistance and manage. This information may be shared for the duration of the emergency response and saved for later reference. Further, in such an embodiment, the EMS or the EDC performs a search in the local database at the EMS or the EDC for sensors available in a given geographic area that is in the service area of the EMS or the EDC, and also includes the latest location estimate of the user communication device, as received from the device or from other sources on the network, for example, a cellular network base station, and upon finding sensors that are located in the service area of the EMS or the EDC, and that are also in the vicinity of the latest location estimate of the user communication device, the location environment parameters can be sensed by the sensor. In such an embodiment the EMS or the EDC makes a decision regarding the association with the user via the defined sensing region of sensors in question, and the location information of the users, as identified by the home location, IP address, current geographic location of the communication device of the user, and other factors identifying the location and type of user and the type of the request for emergency assistance so that a sensor can be chosen for the same.

In certain embodiments the sensed parameter, sensed by the sensor of the sensor network, may be a parameter of an environmental characteristic, for example, temperature, pressure, air flow, amount of ambient light in the vicinity of the sensor, amplitude and/or frequency variations of sound vibrations in the vicinity of the sensor, electromagnetic field variations, or other environmental parameters sensed by the sensor.

In certain embodiments, the sensors host an application client that initiates, or responds to, a communication session with the EMS or the EDC and constructs and sends, using hardware provided by the sensor, a message including an indication of the sensed information to the EMS or the EDC.

In certain embodiments, the sensor contacted for requesting sensed information by the EMS or the EDC for purpose of emergency response is assigned a calling number while the request for emergency assistance is being processed by the EMS or the EDC. The sensor uses this phone number for the duration of the session used for responding to the emergency and in some instances continues to keep this number as the calling number for the sensor for other devices, including the EMS and the EDC, to place a data call to the sensor.

In certain embodiments, the sensor network is placed in a residential environment.

In certain embodiments, the sensor network is placed in a corporate office environment.

In certain embodiments, the sensor network is placed in an industrial factory environment.

In certain embodiments, the sensor network is placed in a public space, for example, a public park, museum, shopping mall, or other populated public area.

In accordance with another aspect of the present invention, there is provided a method for the sensor in a sensor network to be assigned a calling number that is able to be used even if the user moves from a given location in one area code to another location in a difference area code, and a data call placed to the sensor from an EMS or an EDC is routed to the sensor in the new area code and the latest location estimate of the sensor is shared with the EMS and/or the EDC.

In certain embodiments, the sensors host an application client that initiates and manages transmission of the warning signal and request for emergency response using hardware provided by the sensor, for example, the communication interface of the sensor, and manages communication sessions with other sensors in the sensor network.

FIG. 1 is a schematic diagram of one embodiment of a wearable device for sending an emergency alert. FIG. 1 is a schematic diagram of one embodiment of a wearable device for sending an emergency alert. The wearable device 102 may have several components including a display and user interface 112 which will allow the user 100 to interact with the wearable device 102. In some embodiments, the display 112 may be a touch screen, which is capable of displaying information and taking user input. In some embodiments, the user interface 112 may have physical and/or soft-buttons such as buttons for activating and deactivating an emergency alert or for sending a request for emergency assistance to local emergency responders. In addition, there may be buttons for sending an indication of the emergency including the type of emergency (e.g., fire, medical, police, car crash, etc.) to emergency responders. In some embodiments, the wearable device 102 may send situational information about the emergency situation for effective and efficient emergency response.

In some embodiments, the wearable device 102 includes one or more sensors 122 for sensing various health indicators of the user 100 or other people in need. Health indicators may include various attributes of the body that measure the health of a person such as heart rate, pulse, blood pressure, blood sugar, etc. In some embodiments, the sensor 116 may sense environmental characteristics in the area where the user 100 is located. Environmental characteristics may include the level of parameters such as smoke, carbon monoxide, radioactivity, temperature, water, chemical, etc., that may indicate that there is an emergency situation and/or provide situational awareness regarding an emergency. For example, the sensor 116 may include a pulse-rate sensor, a blood pressure sensor, a blood oxygen sensor, a heart-rate sensor, a temperature sensor, a smoke detector, a carbon monoxide monitor, a gyroscope, an accelerometer, etc.

In some embodiments, the sensor 116 may trigger an emergency alert based on sensed information. The wearable device may send the emergency alert using the network element 118. The network element 118 (e.g., an antenna and associated components, Wi-Fi, Bluetooth®, etc.) may send and receive information to the Internet and/or nearby IoT and other devices. In some embodiments, the network element may scan the airways to detect and communicate with communication devices and routing devices in the vicinity.

In some embodiments, the wearable device 102 may include one or more software applications 104 for sending the emergency alert. The application 104 may be pre-installed in the wearable device 102 or may be downloaded and installed by the user 100. It is contemplated that the user 100 or a healthcare provider or caregiver may provide information (e.g., a prioritized list of communication devices, threshold ranges for various health indicators or environmental characteristics) into the application 104 that may be used during an emergency situation. Various embodiments of the application 104 will be described and depicted later.

In some embodiments, the wearable device may include a central processing unit or processor 114, a memory 116 (e.g., an EPROM memory, a RAM, a solid-state memory). In some embodiments, the wearable device is equipped with a global positioning system (GPS). The GPS may generate and collect locational information that may be sent with the emergency alert.

In some embodiments, the wearable device 102 may include various accessories 124 that may allow various functionality and customizations. The accessories 124 may include a microphone (e.g., for input of voice from user 100), a camera 1611 (e.g., for input of gestures commands or pictures from the user 100), speakers, fingerprint reader, USB/micro-USB port, headphone jack, a card reader, SIM card slot, etc.

Figure 2:
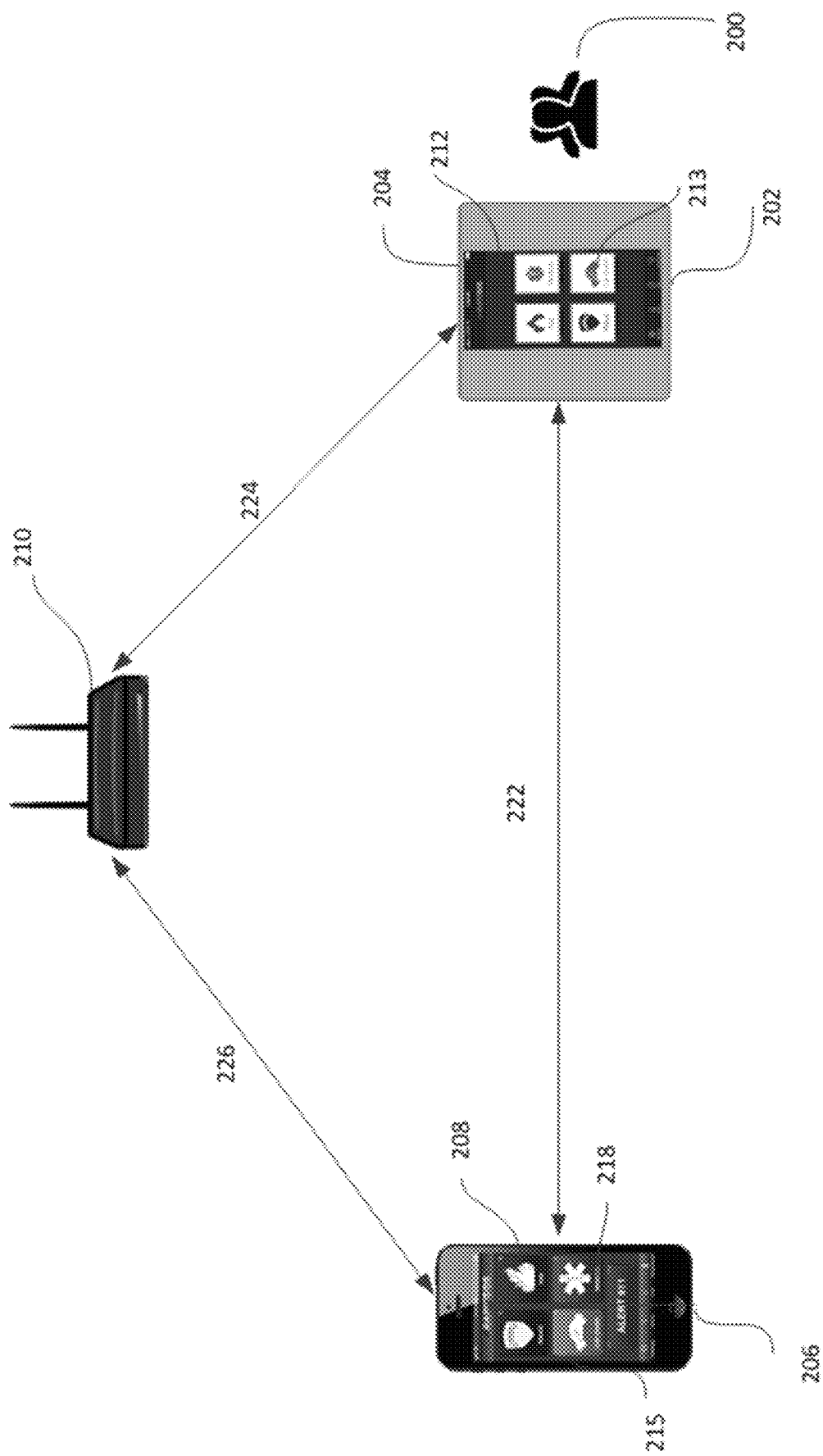
FIG. 2 is an illustration of one embodiment of a sensor or wearable device initiating a communication link with a communication device.

The wearable device 102 may be worn by the user 100 or attached to his or her body. In some embodiments, the wearable device 102 may have a holster 126 (not shown) that can be strapped to the user's body parts (e.g., wrist, leg, waist, head, fingers, etc.). After an emergency alert is initiated either by a user or triggered in another way, the sensor or wearable device may search for a communication device that can send the emergency alert. FIG. 2 is an illustration of one embodiment of the invention showing a wearable device 202 communicating with other devices through direct and indirect communication links. An indication of an emergency alert from a wearable device 202 may be sent to a communication device 206 wherein a suitable data communication link 222, for example a digital communication session setup using a Transport protocol for example Transmission Control Protocol (TCP), may be established between the wearable device 102 and the communication device 101. The user 200 may initiate an emergency alert using an application client 204 installed on the wearable device 202, the application client 208 on a communication device 206 (e.g., a mobile phone), a tablet, a laptop or desktop and other such devices. It is contemplated that an application could be hardwired into the wearable device 102 for initiating the emergency alert.

In some embodiments, the application client 204 may include a display and user interface 212 and be capable of displaying a plurality of user-friendly buttons or soft keys 213, each button corresponding to a particular type of emergency situation. Selection of a button 213 by the user 200 may cause an emergency indication to be sent to the communication device 101 based on the emergency associated with the button. In some embodiments, the user 200 may initiate the emergency alert by pressing a button 215 on the interface 218 in the communication device 206 with application 208.

In some cases, the wearable device 202 may be connected to a data network and/or the Internet and may be able to send the alert to the EDC via EMS. However, in many cases, the wearable device may not be able to directly send the emergency alert because it may not have the capability or due to inadequate connectivity. In such cases, responsive to selection of one of the buttons 213, the wearable device 202 may search for a communication device 206, for example, a mobile phone, using either a direct wireless data communication link 222 or an indirect data communication link 224, 226 via a routing or intermediary device 219, such as a Wi-Fi router. The wearable device 202 may first attempt to locate and establish a data communication link, for example, a Wi-Fi, Bluetooth®, an "ad-hoc wireless mesh", ZigBee, PAN, or any other form of a wireless communication protocol-based communication session with the communication device 206 utilizing a direct wireless data communication link 222.

In some cases, the direct wireless data communication link 222 cannot be established with a communication device 206 or the quality of the data communication link 222 is not good. For example, the communication device 206 may be too far from the wearable device 202. The wearable device 202 may evaluate the quality of the data communication link 222 based on various link quality parameters such as a received signal strength indicator, channel latency, error-rate and so on. When the quality of the data communication link 222 is insufficient, the wearable device 202 may initiate a data communication link with a computer networking device or routing device 210, such as a Wi-Fi router a hub or other such computer networking devices, and may establish an indirect data connection 224, 226 with the communication device 206 via the computer networking device 210. Once a data communication link is established with the communication device 206 (e.g., through exchange of control signals), the wearable device 202 sends an initiation of an emergency alert to the communication device 206 and actively manages the data communication link between the wearable device 202 and the communication device 206. If the wearable device 202 detects that an established indirect data communication link 224, 226 is not performing as needed and a direct data communication link is available with other communication devices in the vicinity, the wearable device 102 may attempt to establish communication with such devices (not shown). Thus, the wearable device 202 establishes a communication link with a communication device 206 or the routing device 210, both of which may act as the connected device.

Figure 3:
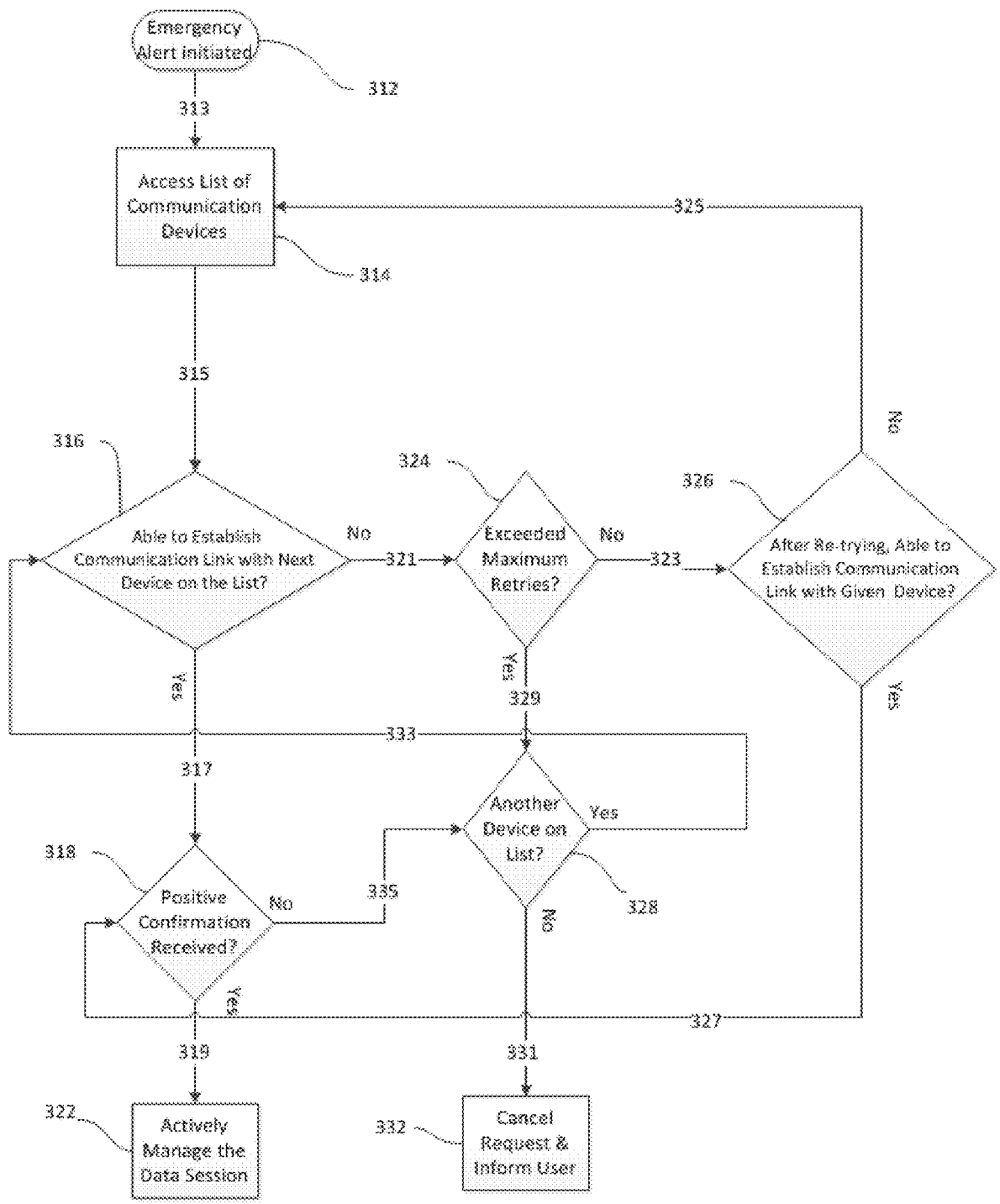
FIG. 3 is an illustration of one embodiment of a method for sending an alert to an emergency dispatch center ("EDC")

FIG. 3 is an illustration of one embodiment of a method for sending an alert to an emergency dispatch center ("EDC") by a wearable device 202 using a communication device 206 (see FIG. 2). In some embodiments, one individual (e.g., user 200) may be the primary user for both communication device 206 and wearable device 202. When an alert is initiated 312 by the wearable device 202, the wearable device 202 may access a list communication devices for sending the emergency alert to the EDC 314. If the wearable device 202 is able to establish a communication link with the first device on the list 316, it will send the emergency alert to be forwarded to the EDC. After the wearable device 202 sends the emergency alert and receives a positive confirmation 318, it actively manages the data session 322.

In some embodiments, upon receiving a positive confirmation, the device 202 waits for status updates from the EDC and actively manages the data communication link 322 between the wearable device 202 and the first communication device 206. If the wearable device 202 does not receive a positive confirmation 318, it waits for a set period and checks for another device on the list 328. If after this period of time the wearable device 102 is not able to find any devices then it waits for the same period of time and tries again 326. If another device is found 333, then the wearable device attempts to establish a communication link 316 with the device 316, 318 to send an emergency alert.

If the wearable device 202 is not able to reach the first communication device on the list after maximum retries (316, 324, 326), the wearable device 202 may move on to the next communication device on the list 328. In some embodiments, if the maximum number of connection retries is reached 324 and the wearable device 202 is unsuccessful in reaching first communication device on the list, the wearable device 202 then attempts to reach a routing device (not shown). If the wearable device 202 is unable to reach any devices, it may cancel the requests and informs the user 332.

Figure 4:
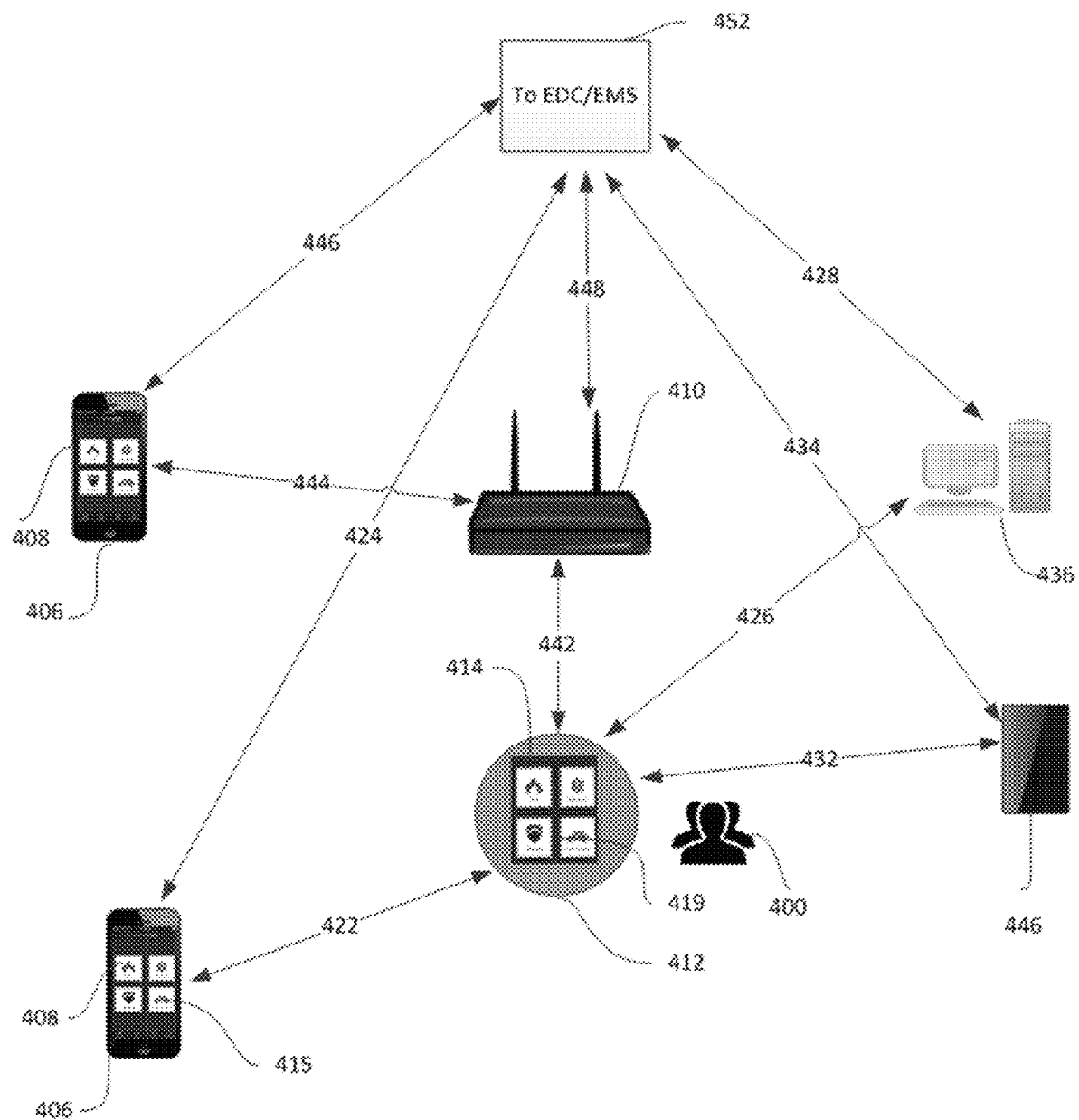
FIG. 4 is an illustration of one embodiment of the system for sending an emergency alert via different types of communication device(s)

FIG. 4 is an illustration of one embodiment of the system for sending an emergency alert via different types of communication devices. A sensor 412, installed with application 414, senses an emergency situation, either via the sensed parameter values by the sensing component of the sensor 412. In some embodiments, the sensor 4122 may be sensing a parameter which is an environmental characteristic, (e.g., temperature, motion, smoke, carbon monoxide, etc.). In some embodiments, the sensor 412 may be sensing a health indicator such as a pulse/heart-rate, a blood pressure, a blood glucose, etc. The user 400 may also initiate the emergency alert using button 419 on the sensor 412 or 415 on the communication device 406.

In some embodiments, the sensor is a wearable device. In some embodiments, the emergency alert may be a multimedia message including situational awareness information to allow for effective and efficient response. In one aspect, the emergency alert may include a request for emergency assistance, one or more information about the user or administrator, one or more locational information and one or more sensed parameters. In some embodiments, the multimedia message includes different types of data including text, image, sound and/or video. In some embodiments, the sensed data may include current and previously sensed parameters and/or a moving average (MA) of the sensed parameters.

In some embodiments, the sensor 412 may be a sensor in sensor network or an internet-enabled device. Once the sensor 412 confirms that a request for emergency assistance has to be sent to an EDC or an EMS 452, the sensor 412 may construct a request for emergency assistance and scan the airways for available communication devices 406, 436, 446 or a routing device 410, to associate with and to send the request via communication device 406.

The sensor 412 may analyze the connection with various available devices, for example, communication device 406 (running application 408) or an indirect communication link with another communication device 406 (running application 408) using a Wi-Fi router 410, by estimating the quality of the data communication link (422, 426, 432) based on various link quality parameters, for example, a received signal strength indicator, channel latency, or error-rate. In some embodiments, the user 400 may be primary user of the communication device 406. But, in other embodiments, there may be another person, such as a family member, who may be the primary user of the communication device 406.

Once a suitable communication device (406, 436, 446) for establishing a direct communication link is found or a routing device 410 and communication device 406 is found for establishing an indirect communication link, the sensor 412 connects to the suitable communication device via a communication link (422, 442, 426, 432) and sends the request for emergency assistance to the connected device. If the connected device is one of the communication devices (406, 436, 446), it then regenerates the emergency request to be formatted to be sent over a communication link (424, 446, 428, 434). In some embodiments, the communication links (424, 446, 428, 434) are cellular channels, and may send the request to an appropriate EDC 450 serving the particular locality. If the connected device is a routing device 410, then the sensor 412 associates with the routing device 410 via a Wi-Fi channel. If available, the routing device 410 sends the request for emergency assistance to an EDC 450 (not shown) directly over the communication link 448. In other embodiments, the routing device 410 will send the alert via communication device 406 via communication links 444, 446. Once the EDC 450 (not shown) confirms receipt of the request for emergency assistance, the communication device (406, 436, 446) or routing device 410 may inform the sensor 412 and forward other updates from the EDC 450 (not shown).

Figure 5:
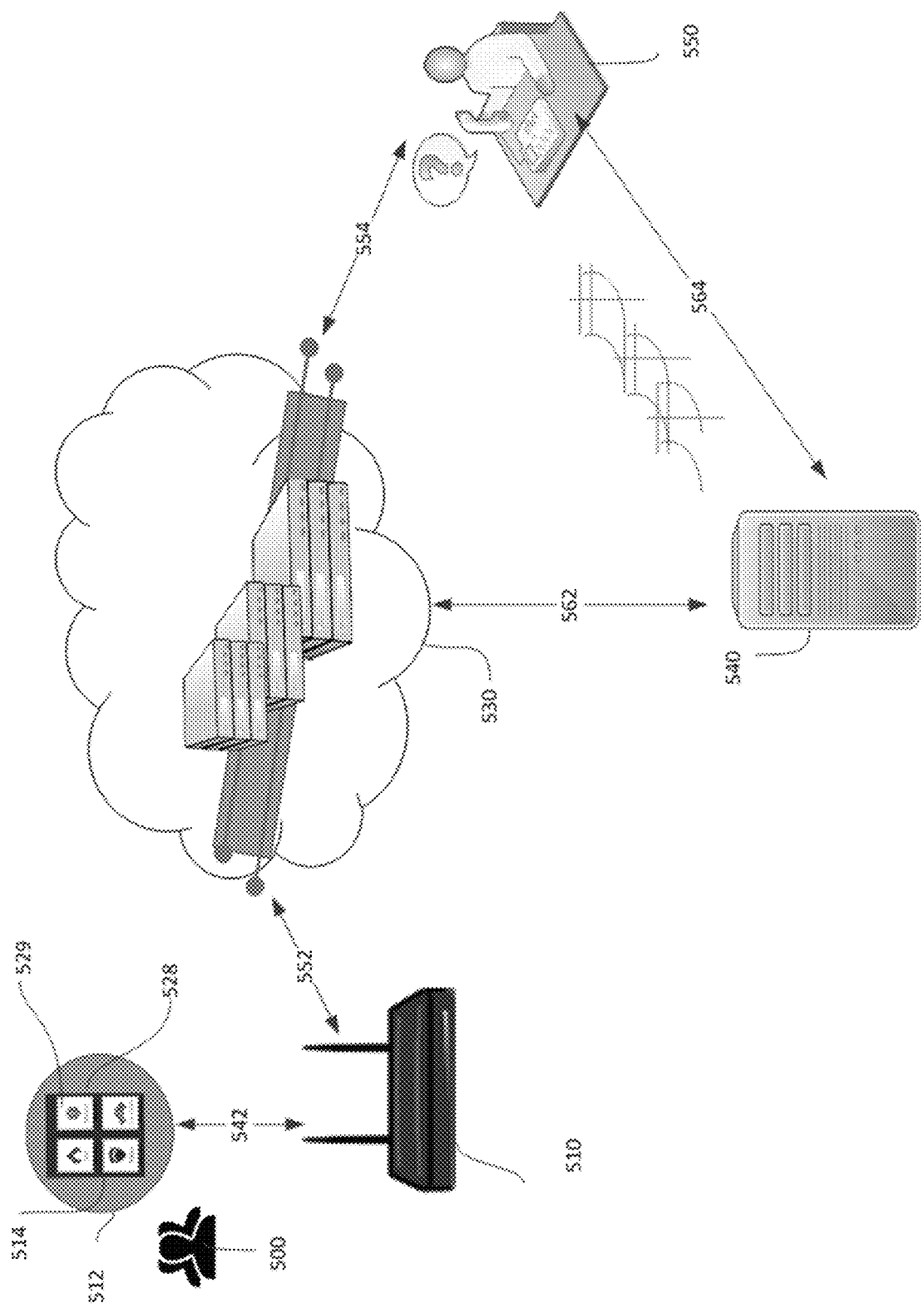
FIG. 5 is an illustration of one embodiment of a system for sending an emergency alert.

FIG. 5 is an illustration of one embodiment of a system for sending an emergency alert. The system includes a sensor 512 connecting to a routing device 510 for sending a request for emergency assistance to an EDC 550. In some embodiments, the sensor 512 with installed application 514 may perform a scan of the airways and choose a routing device 510, for example, a Wi-Fi router, to associate with and send the request for emergency assistance to an EDC 550. The sensor 512 may send an association request to the routing device 510 via communication link 542, once the sensor 512 chooses to associate with the routing device 510 of all the devices available to connect to, based on channel quality indicators, for example, a received signal strength indicator, channel latency, error-rate, etc.

If the routing device 510 requires authentication to be performed, it may send signals to the sensor 512 to indicate that routing device 510 needs authentication to be performed before the request for emergency assistance can be forwarded to an EDC 550. In some embodiments, the user 500 may provide authentication through the sensor 512 or the routing device 510. Once authentication is performed, the sensor 512 may send the request for emergency assistance to the routing device 510, and the routing device 510 in-turn may forward the request to an Emergency Management System ("EMS") 530 via a communication link 552. The EMS 530 then may determine which EDC 550 to send this request for emergency assistance based on proximity to the location of the emergency, resources and staff available at the EDC, etc. In some embodiments, the EMS 530 may send the request via a data communication link 562 or a combination of a data communication link 106 and a TDM call via a PSTN 564 and a gateway 540. It is envisioned the present system will be able to send emergency alert to EDCs in some municipalities that does not have capacity to receive digital calls. If the EDC 550 does not have digital capacity, the emergency alert has to be sent through an emergency voice call session.

The EMS 530 may then forward a response from the EDC 530 to the routing device 510, and it may forward these responses to the sensor 512. In some embodiments, the EMS may send "positive confirmation" in the form of signaling, http, push notifications, etc., to the sensor 102. The sensor 102 may then respond to these messages by the EDC 115, if the sensor 102 deems that a response is necessary. In some cases, the sensor 102 may display the information on a display and user interface 528 with buttons 529 for the benefit of the user 500. The routing device 510 may then actively manage the data communication link 554 between the sensor 512 and the EDC 550. Active management may involve sending updates from the sensor 512 to the EDC 550, and from the EDC 550 to the sensor 512, as requested by the sensor 512 or the EDC 550 during the length of the emergency call session or communication link. In some embodiments, the user 500, the EDC 550, or the emergency response team may terminate the call session or communication link.

Figure 6:
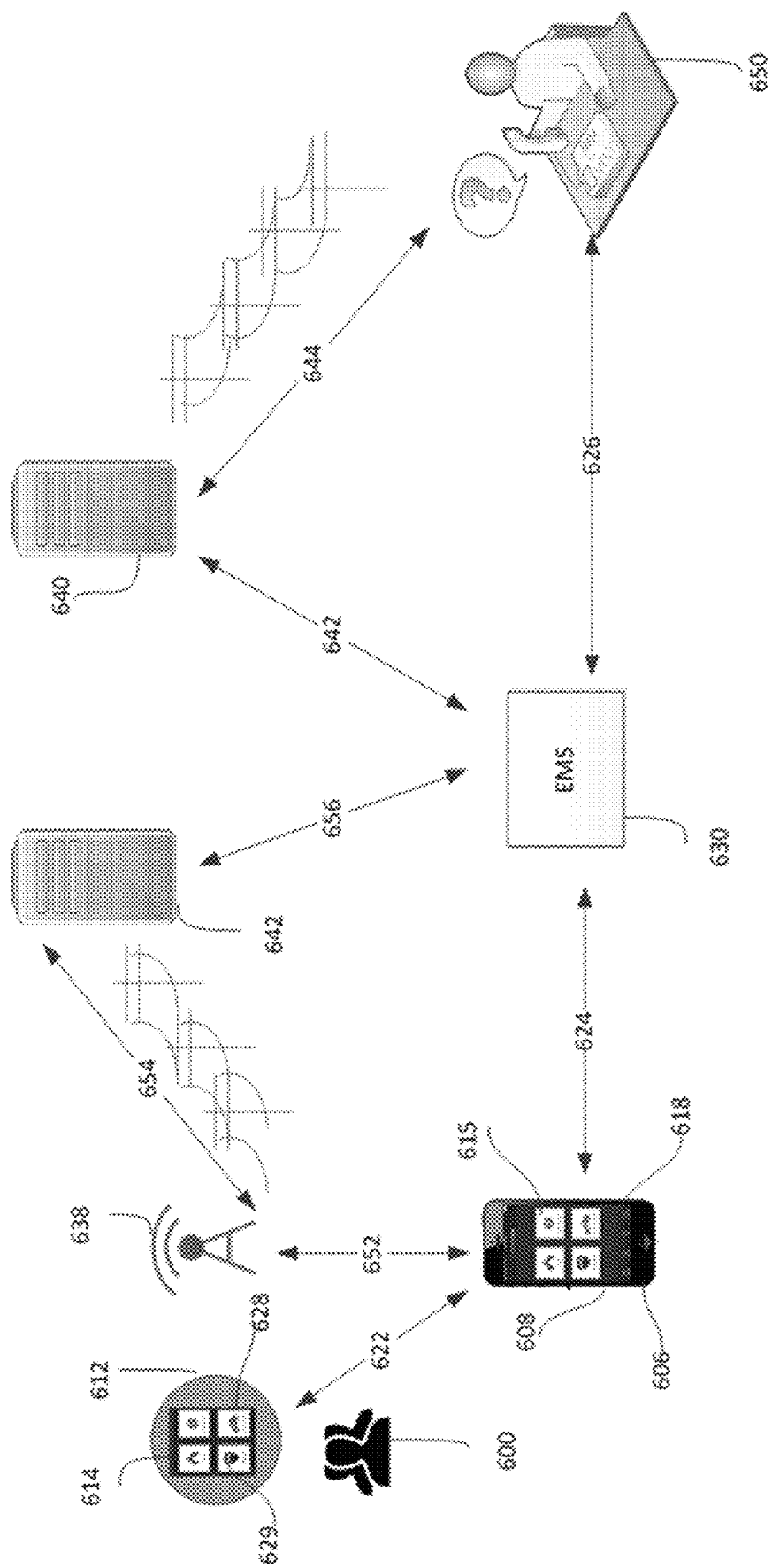
FIG. 6 is an illustration of another embodiment of a system for sending an emergency alert.

In one aspect, a system is disclosed for sending an emergency alert including a sensor, a communication device, an EMS and an EDC. As shown in FIG. 6, in one embodiment, a sensor 612 comprises a display and user interface 628 with buttons 629 and installed with application 614. The sensing component senses one or more parameters, such as environmental characteristics and/or health parameters and the communication component is able to establish a communication link 622 for sending and receiving information. The communication device 606 with display & user interface 618, buttons 615 and installed application 608 is able to participate in the communication link 622. In some embodiments, the EMS 630 receives the emergency alert from the communication device and for processing and forwarding the emergency alert to an EDC 650.

In some embodiments, the sensor 612 may perform a scan of the airways using the communication module (not shown) and may choose a communication device 606, for example, a cellular communication device, to associate to and send the request for emergency assistance. The sensor 612 may choose to associate with the communication device 606 based on channel quality indicators, for example, a received signal strength indicator, channel latency, error-rate, etc. Then, the sensor 612 may attempt to establish a communication link with the cellular communication device 606.

If the communication device 606 requires authentication to be performed, it will send signals to the sensor 612 to indicate that communication device 606 needs authentication to be performed before it can re-format and forward the request for emergency assistance to an EDC 450. In some embodiments, the user 600 may authenticate the communication through the sensor 612 or communication device 606. After authentication, the sensor 612 may send the request for emergency assistance to the communication device 606. The communication device 606, which is a cellular phone in this case, may in-turn format the request for emergency assistance to be sent over end-to-end communication links, for example a TDM channel or a data communication link based on Internet Protocol. In some cases, the communication device 606 may add other information, for example, location of the cellular device and the sensor, any multimedia information about the geographic location of the sensor 612 (which may be the GPS information in multi-media format) and the communication device 606, any user-inputted information, video feeds of the geographic location, meta-data about the user 600, readings from the sensor 612 and any other available information that can build situational awareness about the emergency. In some embodiments, the readings form sensor 612 may indicate that the emergency situation is stable or becoming acute, or improving. For example, a smoke detector sensor could indicate if the user or others were able to alleviate a fire emergency by using a fire extinguisher.

In some cases, the communication device 606 may forward the re-formatted request for assistance to an EMS 630 via a data communication link 624. Sometimes, the alert may be sent through cell tower 638 and gateway 642 via data communication links 652, 656. The EMS 630 may decide which EDC 650 to send this request based on factors referred to above. In some embodiments, the EMS 630 may send the request to the appropriate EDC 650 via a data communication link 624 or a combination of data communication link 642 and a TDM call via a PSTN 644 and gateway 640. The EMS 630 may then forward a response from the EDC 650 to the communication device 606, and the communication device 606 may then forward these responses to the sensor 612. The sensor 612 may then respond to these messages by the EDC 650, if needed. In some cases, the information may be displayed on a display and user interface 618 on the sensor 612 for the benefit of the user 600. The communication device 606 may then manage the data communication link (e.g., 622, 624, 626) between the sensor 612 and the EDC 650 and send updates. As needed, the sensor 612 and the EDC 650 may continue to communicate during the length of the emergency communication session.

Figure 7:
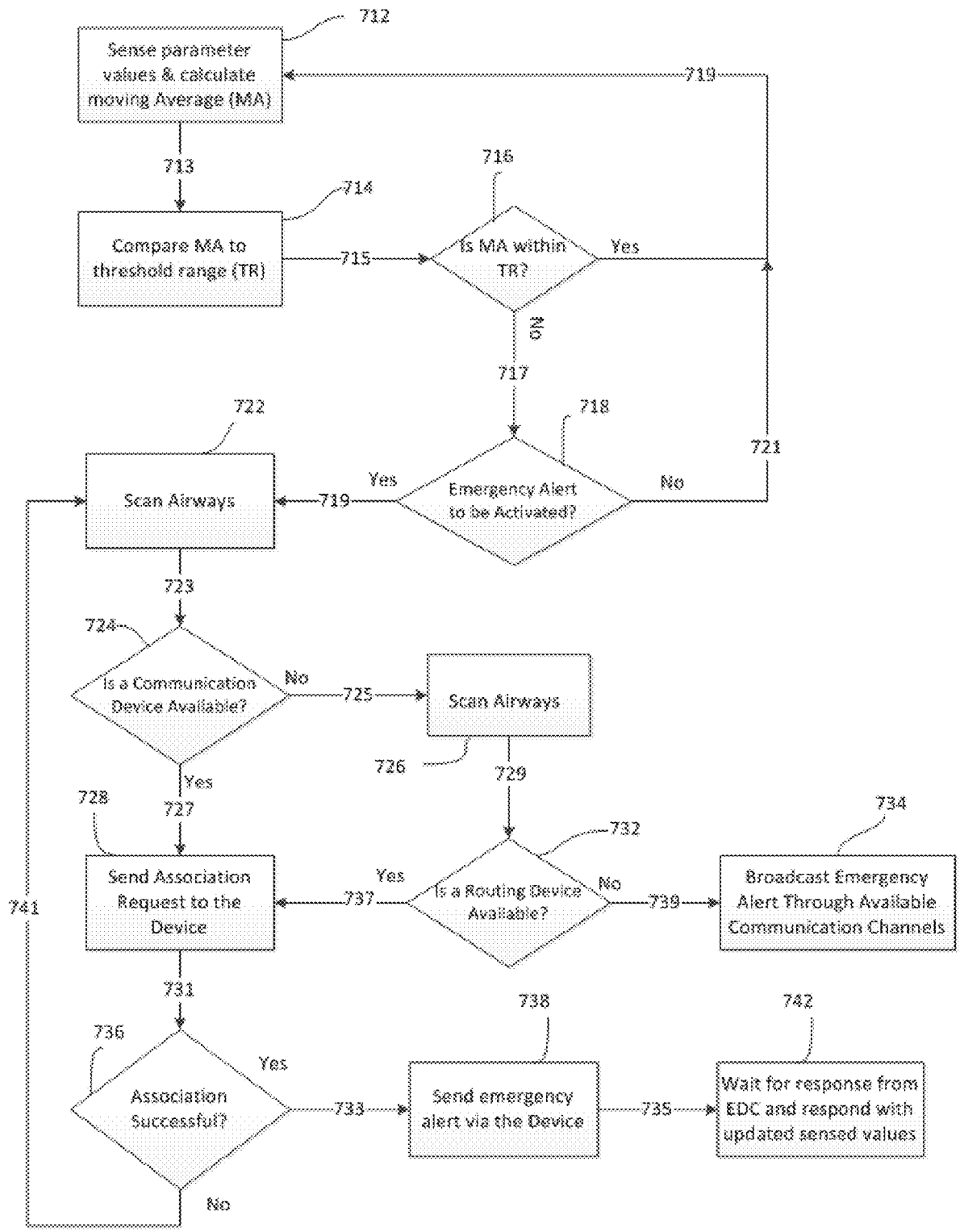
FIG. 7 depicts one embodiment of a method by which a sensor or a wearable device may trigger and send an emergency alert.

FIG. 7 depicts one embodiment of a method by which a sensor or a wearable device may trigger and send an emergency alert. The sensor 612 (see FIG. 6) may sense environmental characteristics through a sensing component on the sensor 612 and may calculate a moving average (MA) of these sensed values 712.

In some embodiments, the sensor may trigger an emergency alert when the sensed parameter is outside of a predefined threshold range (TR). The threshold range may be inputted by the user, setup during installing and updated by the user or other authorized agents. The advantage of calculating a moving average (MA) is that it will reduce the impact of a few aberrant sensor measurements and trigger the alarm if several measurements are outside the predefined range. It is contemplated that other functions and algorithms may be used in the place of or in addition to MA.

The sensor may then compare the MA to a set of threshold ranges for each environmental variable sensed by the sensor 714. If the MA of the environmental characteristics is within range TR 716, then the sensor may return to sensing the environmental characteristics by waiting for the next sample interval to sense the values and calculate a new MA for the sensed environmental characteristics. If the MA of the sensed environmental value is not in TR, the sensor may activate the emergency alert 718. To send the alert, the sensor may scan the environment around it, by generally scanning the airways for electromagnetic signals, to detect a communication device 722, or a routing device 732 to associate with in order to send a request for emergency assistance to an EDC 734.

In some embodiments, the sensor may compare the sensed parameter to a predefined warning range. In some embodiments, if the sensed parameter is outside of the predefined warning range, the sensor may send a warning signal to the communication device and the warning may be forwarded to an EDC with user input.

If a communication device is found 724 then the sensor sends an association request to the communication device 728. If the association with the communication device is not successful 736, then the sensor may return to scanning the airways 722 for another communication 724 or routing device 732. Upon successful association with the device 736, the sensor sends request for emergency assistance via the communication device 738. The communication device that is used for sending the emergency alert may be referred to as the connected device. The communication device may wait for a response from the EDC via the connected device, and responds to the requests from the EDC 742 via the connected device while also updating the user about any specific messages given by the EDC. When there is no communication device available for association 724, the sensor checks if it has detected a routing device 732. If no routing device is found 732, then the sensor broadcasts a request for emergency response over a communication link available to the sensor via the communication module of the sensor 734. If a routing device is found 732 then the sensor may send an association request to the routing device 728. If the association with the routing device is not successful (act), then the sensor may return to scanning the airways for another communication or routing device 726. Upon successful association with the routing device 103 736, the sensor places a call for emergency assistance. Subsequently, the sensor may respond to requests for information (e.g., temperature, pressure, smoke level, etc.) from the EDC 742 via the connected device while also updating the user.

Figure 8:
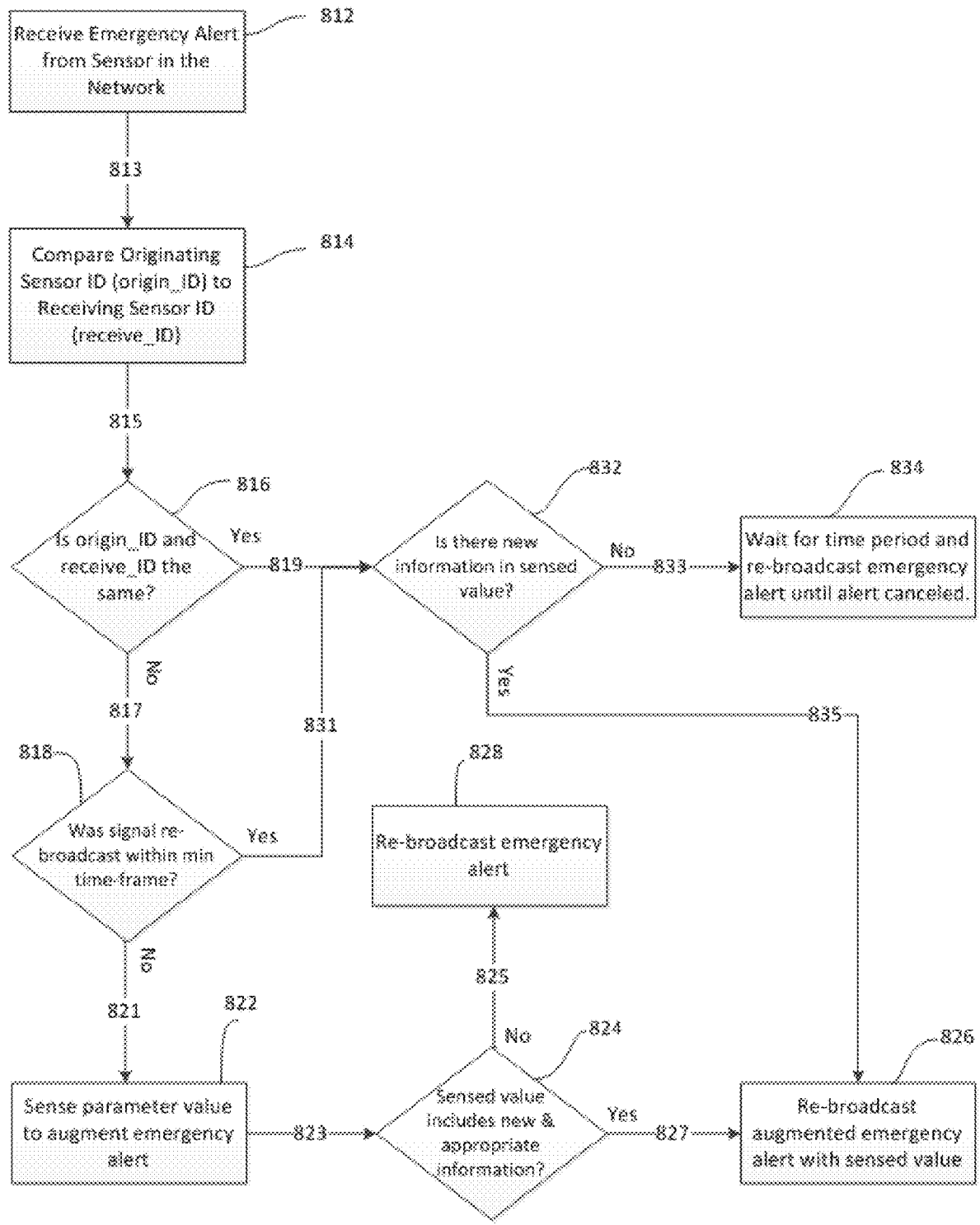
FIG. 8 depicts one embodiment of a sensor in a network that may broadcast the emergency alert.

FIG. 8 depicts one embodiment of a sensor in a network that may broadcast the emergency alert. In some embodiments, the sensor is in a wirelessly connected network such as an IoT network, a wireless sensor network or a wireless sensor and actuator network. A sensor (such as sensor 612 in FIG. 6) may be in a sensor network (not shown). When a sensor receives a request for emergency assistance from another sensor in the sensor network, it re-broadcasts this request, and updates the information in the request, if updated information is available. It is understood that the sensor network may be WSN or WSAN. A sensor in a sensor network may detect reception of a request for emergency assistance at the communication module of the sensor 812. The sensor then compares the "sensor ID" in the received signal to verify if the request is from another sensor in the same, or different, sensor network 814. If the same sensor is the originating sensor of the request 816, then the sensor may check if there is updated situational awareness about the request for emergency assistance 832. The sensor may check the sensed signal at the sensing component or by another method, and upon detecting no new information to send the sensor may stop the process and re-broadcast alert after a wait time 834. If the sensor detects new information about the request for emergency assistance 832, it may construct a new signal representing the updated sensed values and may broadcast this new information along with a re-broadcast of the original request for emergency assistance 826.

Upon detecting that the sensor ID in the request for emergency assistance is different from the receiving sensor's ID 816, the sensor may check if the same request for emergency assistance was broadcast by the sensor within a minimum time-frame prior to reception of the request 818. If the same request for emergency assistance was broadcast 818, then the sensor may checks if there is updated information about the request for emergency assistance 832, either via checking the sensed signal at the sensor module of the sensor or by another method, and upon detecting no new information to send the sensor stops the process and re-broadcast periodically 834. If the sensor detects new information about the request for emergency assistance 832, it may construct a new signal representing the updated sensed values and broadcasts this new information along with a re-broadcast of the original request for emergency assistance 826.

Upon detecting that the received request for emergency assistance was not broadcast by the receiving sensor within a minimum time-frame prior to the time of reception of the request 818, the receiving sensor may sense the environment variables that pertain to this request from the sensor module on the sensor and verifies if this new information will enhance the received request for emergency assistance 822, 824. If the sensor detects new information, it may check if this new information will enhance the request for emergency assistance 824. If the sensor decides that it will enhance the received request for emergency assistance, it may construct a new signal representing the updated sensed values and broadcast this new information along with a re-broadcast of the original request for emergency assistance 826. If the sensor detects that this new information will not enhance the received request for emergency assistance 824 it re-broadcasts the original request for emergency assistance 828.

For example, during an emergency situation such as a fire, the first responders that arrive at the scene may be able to receive the re-broadcast alert with sensed information (i.e., the augmented alert). As the responders approach the site of the emergency, they may activate a Wi-Fi receiver to receive information from smoke sensors in the vicinity. In this way, the first responders may gather additional situational awareness about the emergency and respond appropriately. In some embodiments, the first responders may be able to send a request for information from sensors in the vicinity to identify people and pets in an indoor location during a fire.

Figure 9:
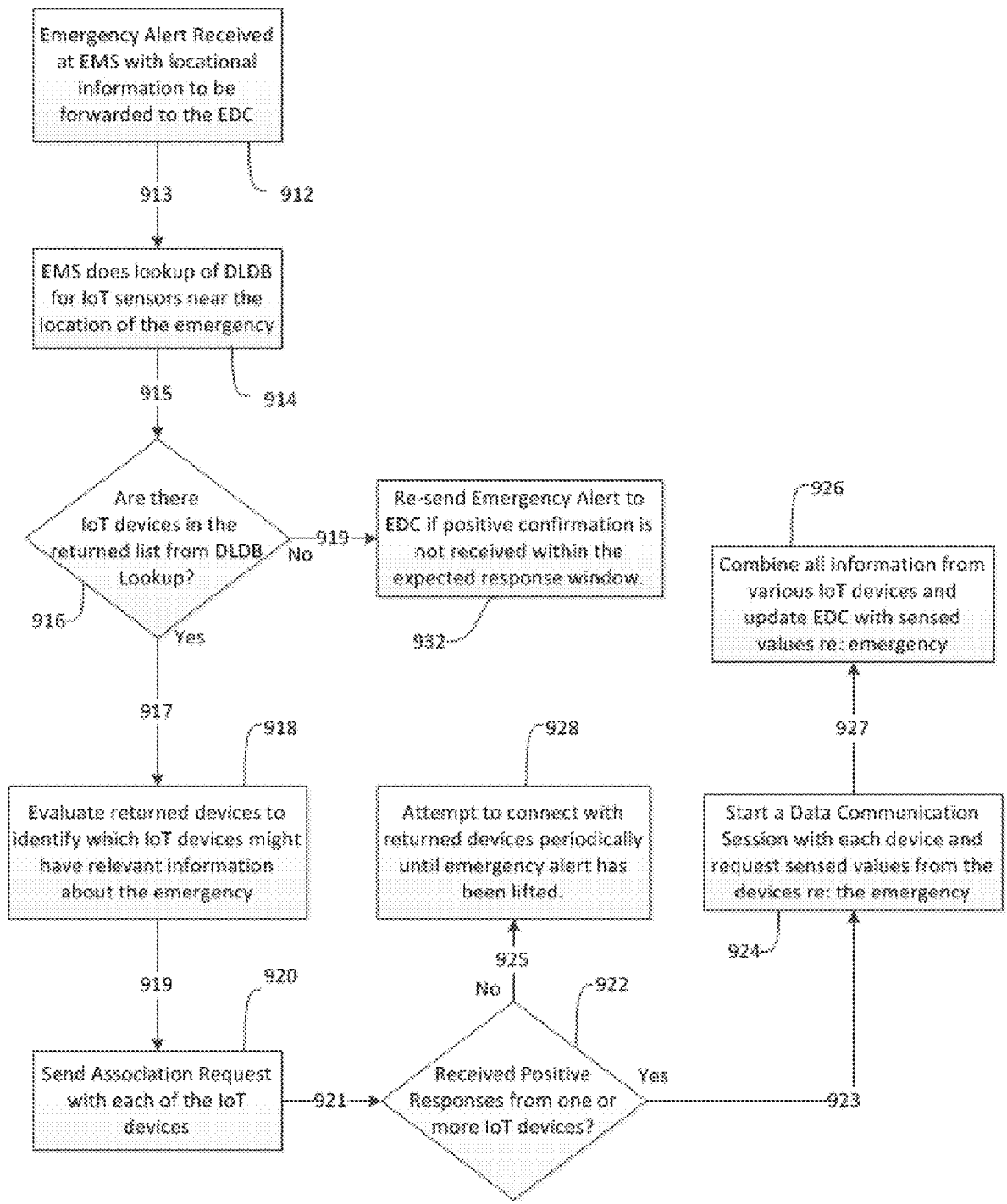
FIG. 9 is an illustration of one embodiment of a method for sending a query to a sensor for updated sensed parameters.

In some embodiments, an EMS 630, or an EDC 650 (see FIG. 6), may request situational awareness information from sensors 612, identified to be in the vicinity of the user communication device 606 requesting emergency assistance. FIG. 9 is an illustration of one embodiment of a method for sending a query to a sensor for updated sensed parameters. When the EMS receives a request for emergency assistance from a user communication device for example a wearable device, the EMS may forward it to the EDC 912. Then, the EMS may send a query to a database of IoT devices associated with that location (e.g., address) or user. IoT devices may include temperature sensors, or pressure sensors, which may have addition information about the emergency situation. In some embodiments, the database may include communication devices associated with a physical address or user.

Upon receiving a returned list of IoT devices that may have situational awareness information about the emergency from the database, the EMS may request to establish a communication link with each of these sensors, either directly or via in-directly via an intermediate device for example an routing device hosted at the location of the sensors being contacted 916. When the communication link is established, a communication session with these individual sensors can be held. In the communication session, the EMS may request pertinent information stored on the sensor about the on-going request for emergency assistance that is being responded to. Once the EMS has received information from all, or at least a majority of sensors, the EMS may combine the information received from each of the sensors and share the combined information with the EDC currently serving the request for emergency assistance 932.

In some embodiments, the EDC or EMS may assign unique numbers to each individual sensor so they can be called for information during an emergency. In some embodiments, the unique number assigned to individual sensors may follow a set format wherein the unique number assigned to a given sensor is sensitive to the location, type and housing structure where the sensor is located. In some embodiments, the sensor name can be used to identify the area and building where the sensor is location.

Figure 10:
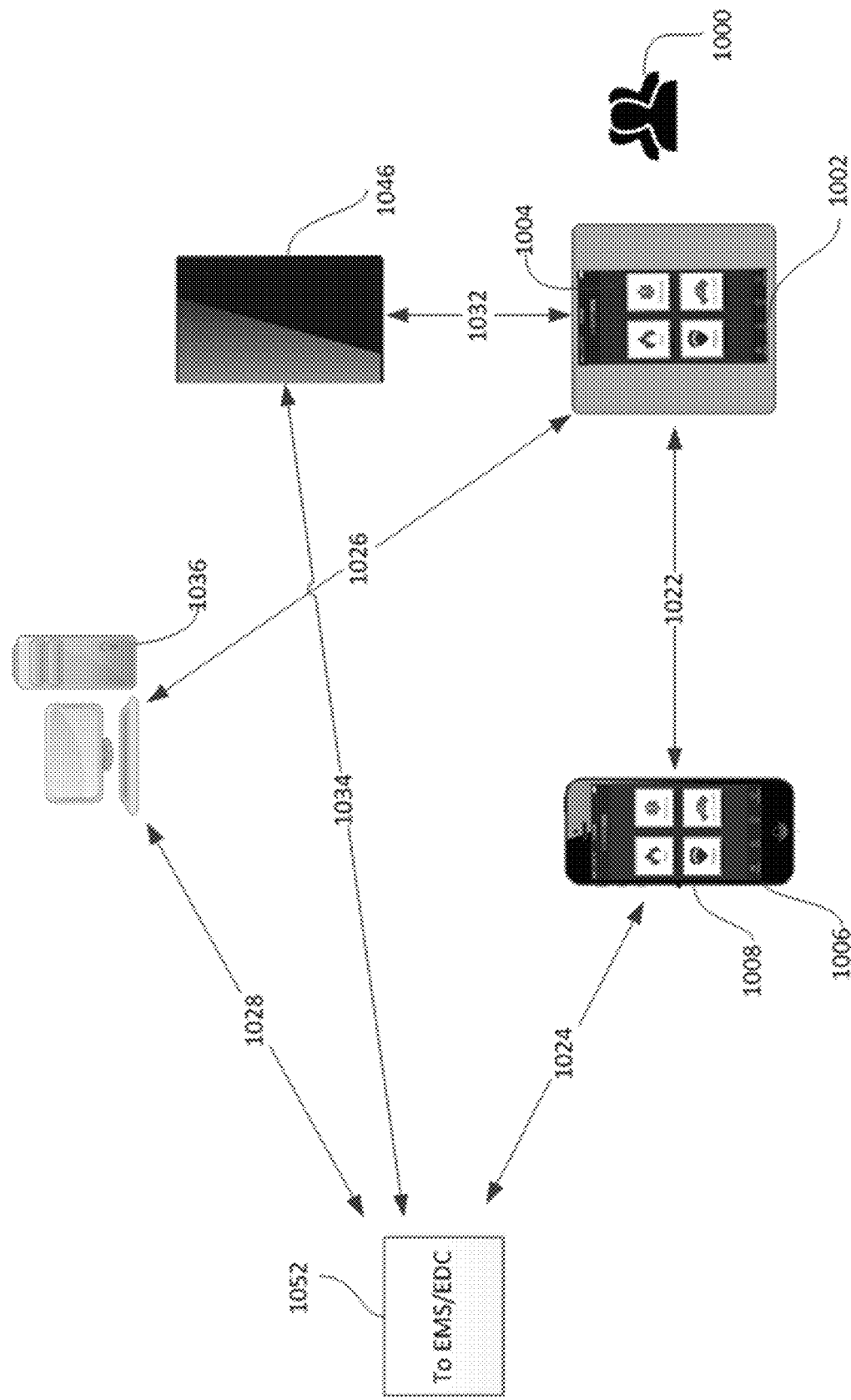
FIG. 10 is an illustration of one embodiment of a system including a list of communication devices for sending the emergency alert.

In some embodiments, the wearable device 1002 may attempt to establish communication links with a plurality of communication devices through direct or indirect communication links for sending the emergency alert as shown in FIG. 10. As shown, a wearable device 1002 with installed application 1004 sends the emergency alert to an EDC or EMS 1052 via a communication device 1006 with installed application 1008. As depicted, the communication device 1006 may be a phone, a desktop 1036, a tablet 1046. The wearable device 1002 may maintain a list of communication devices that can potentially be used to send the emergency alert via communication links 1022, 1024, 1026, 1028, 1032, 1034. In some embodiments, the wearable device 1002 maintains a prioritized list of communication devices 1006, 10036, 10046, using pre-defined priorities, in the list of communication devices stored at the wearable device 1002. In some embodiments, the user 1000 may identify the communication devices included in the prioritized list and may assign the priority. In other embodiments, without user input, the prioritized list may be generated in the wearable device 1002 based on variables such as proximity, signal strength from the communication devices or "recently connected devices."

Based on the prioritized list, the wearable device 1002 may attempt to establish a direct data communication link 1022, 1024 with the communication device 1006. Upon a failure to do so, the wearable device 1002 may then attempt to establish a data communication link with a second communication device in the prioritized list of communication devices and so on until a successful data communication link is established between the wearable device 1002 and one of the communication devices and positive confirmation is received from the EDC 1005 (for example, along communication link 1024, 1028, 1034, about the indication of the emergency alert sent by the wearable device 1002. It is understood that "positive confirmation" referred to herein may refer to an acknowledgement (or an "ack" message) or a human-initiated confirmation or analog signal from the EDC. For example, if the EDC 1050 or EMS 1030 (not shown) responds to the emergency alert, the wearable device 1002 may receive SIP signals.

In some embodiments, it is contemplated that the wearable device 1002 may use an algorithm to choose the fastest and most efficient link to send the emergency alert. So, the wearable device 1002 may attempt to establish to communication link with a plurality of communication devices (1006, 1036, 1046 simultaneously. Based on the response time and quality of the response, the wearable device 1002 may choose the best device to send the emergency alert. In some cases, it may be desirable for the wearable device 1002 to send the emergency to a plurality of communication devices (1006, 1036, 1046), simultaneously.

Figure 11:
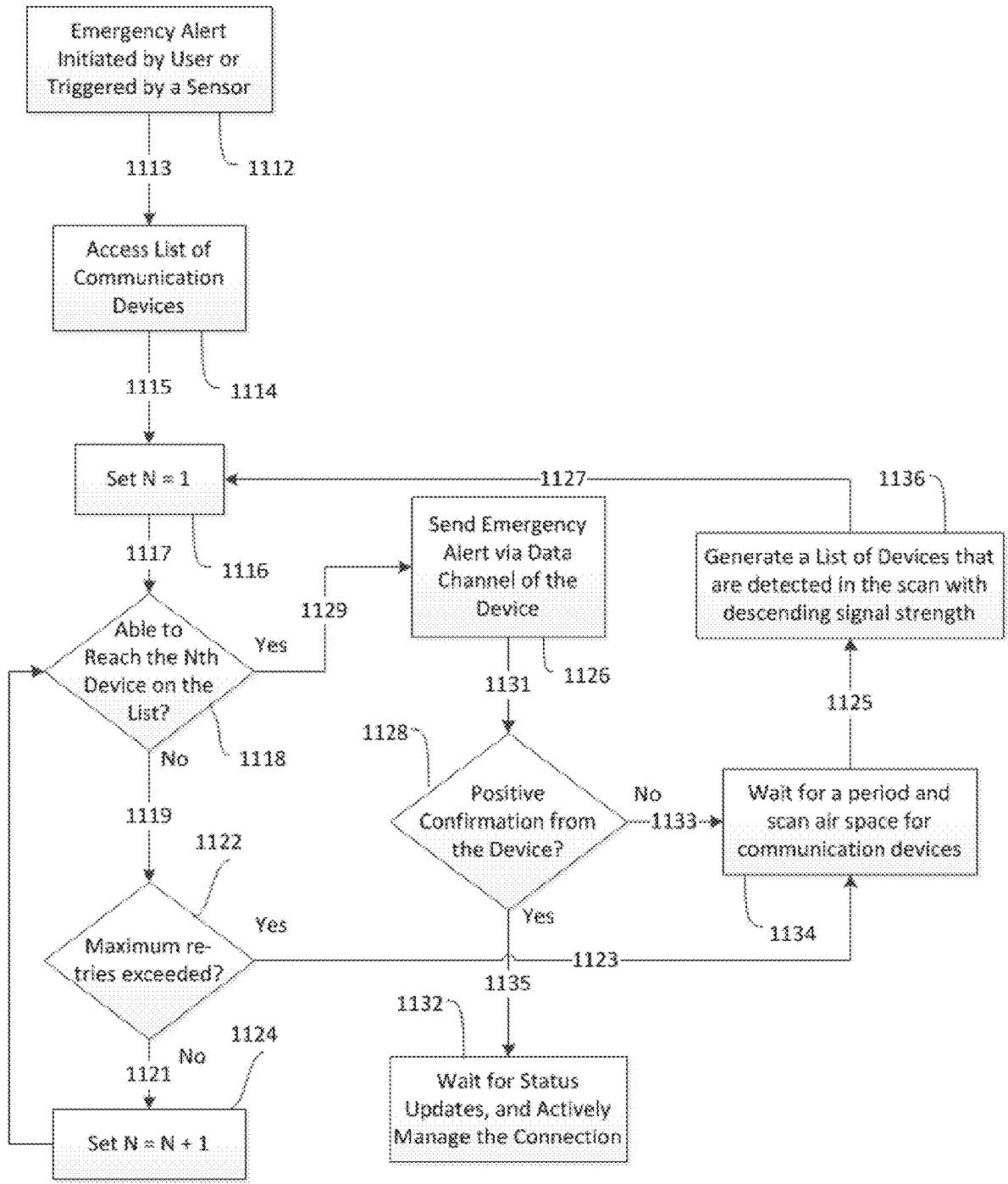
FIG. 11 depicts one embodiment of a method by which a sensor or wearable device may choose a communication device from a list.

FIG. 11 depicts one embodiment of a method by which a sensor or a wearable device may choose a communication device from a list. For example, the wearable device 1002 may choose the communication device 1006 (see FIG. 10) for establishing a data communication link 1022, 1024 for sending an emergency alert to an EDC 1050. Referring to FIG. 11, when an alert is initiated 1112, the wearable device 1002 may access a list of communication devices 1114, which may be a prioritized list. The wearable device may attempt to reach the first communication device in the prioritized list 1116, 1118. If the wearable device is unable to reach the first device on the list and a maximum number of attempts to reach the first communication device are not exceeded 1118, 1122, then the wearable device may wait for a period and attempt to send the alert 1134, 1136. If the first device is not reachable, the wearable device will find a next communication device in the list reach 1124, 1118. In some embodiments, if a maximum number of retries are reached and all communication devices in the list are attempted to be reached, the wearable device may display an error message to the user (not shown) and cancels the request. If a communication device is reached, the wearable device sends a message including an indication of an emergency alert 1126 via the communication device. Upon positive confirmation from the communication device, the wearable device waits for status updates from the communication device and actively manages the connection 1128, 1132. If a positive confirmation is not received within a specified period of time, a "time out" may occur (not shown). The wearable device may check to see if there are other communication devices it can connect to 1134, 1136. If other devices are found that the wearable device has not yet attempted to connect to, it may attempt to connect to the first such device in the prioritized list. If the wearable device does not find a communication device in the list that it has yet to attempt to connect (not shown), the wearable device cancels the request and displays an error message to the user (not shown). In some embodiments, in the absence of a prioritized list or when devices from the list are non-responsive, the wearable device may attempt to send the emergency alert through devices that are in the proximity or "recently connected devices."

Figure 12:
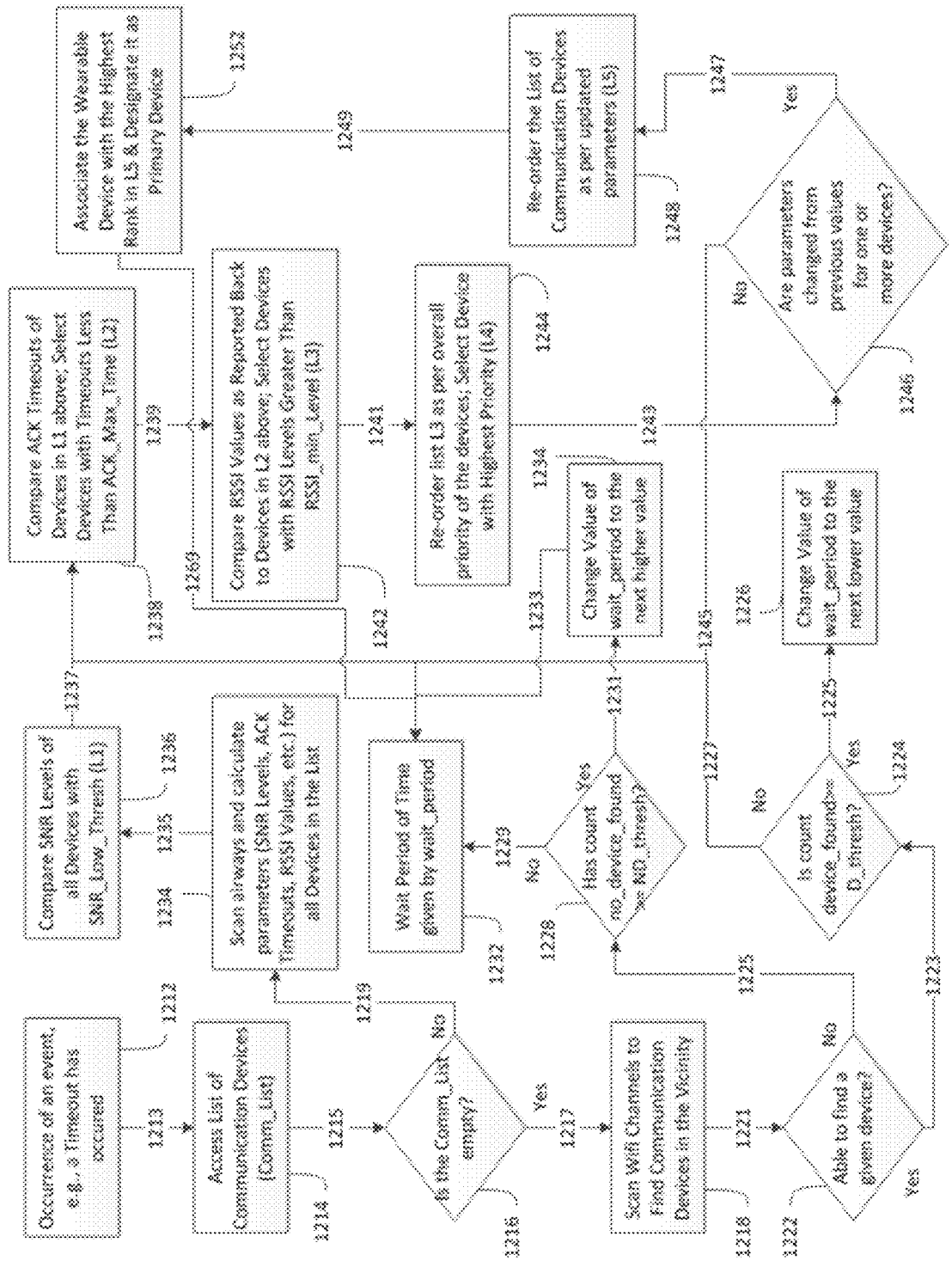
FIG. 12 depicts one embodiment of a method by which a sensor or wearable device may update a prioritized list of communication devices.

FIG. 12 depicts one embodiment of a method by which a sensor or wearable device may prioritize the first communication devices. The wearable device may detect the occurrence of an event, either a periodic time-out of a reception of a signal or a user initiated event for example a request for emergency assistance 1212. The wearable device may then access a list of first communication devices (list L5) 1214 and checks to verify if the list is empty or populated 1216. If the list is empty 1216 then the wearable device may search the wireless channels for detecting another device to pair with 1218, and then verifies if it was able to find another wireless device to pair with 1222.

If the wearable device 102 is able to find a device to pair with 1216 then it checks if the count, of how many cycles the particular pairable device has been found at the given priority level, is greater than a predefined threshold, D_Thresh, 1224 and if the count is indeed greater than D_Thresh 1224, then decrements the value of "wait_period" to next lower value 1226 and waits for the period of time defined by "wait_period" 1232 before detecting another timeout or user based event 1212. If the count is not greater than D_Thresh 1224, then the wearable device compares the SNR values of all the devices currently pairable or communicable by the wearable device in the list (L1) of first communication devices 1238 and selects only the devices with a SNR value of at least the minimum predefined value of "SNR_low thresh" in order of the SNR value of each device, and follows this up by comparing the ACK Timeouts of the first communication devices that are selected in act 1238 above 1242 and chooses devices from this list (L2) which have a ACK Timeout value of less than a predefined threshold of "ACK_max_Time", and after this the wearable device requests its own RSSI values as seen by individual first communication devices in the qualified list of communication devices L2 and selects devices with RSSI levels reported to be higher than a certain predefined value "RSSI_min_level" in the order of the RSSI value to generate a further qualified list L3 of the first communication devices 1242.

The received signal strength indicator (RSSI) is a measurement of the power present in a received radio signal. The wearable device then re-orders the list with the priority that is not based on communication link quality indicators 1244 and generates a list L4 and verifies to see if any of the devices has a changed position in the list of first communication devices (L5) 1246, 1248 and upon not finding any device with a changed position the wearable device waits for the period of time defined by "wait_period" 1232 before detecting another timeout or user based event 1212.

If even one of the devices has a changed position in the list of first communication devices (L5) 1246, then the wearable device 102 re-orders the list L4 of first communication devices 101 as per the updated parameters (list L5) to generate a final list of first communication devices 1248 and then chooses a first communication device from the list that is at the highest priority in the list of first communication devices L5, and associates the wearable device with this chosen first communication device 1252. If the wearable device is not able to find a device to pair with 1222 then it checks if the count, of having not found any pairable device, is greater than a predefined threshold, ND_Thresh 1228, and if the count is indeed greater than ND_Thresh 1228, then increments the value of "wait_period" to next higher value 1234 and waits for the period of time defined by "wait_period" 1232 before detecting another timeout or user based event 1212. Otherwise, the wearable device may wait for the period of time defined by "wait_period" 1234 before detecting another timeout or user based event 1212 without incrementing the "wait_period" to the next higher value. In some embodiments, if the list of first communication devices (L5) is not empty, then the wearable device checks to see if any of the parameters about any of the devices in the list (L5) are updated, and if none of the devices have any updated parameters then it waits for the period of time defined by "wait_period" before detecting another timeout or user based event. If even one of the devices has an updated parameter, then it may follow the steps outlined for ACT 207 above when the ACT decides "NO" for the question asked.

Figure 13:
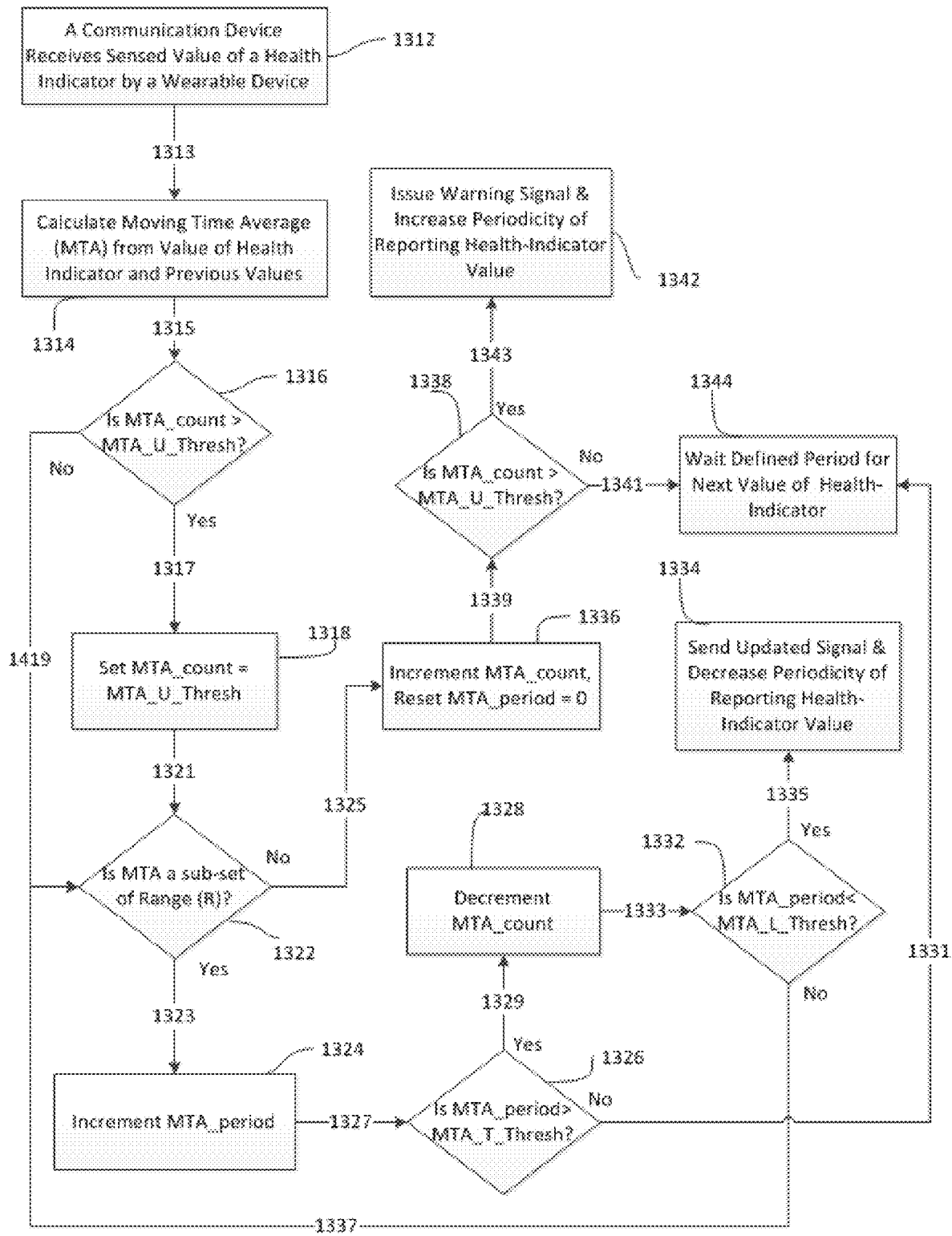
FIG. 13 depicts one embodiment of a method by which a sensor or a wearable device may determine its distance from a communication device.

FIG. 13 depicts one embodiment of a method by which a wearable device may trigger an emergency alert by monitoring a user's health indicators. For example, the alert may be sent to an EDC 1050 via a communication device 1006 by a wearable device 1002 based on a determination of a value of a health indicator of a user deviating from a pre-defined preset acceptable range for the health indicator (see FIG. 10). Referring to FIG. 13, when a value pertaining to a health-indicator is received at the communication device from the wearable device 1312, a first a moving-time average (MTA) of the received values pertaining to this health-indicator is calculated 1314. If the value of MTA_count, a variable named storing the number of times the MTA value has fallen outside a pre-defined range (R) defined for the given health-indicator 1316, is determined to be larger than MTA_U_Thresh, a variable storing the maximum value of MTA_count before a warning signal is issued pertaining to the given health-indicator, MTA_count is reset to the value of MTA_U_Thresh 1318. If MTA_count is less than MTA_U_Thresh, MTA is compared to R, to check if the numerical value of MTA is within the range of values indicated by R 1322. It is understood that the pre-defined range (R) may be inserted by the user or a health-provider. If MTA is not in the range specified by R, then MTA_count is incremented and the value of MTA_period, a variable storing the number of consecutive times the value of MTA was a sub-set of R, is reset to zero 1322. Immediately after MTA_count is compared to MTA_U_Thresh 1338 and if the value of MTA_count is greater than value of MTA_U_Thresh, a warning signal is issued to the wearable device and the EDC by the communication device 101 and the periodicity of reporting of the value of the health-indicator is increased 1342.

If the MTA_count is less than or equal to the value of MTA_U_Thresh, then the system may be instructed to wait for a predefined period of time for the next periodic value of the health indicator 1344. As used herein, the system includes the wearable device 1002 including one or more sensors, the communication device 1006, the EDC 1050 (see FIG. 10), and an EMS (if present). If MTA is in the range specified by R, then MTA_period, a variable referring to a memory location and storing the number of times the MTA value has consecutively fallen inside a pre-defined range (R) defined for the given health-indicator 1322, the MTA_period is incremented 1324 and then compared to MTA_T_Thresh, a variable referring to a memory location and storing a number indicating a particularly high value for MTA_period 1326. If the MTA_period value is less than the MTA_T_Thresh then the system is instructed to wait for a predefined period of time for the next periodic value of the health indicator 1344. If the MTA_period value is greater than the MTA_T_Thresh then the MTA_count is decremented 1328 and compared to MTA_L_Thresh, a variable referring to a memory location and storing a number indicating a particularly low value for MTA_period 1332. If the MTA_count is less than the value of MTA_L_Thresh then an updated warning signal is sent to the EDC or EMS and the periodicity of reporting that particular health-indicator is decreased 1334. If the MTA_count is greater than MTA_L_Thresh, then the system is instructed to wait for a predefined period of time for the next periodic value of the health indicator.

Figure 14:
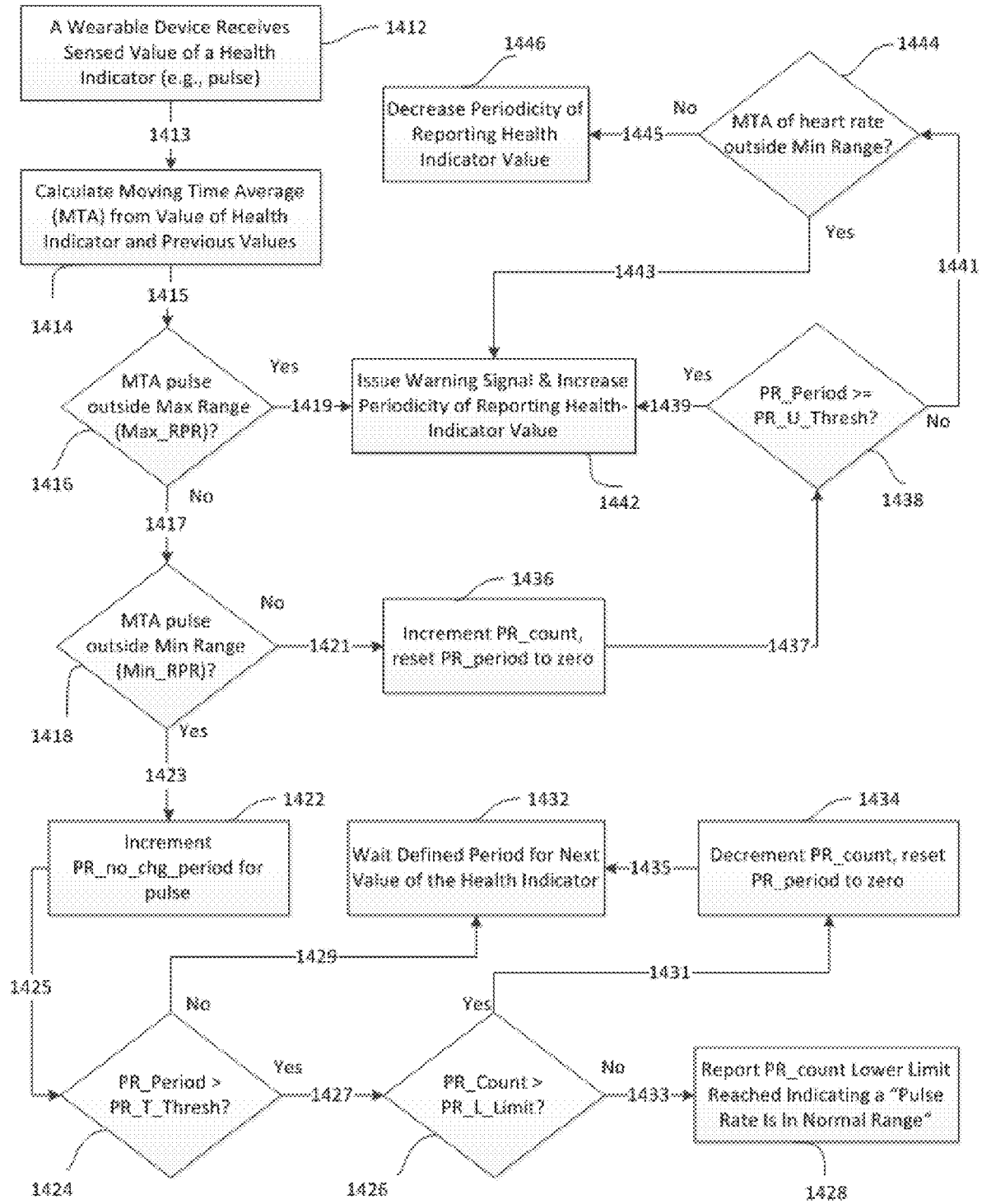

FIG. 14 depicts one embodiment of a method by which a wearable device adjusts the monitoring frequency of a user's health indicators. A wearable device may monitor health-indicators 1412 for the user and the environmental characteristics of the wearable device. On a periodic basis, or based on request from the user or the EDC, the most current sensed values of the predefined health-indicators are observed 1414. These values are then provided to a mathematical function wherein the moving time-average (MTA) of the past certain sensed values of the individual health-indicators is calculated 1414 and in this case, checked to see if the MTA of the pulse-rate, also the primary health-indicator in this embodiment, of the user 100 is out of a predefined range 1416, 1418. If the MTA of the pulse-rate is out of range a predefined maximum range, Max_RPR 1416, the wearable device may issue a warning signal 1442, either displayed at a user-interface of the wearable device or sent to an EDC via a first communication device and an, and then waits for a specific period of time 1432 before sensing the health-indicators and environmental characteristics. If the MTA of the pulse-rate is not out-of-range a predefined maximum range, Max_RPR 1416, the wearable device checks if the MTA of the pulse-rate is out-of-range a predefined minimum range, Min_RPR 1418.

In some embodiments, the wearable device increments a count, "PR_count", if the MTA of the pulse-rate is out-of-range of the Min_RPR range 1536, and checks to verify if the PR_count has equaled or passed a minimum threshold set for the pulse-rate to be out-of-range from the Min_RPR range 1422. If the PR_count is indeed equaled or passed a maximum threshold set for the pulse-rate, the wearable device issues a warning signal, either displayed at a user-interface of the wearable device or sent to an EDC via a communication device and an EMS, and then waits for a specific period of time 1432 before sensing the health-indicators and environment characteristics. If the PR_count has not equaled nor passed the maximum threshold set for the pulse-rate, i.e. the PR_count is less than the PR_U_Thresh 1422, then the wearable device checks to verify if the MTA value of the heart-rate sensed values is out of range a predefined maximum range 1444.

In some embodiments, the wearable device sends a warning signal or an emergency alert based on the MTA value. If the MTA value of the heart-rate sensed values is indeed out of range a predefined maximum range 1444, then wearable device issues a warning signal 1442 and waits for a specific period of time before sensing the health-indicators and environment characteristics. If the MTA value of the heart-rate sensed values is not out of range of a predefined maximum range 1444, then wearable device updates the EMS with the latest measured values of the pulse-rate and heart-rate, and any other health-indicators, and decreases the periodicity of sensing and reporting health-indicator values 1446. If the MTA of the pulse-rate is indeed out-of-range a predefined minimum range, Min_RPR 1418, the wearable device updates a counter for tracking the no change in pulse-rate over a period of time "PR_no_chg_period" 1422 and checks to see of the counter "PR_no_chg_period" has reached a predefined lower threshold for the counter 1424. If indeed the counter "PR_no_chg_period" has reached a predefined lower threshold for the counter 1426, then the wearable device reports that the lower limit of the counter is reached and cannot be decremented any more 1428, indicating good pulse-rate of the user at the given time, otherwise the wearable device decrements the PR_count.

In one embodiment, provided herein are a methods for sending an emergency alert from a sensor comprising: sensing a parameter by the sensor, wherein the parameter is a health indicator of the user or one or more environmental characteristics; comparing the parameter to one or more predefined ranges; triggering an emergency alert when the parameter is outside of the predefined alarm range or a warning signal when the parameter is outside the predefined warning range; scanning the airways around the sensor to locate one or more communicating devices; selecting a communication device based on factors including a received signal strength indicator (RSSI) of the communication device at the sensor, received signal strength of transmissions from the communication device at the sensor, availability of wireless or wired channels for communication between the sensor and the communication device, transmission delay on the communication link between the sensor and the communication device, and other factors indicative of quality of a communication link between the sensor and the communication device; selecting a routing device, when the communication device is unavailable, based on factors including one or more of a received signal strength of the routing device at the sensor, availability of wireless or wired channels for communication between the sensor and the routing device, ability to authenticate with the routing device, transmission delay on the communication link between the sensor and the routing device, and other factors indicative of quality of a communication link between the sensor and the routing device; establishing a communication link to at least one of the communication device or the routing device, wherein the routing device establishes an indirect communication link with a communication device; and sending one or more of the emergency alert and warning signal via the connected device to an emergency dispatch center (EDC). In some embodiments, the sensor actively manages the communication link with the communication device whereby the sensor can respond with additional information. In some embodiments, the sensor further hosts an application client which sends the emergency alert. In some embodiments, the connected device hosts an application client which sends the emergency alert. In some embodiments, the sensor is in a sensor network such as an IoT network, a wireless sensor network or a wireless sensor and actuator network. In some embodiments, the sensor is in a wearable device. In another embodiment, provided herein are systems for sending an emergency alert comprising: a sensor comprising a sensor module and a communication module, wherein the sensor module senses one or more parameters and the communication module is able to establish a communication link; a communication device, wherein the communication device is able to participate in the communication link with the sensor and the communication device is available for sending an emergency alert; an emergency management system (EMS) for receiving the emergency alert from the communication device and for processing and forwarding the emergency alert to an emergency dispatch center (EDC). In one embodiment, the emergency alert includes situational awareness information in a multi-media message.

In one embodiment, provided herein are methods for receiving a request for assistance from a sensor in a sensor network at an Internet enabled device, this method comprising: determining, by the sensor, a need for requesting emergency assistance based on a sensed parameter determined from a sequence of measurements taken by the sensor regarding one or more environmental characteristics of an environment the sensor is placed in; selecting, by the sensor, a communication device, based on a scan of the airways around the sensor, the communication device selected based on factors including one or more of a received signal strength indicator (RSSI) of the communication device at the sensor, received signal strength of transmissions from the communication device at the sensor, availability of wireless or wired channels for communication between the sensor and the communication device, transmission delay on the communication channel between the sensor and the communication device, and other factors indicative of quality of a communication channel between the sensor and the communication device; responsive to detecting that a communication device is unavailable for sending a request for emergency assistance, selecting a routing device, based on factors including one or more of a received signal strength of the routing device at the sensor, availability of wireless or wired channels for communication between the sensor and the routing device, ability to authenticate with the routing device, transmission delay on the communication channel between the sensor and the routing device, and other factors indicative of quality of a communication channel between the sensor and the routing device; upon selecting at least one of the communication device and the routing device as a connected device, setting up a communication session with the connected device, and sending a request for emergency assistance via the connected device; upon receiving a response from the connected device to the request for emergency assistance, and based on the response, changing a periodicity of reporting environment characteristics as sensed by the sensor to the connected device by one of constructing new warning signals or sending unformatted data to the connected device; and actively managing the communication session between the sensor and the connected device, and upon detecting that the connected device is unresponsive to messages sent by the sensor, scanning the airways and selecting an alternate communication device or routing device to send requests for emergency assistance to an EDC.

In some embodiments, the sensor in the sensor network further hosts an application client which initiates a communication session with one of a communication device or routing device, and constructs and sends, using the hardware provided by the sensor, a warning signal and a request for emergency response to the one of the communication device or routing device.

In some embodiments, the sensor and the sensor network it is placed in, are located in one of a residential environment, a corporate office environment, an industrial factory environment, or a public space. In some embodiments, the sensed parameter comprises one or more of temperature, pressure, air flow, amount of ambient light in the vicinity of the sensor, amplitude and frequency variations of sound vibrations in the vicinity of the sensor, electromagnetic field variations, and other environmental parameters sensed by the sensor.

In some embodiments, the method further comprises initiating, by the sensor, the request for emergency response by connecting to one of a communication device or routing device via another one or more sensors in the same or a different sensor network that the sensor belongs to, the communication link between the sensor and the one of the communication device or routing device containing at least one type of communication protocol linking the two. In some embodiments, the sensor network is an Internet of Things network containing a multitude of sensors and a communication protocol linking the sensors to each other and to the Internet.

In one embodiment, provided herein are methods for broadcasting a request for assistance from a sensor in a sensor network. The method comprising: determining, by the sensor, a need for requesting emergency assistance based on a sensed parameter determined from a sequence of measurements taken by the sensor regarding one or more environmental characteristics of an environment the sensor is placed in; detecting, by the sensor, one of a communication device or a routing device; upon detecting, by the sensor, based on a scan of airways around the sensor, that the one of the communication device or routing device is unavailable for sending a request for emergency assistance, sending, by the sensor, requests to other sensors in the sensor network to accept and re-broadcast a warning signal and request for emergency response in their area of influence; upon receiving, by the other sensors in the sensor network, the requests to re-broadcast the warning signal, re-broadcasting the warning signal by the other sensors in the sensor network, via communication interfaces of the other sensors in the sensor network, in their area of influence; upon detecting at a sensor updated information about environmental characteristics sensed by the sensor, and responsive to determining that the environment characteristics are pertinent to an active request for emergency assistance sent and managed by one of the sensor or another sensor in the sensor network, including the updated information along with the request for emergency assistance being re-broadcast; and responsive to the sensor detecting the updated information being the sensor that initiated the request for emergency response, updating the warning signal and the request for emergency response and broadcasting the updated warning signal and request for emergency response.

In some embodiments, the warning signal and the request for emergency response are formatted for any Internet enabled device with an ability to receive wireless signals at the frequency of broadcast of the sensor and to understand the signal contents.

In some embodiments, the sensor and the sensor network are located in one of a residential environment, a corporate office environment, an industrial factory environment, or a public space.

In one embodiment, provided herein are user mobile communication devices configured to receive a request from a sensor in a sensor network, the user communication device comprising: a user interface; physical interaction components; a communication module configured to send and receive messages over a communication network; and a processor configured to: receive a request for assistance in an emergency situation from the sensor over one of a wireless or a wired channel, and acknowledge the request to the sensor; receive an indication of the type of emergency contained in the request for assistance from the sensor; establish a data communication link to an EDC and send a signal to the EDC requesting emergency assistance based on the request for emergency assistance; determine whether to update the sensor about a response from the EDC; and establish and manage a data communication link to a sensor in a sensor network.

In one embodiment, provided herein are routing devices configured to receive a request for association from a sensor in a sensor network, the routing device comprising: physical interaction components; a communications module configured to send and receive messages over a communications network; and a processor configured to: receive a request for association from the sensor; make a decision to associate the sensor; perform an authentication sequence to authenticate the sensor responsive to an authentication process being required; receive a request for assistance in an emergency situation from the sensor over one of a wireless and a wired channel; acknowledge the request to the sensor; receive an indication of the type of emergency contained in a warning signal from the sensor; forward a request for emergency assistance received from the sensor to an EDC of established data communication links and update the sensor about a response from the EDC; and establish and manage a data communication link to the sensor.

In one embodiment, provided herein is a sensor in a sensor network and configured to send a request for emergency assistance, the sensor comprising: a user interface; physical interaction components; an environment sensor module capable of sensing a value of an environmental variable and sending an indication of the value to a processor of the sensor over a communication link internal to the sensor; a communication module configured to send and receive messages over a communication network; and a processor configured to: interpret data from the environment sensor module; construct a request for emergency assistance based on the sensed values as reported by the environment sensor module; construct a warning signal indicating a type of emergency sensed by the sensor; send the request for emergency assistance over one of a wired or a wireless channel, to an EDC via a communication device including one of a cellular phone and a routing device; send a request for association, and a request for authentication, responsive to an authentication process being requested, to one of a routing device or a communication device; receive an acknowledgment from the one of the communication device or the routing device about reception of the request for emergency assistance, and receive a response from the EDC to the request for emergency assistance via the one of the communication device or routing device; receive and re-broadcast a request for emergency assistance received from another sensor in the sensor network; and establish and manage a data communication link to one of a communication device, a routing device, or other sensors in the sensor network.

In one embodiment, provided herein is a method of facilitating a data communication link between a user of a wearable device, user, and a communication device, the method comprising: establishing a data communication link between a wearable device and a first communication device, wherein the first communication device is selected from a list of communication devices maintained at the wearable device, the order of communication devices in the list being prioritized based on periodically sensed parameters including one or more of received signal strength, number of messages not acknowledged within a specified period, delay in response of periodic signals sent from the communication device to the wearable device, and other indicators of quality of a data communication link; responsive to detection that the data communication link is established between the wearable device and the first communication device is not responsive to messages from the wearable device, establishing a second data communication link with a second communication device capable of constructing an emergency alert based on the indication of emergency alert sent by the wearable device and selected from a list of devices and sending an emergency indication to the second communication device; responsive to one of detecting that a data communication link cannot be established between the wearable device and any communication device in the list and upon detecting that a link between the wearable device and a first user communication device is severed, establishing a data communication link with an intermediate device, the intermediate device being a wireless router, a Wi-Fi router, a hub, or any device capable of switching digital messages between other devices, and establishing a data communication link between the wearable device and the first communication device via the intermediate device; receiving an indication of an emergency alert via a digital signal from the wearable device at the first communication device via the data communication link; constructing an emergency message at the first communication device that is based on an indication of emergency alert received by the wearable device, the indication of emergency alert being a form of a digital signal including at least one of an audio file, an interactive voice response (IVR) message, a Short Message Service (SMS) text message, a Multimedia Messaging Service (MMS) message, an e-mail message, an Instant Messaging (IM) message, and a message otherwise formatted for communication over the Internet, as specified by the emergency signal sent by the wearable device; sending this emergency alert to an emergency dispatch center; and actively managing all the data communication links established between the wearable device and any communication device.

In one embodiment, provided herein is a method for providing user health indicators to a user communication device, the method comprising: maintaining a database of one or more health indicators including one or more of heart-rate, pulse-rate, relative-position, blood-pressure, speed, and other personal health related information measured by the wearable device, periodically measuring a value of the one or more health indicators with the wearable device, and receiving at the communication device, from the wearable device, digital signals containing an indication of the value of each of the one or more health indicators in a pre-determined periodic fashion; maintaining at the communication device a range, the range containing one of a set of numeric values or a lower-limit and an upper-limit, for each of the one or more health-indicators measured by the wearable device, and comparing, at the communication device, a time-average of most recent values of each of the one or more health indicators to a respective range of each of the one or more health-indicators, and based on this comparison making a decision if one of the one or more health indicators is in-range or out-of-range, and upon deciding that the one of the one or more health-indicators is out-of-range, increasing the periodicity of receiving at the communication device, from the wearable device, digital signals containing an indication of the value of the one of the one or more health-indicators and issuing a warning signal indicating the one of the one or more health-indicators to be out-of-range, until a time the received values of the one of the one or more health-indicators is in-range; responsive to detecting that the data communication link between the wearable device and communication device is severed, storing all periodic measured values of the one or more health-indicators at the wearable device since the last successfully received value at the communication device and, responsive to the data communication link being re-established, receiving at the communication device, from the wearable device, all of the stored values of the one or more health indicators from the wearable device; calculating the distance of the wearable device from the communication device, based on the signal strength of the received digital signals, angle of arrival of the multi-path signals, and aspects of other signals received from the wearable device, and reporting this distance to an emergency dispatch center for the purpose of emergency response.

In one embodiment, provided herein is a user mobile communication device configured to receive an indication for emergency assistance from a wearable device, the user communication device comprising: a user interface; a communication module configured to send and receive messages over a communication network; a location determination module; and a processor configured to: receive an indication of a location of the user mobile communication device from the location determination module; establish a data communication link to an emergency dispatch center; and receive a real-time response from the wearable device to a message from the user mobile communication device regarding an emergency response.

In one embodiment, provided herein is a wearable device configured to send a request for emergency assistance to a user mobile communication device, the wearable device comprising: a user interface; a communication module configured to send and receive messages over a communication network; and a processor configured to: display a plurality of user-selectable emergency message indicators in the user interface, each of the plurality of user-selectable emergency message indicators indicative of a different type of emergency situation; receive an indication of a selection of one of the user-selectable emergency message indicators by a user; responsive to receiving the indication of the selection, generate a message including an indication of the selected one of the user-selectable emergency message indicators and an indication of a value of one or more health indicators of the user including blood-pressure, pulse-rate, temperature, speed, and other indicators from respective hardware based modules in the wearable device; and transmit a message indicating the type of emergency selected by the user in the user selectable interface and an indication of the values of the one or more health indicators via the communication module to the user mobile communication device.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises the Magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid-state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, user, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

EXAMPLES

Example 1

Wearable Device Requesting an Emergency Response

Jane Bond, a heart patient, is alone in her home. Jane is wearing a wearable device on her wrist with a pulse sensor, which measures her pulse-rate periodically. The wearable device is installed with an application, which will measure her pulse-rate more frequently when it begins to fall outside a threshold range. The device also has a second sensor, an accelerometer, for detecting motion. Based on her doctor's recommendations, Jane has inputted the threshold range for her pulse and other health indicators into the wearable device. When the pulse is in the normal range, the wearable device will instruct the pulse sensor to measure the pulse-rate less frequently. In addition, Jane's doctor has advised her to strap a heart-rate sensor (an external sensor for the wearable device) to her chest to monitor her heart-rate when she is not feeling well. When worn together, the heart-rate sensor periodically sends her heart-rate values to the application on the wearable device on Jane's wrist. When the pulse-rate and the heart-rate is outside the pre-defined threshhold, it is a sign that Jane's heart is functioning abnormally. As Jane gets up from bed and goes to the kitchen for some water, her pulse rate drops and the wearable device monitors the pulse-rate and heart-rate simultaneously and issues a warning signal when both fall outside of the pre-defined ranges following a scheme. Jane collapses, and the accelerometer on her wearable device detects the fall. Based on information from the pulse sensor and heart-rate sensor indicating that her heart is not functioning normally, the application on the wearable device decides to send an emergency alert. If the wearable device does not have a data signal, it will search for a list of communication devices in a prioritized list. Jane had entered several communication devices including her cell phone, her tablet, her husband's cell phone, and the doctor's emergency line in the list, while the wearable device is also capable of searching for and identifying communication devices that are in the vicinity to augment the list. At this time, Jane's cell phone and tablet are switched off. Her husband has left his cell phone at home and the wearable device goes through the list and establishes a communication link with her husband's cell phone to send the emergency alert augmented with Jane's pulse and heart-rate sensor data so that an ambulance with appropriate equipment can be included in the emergency response. The alert also includes location information from her husband's cell phone. James' cell phone is located in a distant room in the house and the wearable device is unable to establish a direct connection. The wearable device then establishes an indirect connection with the cell phone through the home WiFi® router. The wearable device then sends the emergency alert to the EMS through this indirect connection. The EMS receives the emergency alert and locates the EDC serving her locality using location information from the emergency alert and delivers the alert with a request for assistance to the local EDC. The EMS formats the message into a format that is compatible with the EDC, which is not able to receive digital or data communications. Here, the EDC in Jane's area can only receive voice calls, so the EMS converts the message into a voice message for the EDC. The voice message includes sensed information about Jane's pulse and heart-rate. With relevant situational information in hand (e.g., a medical emergency because a person's pulse and heart-rate is low), the EDC sends first responders with appropriate medical capabilities. On the way, the medical staff send a request to the wearable device through Jane's husband's phone to send them emergency medical and prescription information, which Jane had saved for emergencies. Further, the EMS searches its device location database to locate any IoT devices inside Jane's home. The EMS locates a motion sensor and sends a request for real-time and historical information from the sensor through her husband's phone to share with first-responders. Fortunately, the motion sensor is located in the $2^{nd}$ floor bedroom where Jane collapsed, and the historical sensor data reveals movement data with time-stamp information that is close in proximity to transmission of the emergency alert to the EMS. The EMS relays this information to the EDC and first-responders who quickly enter Jane's home and go up the stairs to find her. Thanks to the prompt and efficient emergency response augmented with this new technology, Jane is able to make a fast recovery.

Example 2

IoT Network Situational Awareness for Emergency Response

Bob has a network of IoT devices installed in his house, including smoke detectors. He also has a communication device (mobile phone) and a Wi-Fi routing device in the house. The IoT devices are assigned with unique ID numbers and registered in a device location database (DLDB). When a fire breaks out in a basement, the smoke detector in the basement raises an alarm and broadcasts an emergency alert including a request for emergency assistance to the EMS. The EMS looks up the sensor ID in the database and discovers the physical address of the house where the sensor is located. The EMS sends the emergency alert with the address information to the appropriate EDC in a compatible format. To gain further situational information, the EMS looks up other IoT devices in the house and sends data requests for sensed information to those devices. As the EMS receives updated sensor data from the other IoT devices in Bob's house, it is able to monitor the spread of the fire and update the EDC and first responders in real time. In addition to sending the emergency alert, the smoke detector in the basement broadcasts the message to other IoT devices in the network. The smoke detector at the top of the basement stairs detects the broadcast of the emergency alert and adds sensed information (sensor data) about the smoke level and periodically broadcasts an augmented alert and re-broadcasts the message. When first responders approach the house, they are able to communicate with the IoT devices in the house and get updates about the smoke level in different parts of the house so that they can quickly and effectively respond to the fire.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for establishing communications between a wearable device and an emergency dispatch center (EDC) by an emergency management system (EMS), the method comprising:
   a) receiving, by the EMS, an emergency alert initiated by a wearable device based on user input at a user interface of the wearable device, wherein the emergency alert comprises location information, wherein said location information comprises a current location of the wearable device;
   b) selecting, by the EMS, an EDC from a plurality of emergency dispatch centers based on the current location of the wearable device, wherein the EDC is an entity that coordinates emergency assistance;
   c) establishing, by the EMS, a first communication link with the wearable device and a second communication link with the EDC selected from the plurality of emergency dispatch centers;
   d) providing, by the EMS, the location information to the EDC through the second communication link; and
   e) bridging, by the EMS, the first and second communication links to facilitate an emergency communication session between the wearable device and the emergency dispatch center.

2. The method of claim 1, wherein the emergency alert further comprises sensor data obtained from one or more sensors of the wearable device, wherein the sensor data comprises at least one environmental or physiological parameter.

3. The method of claim 2, wherein the emergency alert is generated when the at least one environmental or physiological parameter is outside a pre-defined warning range.

4. The method of claim 2, wherein the at least one environmental or physiological parameter is calculated as a moving-time average.

5. The method of claim 2, wherein the sensor data is provided to the emergency dispatch center through the first and the second communication link.

6. The method of claim 2, wherein the sensor data comprises at least one physiological parameter; and wherein the at least one physiological parameter is obtained from a sensor selected from a group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

7. The method of claim 1, wherein the location information is transmitted in an emergency message and the emergency message further comprises a type of emergency selected by the user in the user interface and one or more sensed parameters.

8. The method of claim 1, wherein the first communication link is an indirect communication link comprising a third communication link between the wearable device and a communication device and a fourth communication link between the communication device and the emergency management system.

9. The method of claim 8, wherein the location information is added to the emergency alert by the communication device.

10. An emergency management system (EMS) comprising a server configured to provide an emergency management application for establishing communications between a wearable device and an emergency dispatch center (EDC), comprising:
    a) a software module receiving an emergency alert initiated by a wearable device based on user input at a user interface of the wearable device, wherein the emergency alert comprises location information, wherein said location information comprises a current location of the wearable device;
    b) a software module selecting an EDC from a plurality of emergency dispatch centers based on the current location of the wearable device, wherein the EDC is an entity that coordinates emergency assistance;
    c) a software module establishing a first communication link with the wearable device and a second communication link with the EDC selected from the plurality of emergency dispatch centers;
    d) a software module providing the location information to the EDC through the second communication link; and
    e) a software module bridging the first and second communication links to facilitate an emergency communication session between the wearable device and the emergency dispatch center.

11. The system of claim 10, wherein the emergency alert further comprises sensor data obtained from one or more sensors of the wearable device, wherein the sensor data comprises at least one environmental or physiological parameter.

12. The system of claim 11, wherein the emergency alert is generated when the at least one environmental or physiological parameter is outside a pre-defined warning range.

13. The system of claim 11, wherein the at least one environmental or physiological parameter is calculated as a moving-time average.

14. The system of claim 11, wherein the sensor data is provided to the emergency dispatch center through the first and the second communication link.

15. The system of claim 11, wherein the sensor data comprises at least one physiological parameter; and wherein the at least one physiological parameter is obtained from a sensor selected from a group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

16. The system of claim 10, wherein the location information is transmitted in an emergency message and the emergency message further comprises a type of emergency selected by the user in the user interface and one or more sensed parameters.

17. The system of claim 10, wherein the first communication link is an indirect communication link comprising a third communication link between the wearable device and a communication device and a fourth communication link between the communication device and the emergency management system.

18. The system of claim 17, wherein the location information is added to the emergency alert by the communication device.

19. Non-transitory computer-readable storage media encoded with a computer program including instructions executable by at least one processor to create an emergency management application for establishing communications between a wearable device and an emergency dispatch center (EDC), comprising:
   a) a software module receiving an emergency alert initiated by a wearable device based on user input at a user interface of the wearable device, wherein the emergency alert comprises location information, wherein said location information comprises a current location of the wearable device;
   b) a software module selecting an EDC from a plurality of emergency dispatch centers based on the current location of the wearable device, wherein the EDC is an entity that coordinates emergency assistance;
   c) a software module establishing a first communication link with the wearable device and a second communication link with the EDC selected from the plurality of emergency dispatch centers;
   d) a software module providing the location information to the EDC through the second communication link; and
   e) a software module bridging the first and second communication links to facilitate an emergency communication session between the wearable device and the emergency dispatch center.

20. The media of claim 19, wherein the emergency alert further comprises sensor data obtained from one or more sensors of the wearable device, wherein the sensor data comprises at least one environmental or physiological parameter.

* * * * *